US012560823B2

(12) United States Patent
Akimoto et al.

(10) Patent No.: US 12,560,823 B2
(45) Date of Patent: Feb. 24, 2026

(54) IMAGE DISPLAY DEVICE

(71) Applicant: NICHIA CORPORATION, Anan (JP)

(72) Inventors: Hajime Akimoto, Anan (JP); Hisanori Tanaka, Tokushima (JP); Takashi Sakamoto, Anan (JP); Masakazu Kotani, Anan (JP)

(73) Assignee: NICHIA CORPORATION, Anan (JP)

( * ) Notice: Subject to any disclaimer, the term of this patent is extended or adjusted under 35 U.S.C. 154(b) by 29 days.

(21) Appl. No.: 18/520,041

(22) Filed: Nov. 27, 2023

(65) Prior Publication Data

US 2024/0184132 A1     Jun. 6, 2024

(30) Foreign Application Priority Data

Dec. 1, 2022  (JP) ................................. 2022-192950
Dec. 19, 2022  (JP) ................................. 2022-202454

(51) Int. Cl.
H04N 13/383      (2018.01)
G02B 5/124      (2006.01)
(Continued)

(52) U.S. Cl.
CPC ............. G02B 30/56 (2020.01); G02B 5/124 (2013.01); G06T 7/74 (2017.01); H04N 13/167 (2018.05);
(Continued)

(58) Field of Classification Search
CPC .... G02B 30/56; G02B 5/124; G02B 27/0093; G02B 27/0101; G06T 7/74;
(Continued)

(56) References Cited

U.S. PATENT DOCUMENTS 11,892,572 B1 *  2/2024  Dunphy ................... G01S 7/497
12,025,798 B1 *  7/2024  Dehkordi ........... G02B 27/0101
(Continued)

FOREIGN PATENT DOCUMENTS

JP      2009-042337 A      2/2009
JP      2013-238681 A      11/2013
(Continued)

OTHER PUBLICATIONS

U.S. Appl. No. 18/493,167, filed Oct. 24, 2023, Akimoto et al.
U.S. Appl. No. 18/504,237, filed Nov. 8, 2023, Akimoto et al.
U.S. Appl. No. 18/508,974, filed Nov. 14, 2023, Akimoto et al.

*Primary Examiner* — Tung T Vo
(74) *Attorney, Agent, or Firm* — Foley & Lardner LLP

(57)      ABSTRACT

An image display device includes an imaging element, a light source, a detecting part, and a controller. The imaging element includes a base member including a first surface, and a reflector array on the base member. The reflector array includes multiple reflector rows, each including multiple dihedral corner reflectors along a first direction. The multiple reflector rows are arranged parallel to a second direction crossing the first direction. The multiple dihedral corner reflectors each include a first reflecting surface, and a second reflecting surface orthogonal to the first reflecting surface. A tilt of a second orthogonal reflector is set to form a floating image at the first surface side. The light-transmitting member is arranged to transmit twice-reflected light of the imaging element. The light-shielding member shields a portion of light other than the twice-reflected light.

16 Claims, 29 Drawing Sheets

(51) Int. Cl.

| | | |
|---|---|---|
| *G02B 30/56* | (2020.01) | |
| *G06T 7/73* | (2017.01) | |
| *H04N 13/167* | (2018.01) | |
| *H04N 13/327* | (2018.01) | |

(52) U.S. Cl.
CPC ......... *H04N 13/327* (2018.05); *H04N 13/383* (2018.05); *G06T 2207/30252* (2013.01)

(58) Field of Classification Search
CPC ........ G06T 2207/30252; H04N 13/167; H04N 13/327; H04N 13/383; H04N 13/346; H04N 13/366
USPC .......................................................... 348/51
See application file for complete search history.

(56) References Cited

U.S. PATENT DOCUMENTS

| | | | | |
|---|---|---|---|---|
| 2011/0074657 | A1* | 3/2011 | Sugiyama | .......... G02B 27/0101 345/7 |
| 2011/0235201 | A1 | 9/2011 | Maekawa | |
| 2018/0081058 | A1* | 3/2018 | Kalscheur | .............. G01S 17/58 |
| 2018/0101087 | A1 | 4/2018 | Shinohara | |
| 2018/0164596 | A1 | 6/2018 | Houzyou et al. | |
| 2018/0203244 | A1 | 7/2018 | Hatanaka et al. | |
| 2018/0267216 | A1 | 9/2018 | Otsubo | |
| 2019/0196020 | A1* | 6/2019 | Aceti | ..................... G01S 7/4815 |
| 2020/0290513 | A1* | 9/2020 | Karafin | ................... G06F 3/017 |
| 2021/0103161 | A1 | 4/2021 | Daiku | |
| 2021/0379993 | A1* | 12/2021 | Xu | .......................... B60K 35/00 |
| 2022/0043277 | A1* | 2/2022 | Karafin | .................. G03H 1/268 |
| 2022/0176869 | A1* | 6/2022 | Maruyama | .......... B60Q 1/0017 |
| 2023/0128022 | A1* | 4/2023 | Weindorf | .............. B60K 35/60 345/7 |
| 2024/0184109 | A1* | 6/2024 | Kitahara | ........... G02B 27/0983 |
| 2024/0210683 | A1* | 6/2024 | Aruga | .............. G02B 27/0101 |
| 2024/0210684 | A1* | 6/2024 | Kitahara | ........... G02B 27/0101 |
| 2024/0253465 | A1* | 8/2024 | Shintani | .............. H04N 13/363 |
| 2024/0427169 | A1* | 12/2024 | Daiku | ..................... G02B 5/00 |

FOREIGN PATENT DOCUMENTS

| | | | |
|---|---|---|---|
| JP | 2015-146009 | A | 8/2015 |
| JP | 2017-156466 | A | 9/2017 |
| JP | 2017-156467 | A | 9/2017 |
| JP | 2017-156468 | A | 9/2017 |
| WO | WO-2016/199902 | A1 | 12/2016 |
| WO | WO-2017/018204 | A1 | 2/2017 |
| WO | WO-2017/051598 | A1 | 3/2017 |
| WO | WO-2017/146172 | A1 | 8/2017 |

* cited by examiner

IMAGE DISPLAY DEVICE

CROSS-REFERENCE TO RELATED APPLICATIONS

The present application claims priority under 35 U.S.C. § 119 to Japanese Patent Application No. 2022-192950, filed Dec. 1, 2022, and Japanese Patent Application No. 2022-202454, filed Dec. 19, 2022, the contents of which are hereby incorporated by reference in their entirety.

BACKGROUND

1. Technical Field

Embodiments described herein relate generally to an image display device.

2. Description of Related Art

A reflective imaging optical element that displays a real image of an object to be observed in mid-air and an image display device using the reflective imaging optical element have been proposed (see, e.g., Japanese Patent Publication No. 2015-146009).

Such an image display device can display an image when needed by a user, and not display the image at other times. Such an image display device requires no device for the display part because the image is displayed in mid-air. Such an image display device therefore has advantages such as more effective utilization of the limited space inside an automobile or the like.

A non-contact operation panel can be realized by applying such an image display device. Therefore, there are expectations for expanding the field of application beyond the utilization in automobiles and the like.

Reflective imaging optical elements that can display images in mid-air, such as those that use dihedral corner reflectors or retroreflective function optical elements called corner cube reflectors, have been put into practical use (see, e.g., PCT Publication No. WO2016/199902). Attention has been called to problems resulting from the operation principles of each. For example, in an image display device using imaging elements having dihedral corner reflectors, it is said to be difficult to avoid the display of false images at locations unintended by the user.

In an image display device using a corner cube reflector, the formation position of the floating image can be set relatively freely by using an optical element in addition to a light source and imaging element. On the other hand, the configuration of such an optical element is complex.

An image display device having a simple structure that can display an image in mid-air is desirable.

SUMMARY

Certain embodiments of the invention provide an image display device having a simple structure that can display an image in mid-air.

An image display device according to an embodiment of the invention includes an imaging element configured to form a floating image, a light source configured to irradiate, toward the imaging element, light forming the floating image, a first detecting part located in a vehicle, the first detecting part configured to detect surrounding information of an observer observing the floating image and a controller configured to control, based on the surrounding information, a position at which the floating image is formed and a parameter of the light emitted by the light source, the parameter of the light including at least one of an output or a chromaticity of the light emitted by the light source. The imaging element includes either a base member, and a reflector array located on the base member, the base member including a first surface, and a second surface positioned at a side opposite to the first surface, or a base member comprising a reflector array, the base member including a first surface, and a second surface positioned at a side opposite to the first surface. The reflector array includes a plurality of reflector rows, each of the plurality of reflector rows including a plurality of dihedral corner reflectors arranged along a first direction. Each of the plurality of dihedral corner reflectors includes a first reflecting surface configured to reflect light from a first surface side and a second reflecting surface oriented to be orthogonal to the first reflecting surface, and configured to reflect a reflected light from the first reflecting surface toward the first surface side. In each reflector row of the plurality of reflector rows, an angle between a straight line at which the first reflecting surface and the second reflecting surface meet, and a plane in which the first direction and a second direction intersecting the first direction extend is set to a value greater than 0° and less than 90°. An angle between the first reflecting surface and the plane is set to a value greater than 45° and less than 90°. The plurality of reflector rows include a first reflector row in which the angle between the straight line and the plane is set to a smallest value among those of the plurality of reflector rows. Reflector rows other than the first reflector row are configured such that the angle between the straight line and the plane is set to values that increase away from the first reflector row in the second direction.

An image display device according to another embodiment of the invention includes an imaging element configured to form a floating image, a light source configured to irradiate, toward the imaging element, light forming the floating image, a first detecting part located in a vehicle, the first detecting part configured to detect surrounding information of an observer observing the floating image and a controller configured to control, based on the surrounding information, a position at which the floating image is formed and a parameter of the light emitted by the light source, the parameter of the light including at least one of an output or a chromaticity of the light emitted by the light source. The imaging element includes either a base member, and a reflector array provided on the base member, the base member including a first surface, and a second surface positioned at a side opposite to the first surface, or a base member comprising a reflector array, the base member including a first surface, and a second surface positioned at a side opposite to the first surface. The reflector array comprises a plurality of reflector rows, each of the plurality of reflector rows including a plurality of dihedral corner reflectors arranged along a first direction. The plurality of reflector rows being arranged in a second direction to be parallel to each other with a spacing therebetween, the second direction intersecting the first direction. Each of the plurality of dihedral corner reflectors includes a first reflecting surface configured to reflect light from the first surface side and a second reflecting surface oriented to be orthogonal to the first reflecting surface, and configured to reflect a reflected light reflected from the first reflecting surface toward the first surface side. In each reflector row of the plurality of reflector rows, an angle between a straight line at which the first reflecting surface and the second reflecting surface meet and a plane in which the first direction and the second direction intersect is set to a value greater than 0° and less than 90°. An angle between the first reflecting surface and the plane is set to a value greater than 450 and less than 90°. The plurality of reflector rows include a first reflector row in which the angle between the straight line and the virtual plane is set to a smallest value among those of the plurality of reflector rows. Reflector rows other than the first reflector row are configured such that the angle between the straight line and the plane is set to values that increase away from the first reflector row in one direction along the second direction.

DETAILED DESCRIPTION

Figure 1:
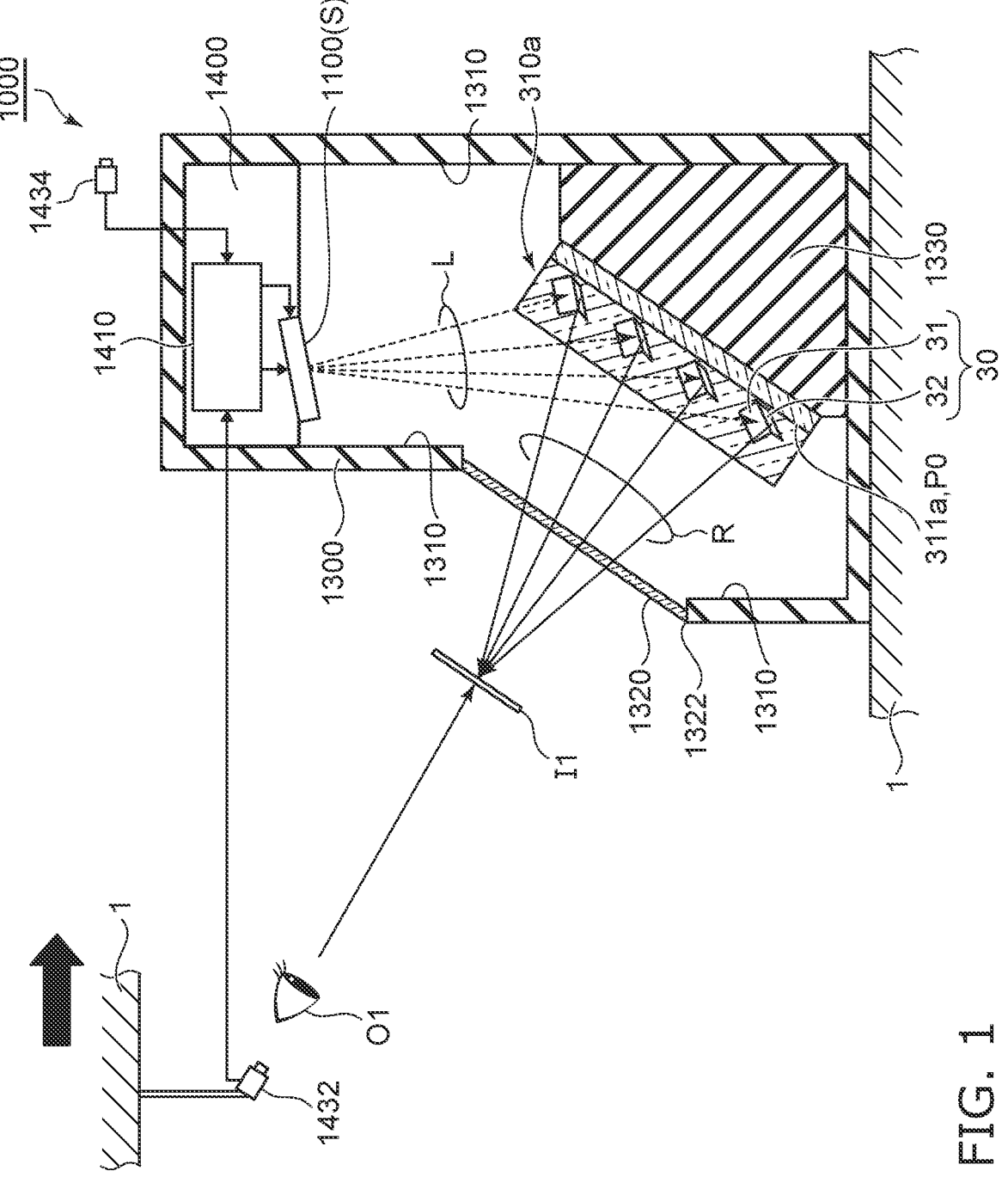
FIG. 1 is a schematic cross-sectional view illustrating an image display device according to a first embodiment.

Exemplary embodiments will now be described with reference to the drawings.

The drawings are schematic or conceptual, and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in regard to a previous drawing are marked with like reference numerals, and a detailed description is omitted as appropriate.

First Embodiment

FIG. 1 is a schematic cross-sectional view illustrating an image display device according to a first embodiment.

As shown in FIG. 1, the image display device 1000 according to the embodiment includes an imaging element 310a, a display device 1100(S), imaging parts (first detecting parts) 1432 and 1434, and a controller 1410.

The imaging element 310a, the display device 1100(S), and the controller 1410 are located inside a housing 1300. The controller 1410 is located inside a control device 1400, and the control device 1400 is located at the upper portion inside the housing 1300 together with the display device 1100(S). The imaging element 310a is located on an imaging element mounting part 1330 located at the lower portion inside the housing 1300. An opening is provided in the housing 1300, and a window member 1320 is located in the opening of the housing 1300.

The display device 1100(S) which is a light source emits a light L toward the imaging element 310a. The light L is incident on the imaging element 310a, and the imaging element 310a emits a reflected light R. The imaging element 310a emits the reflected light R out of the housing 1300 via the window member 1320. The imaging element 310a forms an image I1 by forming a floating image of the emitted reflected light R in mid-air outside the housing 1300.

For example, the image display device 1000 is located in a vehicle 1. The vehicle 1 is a transportation vehicle such as a private automobile, a cargo vehicle, etc. An observer O1 is a passenger of the vehicle 1. The observer O1 is, for example, the driver of the vehicle 1. The observer O1 is seated to face the direction in which the vehicle 1 travels, and the image display device 1000 is located frontward of the observer O1. The direction in which the vehicle 1 travels is the direction shown by the thick arrow in FIG. 1. This is similar for the image display devices according to the other embodiments described below as well. For example, the observer O1 observes the image I1 formed in mid-air while operating the vehicle 1.

The imaging parts 1432 and 1434 are located in the vehicle 1. The imaging parts 1432 and 1434 are detecting parts detecting surrounding information which is information of the environment around the observer O1. More specifically, the imaging parts 1432 and 1434 detect the following surrounding information. Specifically, the imaging part 1432 detects information related to the image I1 observed by the observer O1. The imaging part 1434 detects information related to the outside scene in the direction in which the vehicle 1 travels.

The imaging part 1432 is located above and backward of the observer O1 to be able to image the image I1 observed by the observer O1. For example, the imaging part 1432 is located at the ceiling part of the vehicle 1.

The imaging part 1432 generates image data (first image data) including the information of the image I1 observed by the observer O1. The information of the image I1 is information of the position at which the image I1 is formed and information of a parameter of the light forming the image I1. The light parameter includes at least one of the output of the light or the chromaticity of the light. The output of the light is, for example, an amount indicating the intensity of the light, the luminance of the light, etc.; any appropriate parameter is set. For example, the chromaticity of the light is represented by the chromaticity diagram defined by CIE (Commission internationale de leclairage). The image data that is generated by the imaging part 1432 includes the information of the position of the image I1 and the information of the light parameter of the image I1.

The imaging part 1434 generates image data (third image data) including the information of the outside scene in the direction in which the vehicle 1 travels. In the example shown in FIG. 1, the imaging part 1434 is arranged to face the travel direction of the vehicle 1 frontward of the observer O1. For example, the imaging part 1434 is located on the dashboard of the vehicle 1. The information of the outside scene is information of a parameter of the light of the outside scene. The light parameter of the image data generated by the imaging part 1434 is the same as that of the image data generated by the imaging part 1432. When the light parameter of the image data generated by the imaging part 1432 is set to the output of the light, the light parameter of the image data generated by the imaging part 1434 is set to the output of the light. When the light parameter of the image data generated by the imaging part 1432 is set to the chromaticity of the light, the light parameter of the image data generated by the imaging part 1434 is set to the chromaticity of the light.

The controller 1410 performs feedback control based on the image data generated by the imaging part 1432 so that the position at which the image I1 is formed tracks a preset position. The controller 1410 performs feedback control based on the image data acquired by the imaging part 1432 so that the light parameter forming the image I1 tracks a preset reference value. The controller 1410 extracts the light parameter of the outside scene from the image data generated by the imaging part 1434 and corrects the preset reference value.

By such an operation of the controller 1410, the image I1 observed by the observer O1 can have more appropriate light output and/or chromaticity at a more appropriate position according to the environment that the observer O1 is in. The description of FIG. 1 above is an operation based on the general configuration of the image display device 1000. More specifically, the image display device 1000 is operated by the operations of components connected with a communication network described below with reference to FIG. 16. This is similar for the descriptions of the image display devices according to the other embodiments described below.

The controller 1410 sets the position at which the display device 1100(S) is located and the angle of the light emitted by the display device 1100(S). For example, the controller 1410 sets the position and/or angle of the display device 1100(S) by six-axis control. The six-axis control of the display device 1100(S) will now be described.

Figure 2:
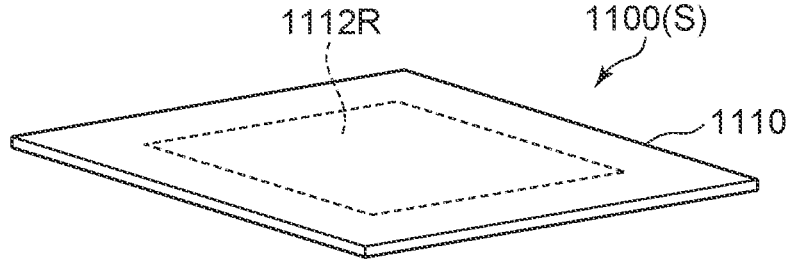
FIG. 2 is a schematic view for describing a range of movement of a portion, i.e., a display device, of the image display device according to the first embodiment.
Figure 2:
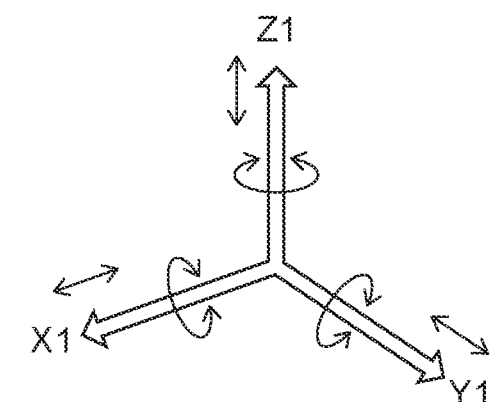

FIG. 2 is a schematic view for describing a portion, i.e., the range of movement of the display device, of the image display device according to the first embodiment.

As shown in FIG. 2, the display device 1100(S) is movable and is located at any position in X1Y1Z1 coordinates. The definitions of each axis of the three-dimensional coordinate axes are described below. The display device 1100(S) includes a substrate 1110, and a pixel formation region 1112R formed on the substrate 1110. The pixel formation region 1112R is formed in a plane parallel to the X1Y1-plane, and the main orientation of the light emitted by the LED elements included in the pixels formed in the pixel formation region 1112R is the negative direction of the Z1-axis.

As a first degree of freedom, the display device 1100(S) is movable in a direction parallel to the X1-axis. As a second degree of freedom, the display device 1100(S) is movable in a direction parallel to the Y1-axis. As a third degree of freedom, the display device 1100(S) is movable in the Z1-axial direction. By having the first to third degrees of freedom, the display device 1100(S) can move to any position in the X1Y1Z1 coordinate space.

The display device 1100(S) also can rotate around each axis. As a fourth degree of freedom, the display device 1100(S) is rotatable around the X1-axis. As a fifth degree of freedom, the display device 1100(S) is rotatable around the Y1-axis. As a sixth degree of freedom, the display device 1100(S) is rotatable around the Z1-axis. The pixel formation region 1112R of the display device 1100(S) can face any direction. The display device 1100(S) mainly emits light in the normal direction of the pixel formation region 1112R.

The control of the display device 1100(S) with six degrees of freedom is called six-axis control. In the image display device 1000, the controller 1410 is included in a control system adapted to six-axis control. For example, the controller 1410 that is adapted to six-axis control includes an articulated arm, and the display device 1100(S) is located at the tip of the articulated arm.

By including the controller 1410 adapted to six-axis control in the image display device 1000, the display device 1100(S) can emit light toward any position in any direction. The light that is emitted by the display device 1100(S) is irradiated on the imaging element 310a. By fixing the imaging element 310a and controlling the display device 1100(S) in six axes, the image display device 1000 can cause the light emitted from the display device 1100(S) to form a floating image at the desired position in mid-air via the imaging element 310a. Degrees of freedom of the control axes may be less than six according to the adjustment range of the position at which the image I1 is formed.

The controller 1410 includes, for example, an arithmetic processor (CPU). The controller 1410 calculates the difference between a preset reference position and the actual position at which the image I1 is formed, and performs feedback control so that the difference approaches 0. The controller 1410 calculates the difference between the light parameter appearing in the image data and the preset reference value, and performs feedback control so that the difference approaches 0. Finer control is possible by using machine learning and/or deep learning to perform such feedback control.

The description continues now by returning to FIG. 1.

The imaging element 310a is located on the imaging element mounting part 1330 so that a first surface 311a and a virtual plane P0 are tilted with respect to the bottom surface of the housing 1300. The light L that is emitted by the display device 1100(S) is incident on the imaging element 310a, and the imaging element 310a emits the light L obliquely upward as the reflected light R. The reflected light R is emitted in the normal direction of the first surface 311a and the virtual plane P0. The imaging element 310a is located at an imaging element mounting part 1330 and fixed to the imaging element mounting part 1330, which is provided to support the first surface 311a in the direction in which the reflected light R is emitted. The virtual plane P0 is described below with reference to FIG. 7.

The housing 1300 has any appropriate exterior shape such that the imaging element 310a, the display device 1100(S), and the control device 1400 are located at appropriate positions in the interior.

The housing 1300 includes a light-shielding member 1310. In the image display device 1000, the light-shielding member 1310 is a portion of the housing 1300. The light-shielding member 1310 is, for example, a light-absorbing layer located at the interior wall of the housing 1300. The light-absorbing layer is, for example, a coating layer of a black coating material. By providing the light-shielding member 1310 at the interior wall of the housing 1300 in the image display device 1000, a portion of the light emitted from the display device 1100(S) and the imaging element 310a is prevented from being reflected inside the housing 1300 to become stray light. The light-shielding member 1310 is a coating layer of a coating material and is sufficiently thin compared to the thickness of the constituent material of the housing 1300, and is therefore illustrated as the surface of the interior wall of the housing 1300 in FIG. 1.

The window member 1320 is provided in a portion of the housing 1300. The window member 1320 is located at the position of a window frame 1322 which is an opening formed in a portion of the housing 1300. The window frame 1322 is an opening at a position facing the first surface 311a of the imaging element 310a. The window member 1320 is formed of a light-transmitting material such as glass, a transparent resin, etc., so that the imaging element 310a can emit the reflected light R outside the image display device 1000.

The imaging element 310a includes multiple dihedral corner reflectors 30 arranged in a matrix configuration on the first surface 311a. The first surface 311a is arranged to be substantially parallel to the window member 1320 and the opening of the window frame 1322. The dihedral corner reflector 30 includes a first reflecting surface 31 and a second reflecting surface 32. The reflecting surfaces reflect the light once each, and the twice-reflected light of the dihedral corner reflector 30 is emitted as the reflected light R. The configuration of the imaging element 310a is described below with reference to FIGS. 6 to 15. The window member 1320 and the window frame 1322 are arranged to transmit the twice-reflected light of the imaging element 310a.

In the image display device 1000, the display device 1100(S) and the imaging element 310a are arranged to form the image I1 directly above the imaging element 310a. "Directly above the imaging element 310a" is a position in the normal direction of the first surface 311a. In such an arrangement, there are cases where the imaging element 310a also emits a portion of the once-reflected light toward the first surface 311a side and forms false images and/or ghosts at the first surface 311a side. According to the configuration of the imaging element 310a, there are also cases where light that is not reflected by any reflecting surface is emitted toward the first surface 311a side. Accordingly, the light-shielding member 1310 is located at the interior wall of the housing 1300 at positions that shield at least the leakage light from the display device 1100(S) and the light other than the twice-reflected light of the imaging element 310a.

The reflected light R that is emitted from the imaging element 310a passes through the window member 1320 and forms the image I1 outside the housing 1300. The window member 1320 is located between the imaging element 310a and the position at which the image I1 is formed. When the observer O1 is present, the image I1 is formed between the observer O1 and the window member 1320.

Although the light-shielding member 1310 is located at the interior wall of the housing 1300 in the specific example above, the light-shielding member 1310 is not limited to being located at the interior wall as long as the leakage light radiated from the display device 1100(S) and/or the imaging element 310a can be shielded. For example, the leakage light from the display device 1100(S) can be shielded by surrounding the periphery of the display device 1100(S) with a tubular body coated in black. The leakage light of the imaging element 310a can be shielded by forming the base member of the imaging element 310a from a black resin, etc.

The configuration of the display device 1100(S) will now be described in detail.

Figure 3A:
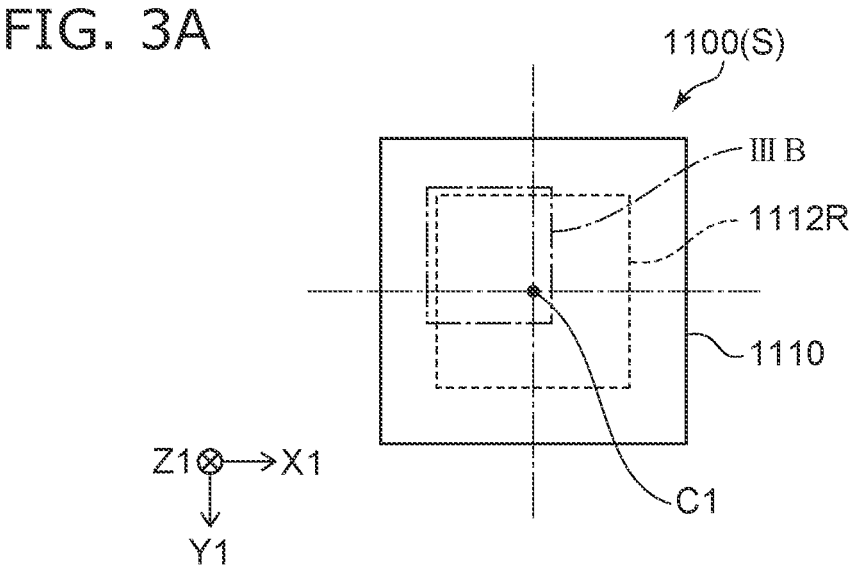
FIG. 3A is a schematic plan view illustrating a portion, i.e., the display device, of the image display device according to the first embodiment.

FIG. 3A is a schematic plan view illustrating a portion, i.e., the display device, of the image display device according to the first embodiment.

Figure 3B:
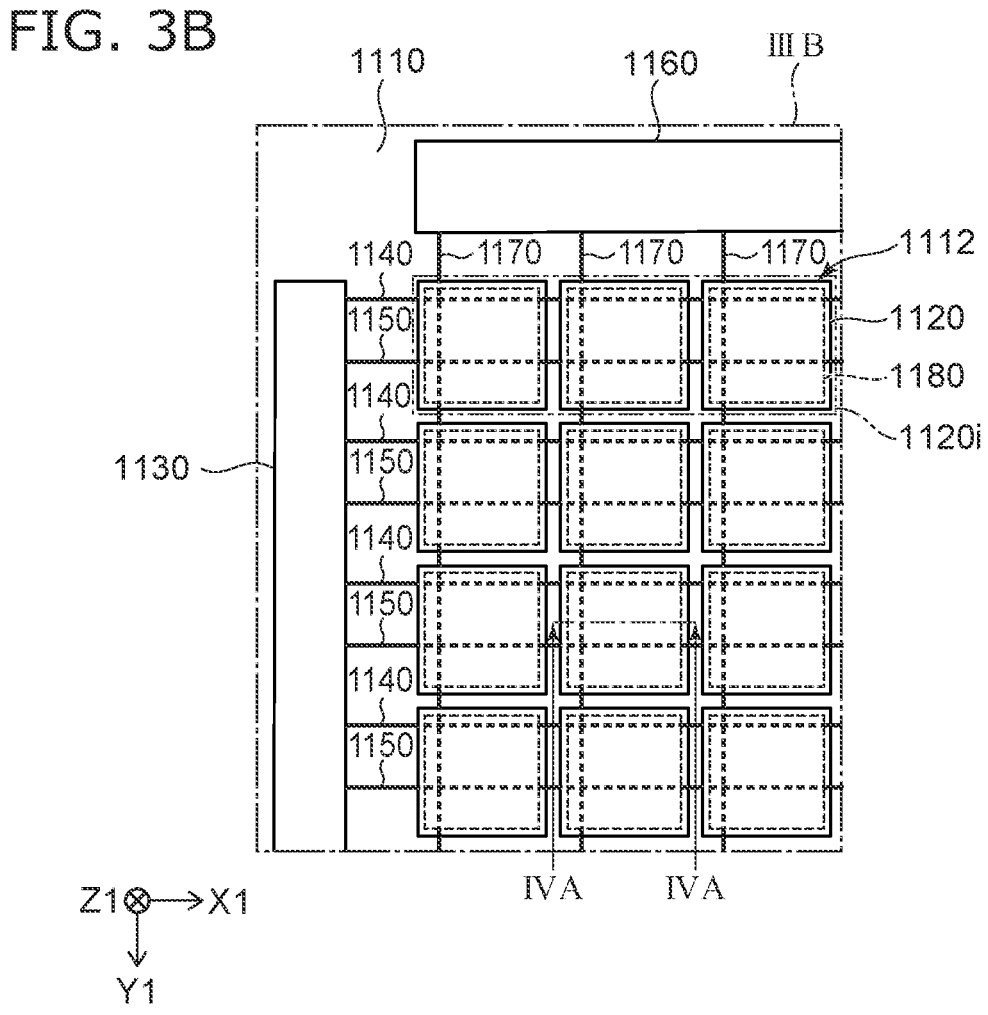
FIG. 3B is an enlarged schematic view of portion IIIB of FIG. 3A.

FIG. 3B is an enlarged schematic view of portion IIIB of FIG. 3A.

Figure 4A:
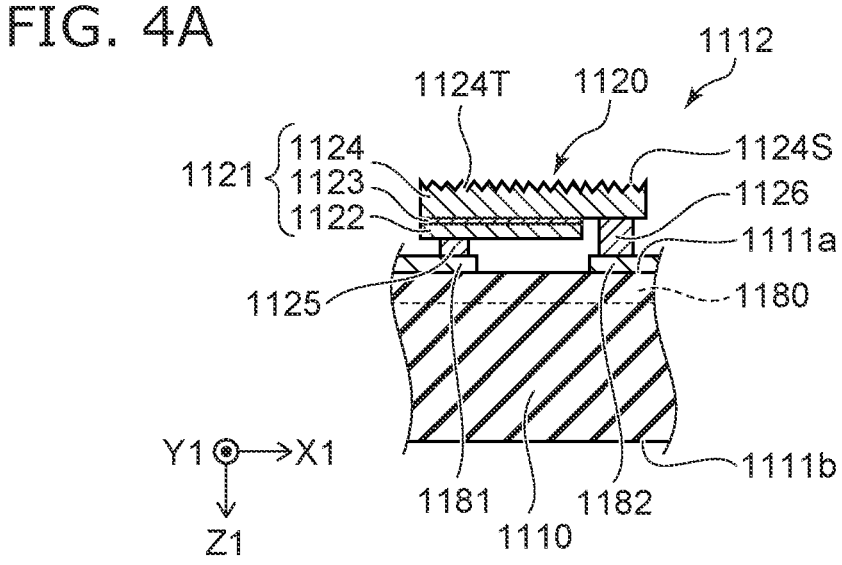
FIG. 4A is a schematic auxiliary cross-sectional view along line IVA-IVA of FIG. 3B.

FIG. 4A is a schematic auxiliary cross-sectional view along line IVA-IVA of FIG. 3B.

A three-dimensional orthogonal coordinate system may be used in the description of the display device 1100(S). The three-dimensional orthogonal coordinate system for the description of the display device 1100(S) is an orthogonal coordinate system including an X1-axis, a Y1-axis, and a Z1-axis. A direction parallel to the X1-axis may be called an "X1-direction," a direction parallel to the Y1-axis may be called a "Y1-direction," and a direction parallel to the Z1-axis may be called a "Z1-direction." The X1Y1-plane that includes the X1-axis and the Y1-axis is parallel to a first surface 1111a of the substrate of the display device 1100(S). The first surface 1111a is a surface at which the LED elements are arranged and the pixel formation region 1112R is located. The X1-axis is parallel to the rows of pixels of the display device 1100(S). The Y1-axis is orthogonal to the X1-axis. The Z1-axis is orthogonal to the X1-axis and the Y1-axis and is the positive direction from the first surface 1111a toward a second surface 1111b. The second surface 1111b is positioned at the side opposite to the first surface 1111a of the substrate 1110.

According to the X1Y1Z1-orthogonal coordinate system, the display device 1100(S) emits light mainly in the negative direction of the Z1-axis. As shown in FIG. 1, the imaging element 310a is located at the side at which the display device 1100(S) emits light. That is, the imaging element 310a is located at the negative Z1-axis side of the display device 1100(S).

As shown in FIG. 3A, the display device 1100(S) includes the substrate 1110 that is substantially rectangular when the X1Y1-plane is viewed in plan. The substrate 1110 can be, for example, glass, a resin such as polyimide or the like, or a Si substrate may be used. In the display device 1100(S), an optical axis C1 is aligned with the center of the shape of the outer perimeter of the substrate 1110 when the X1Y1-plane is viewed in plan. The optical axis C1 is parallel to the Z1-axis. By aligning the optical axis C1 with the Z1-axis, the display device 1100(S) can be rotated around the optical axis C1 by six-axis control.

The pixel formation region 1112R is located on the substrate 1110 with the optical axis C1 at the center. Pixels 1112 shown in FIG. 3B are arranged in a matrix configuration in the pixel formation region 1112R. Although the pixel formation region 1112R is substantially square in the example shown in FIG. 3A, the pixel formation region 1112R can have any shape. That is, the outer perimeter formed by the arrangement of the pixels 1112 can have any shape.

As shown in FIG. 3B, the display device 1100(S) includes the multiple pixels 1112 as a light source. The display device 1100(S) uses the multiple pixels 1112 to display the desired image. The display device 1100(S) is electrically connected to a display controller 1416 described with reference to FIG. 16. The display controller 1416 is located inside the housing 1300 and/or outside the housing 1300 and supplies, to the display device 1100(S), data related to the image to be displayed by the display device 1100(S). The display device 1100(S) displays a still image, a video image, etc., based on the data related to the image supplied from the display controller 1416.

The display device 1100(S) includes the substrate 1110, the multiple pixels 1112, a scanning circuit 1130, multiple scanning lines 1140, multiple lighting control lines 1150, a drive circuit 1160, and multiple signal lines 1170. The pixel 1112 includes LED elements 1120 and individual circuits 1180. The LED elements 1120, the scanning circuit 1130, the drive circuit 1160, and the individual circuits 1180 are shown simply as quadrilaterals to avoid complexity in the illustration of FIG. 3B.

The multiple LED elements 1120 are arranged in a matrix configuration. Hereinbelow, the multiple LED elements 1120 arranged in one row in the X1-direction are called the "row 1120i."

As shown in FIG. 4A, the substrate 1110 includes the first surface 1111a and the second surface 1111b. The second surface 1111b is at the side opposite to the first surface 1111a. The LED elements 1120 are arranged in a matrix configuration on the first surface 1111a. The LED elements 1120 are mounted face-down on the first surface 1111a. The LED elements are not limited to face-down mounting and may be mounted face-up on the first surface 1111a.

The LED element 1120 includes a semiconductor stacked body 1121, an anode electrode 1125, and a cathode electrode 1126. The semiconductor stacked body 1121 includes a p-type semiconductor layer 1122, an active layer 1123 located on the p-type semiconductor layer 1122, and an n-type semiconductor layer 1124 located on the active layer 1123. The semiconductor stacked body 1121 includes, for example, a gallium nitride compound semiconductor of $In_XAl_YGa_{1-X-Y}N$ ($0 \leq X$, $0 \leq Y$, and $X+Y<1$). According to the embodiment, the light that is emitted by the LED element 1120 is visible light.

The anode electrode 1125 is electrically connected to the p-type semiconductor layer 1122. The anode electrode 1125 also is electrically connected to a wiring part 1181 of the individual circuit 1180 described below with reference to FIG. 5. In the example shown in FIGS. 4A and 4B, the individual circuit 1180 is formed in a Si substrate. The cathode electrode 1126 is electrically connected to the n-type semiconductor layer 1124. The cathode electrode 1126 also is electrically connected to another wiring part 1182 of the individual circuit 1180. The anode electrode 1125 and the cathode electrode 1126 can include, for example, metal materials.

In the example shown in FIG. 4A, multiple recesses 1124T are provided in a light-emitting surface 1124S of the LED element 1120. Hereinbelow, "the light-emitting surface of the LED element" means the surface of the LED element from which the light is mainly emitted. In the example shown in FIG. 4A, the light-emitting surface 1124S is one surface of the n-type semiconductor layer 1124. More specifically, the light-emitting surface 1124S is positioned at the side of the n-type semiconductor layer 1124 opposite to the surface facing the active layer 1123.

Methods of forming the multiple recesses 1124T in the light-emitting surface 1124S include a method in which an n-type semiconductor layer is grown on a growth substrate in which protrusions are formed, a method in which surface roughening of the surface of the n-type semiconductor layer is performed by anisotropic etching, etc. The growth substrate may be detached at the prescribed timing.

Thus, the LED element 1120 can emit light having a larger light distribution angle because the multiple recesses 1124T are provided in the light-emitting surface 1124S of the LED element 1120.

The configuration of the LED element is not limited to the configuration described above. For example, multiple protrusions instead of multiple recesses may be provided in the light-emitting surface of the LED element, or both multiple recesses and multiple protrusions may be provided. When the growth substrate is light-transmissive, the growth substrate need not be detached from the semiconductor stacked body; at least one of multiple recesses or multiple protrusions may be provided in the surface of the growth substrate corresponding to the light-emitting surface.

The structure of the display device 1100(S) is not limited to the structure described above. Although the LED elements 1120 are individually mounted on the substrate 1110 in which the individual circuits 1180 are provided in the example above, the LED elements 1120 may be individually patterned from a semiconductor stacked body bonded on the substrate 1110 in which the individual circuits 1180 are provided, and then wired.

Figure 4B:
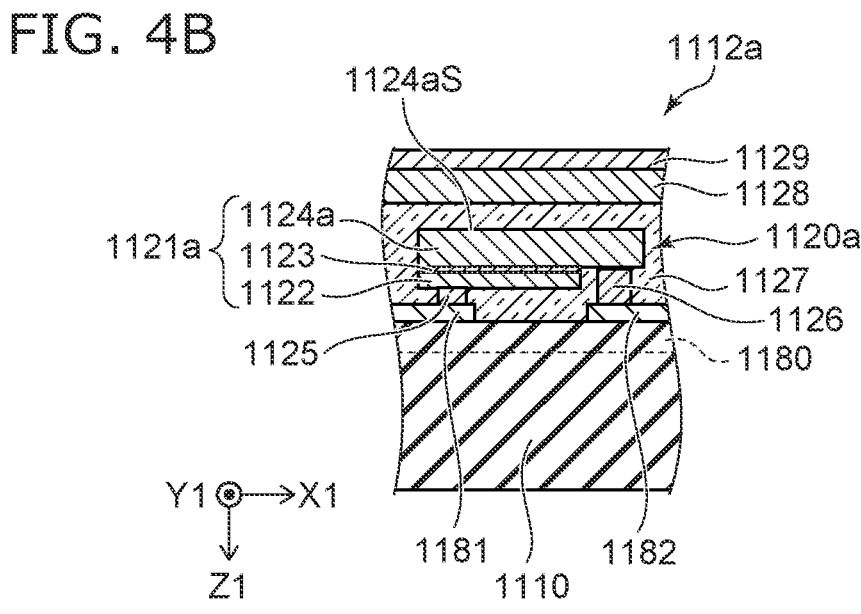
FIG. 4B is a schematic cross-sectional view illustrating a portion, i.e., a modification of the display device, of the image display device according to the first embodiment.

FIG. 4B is a schematic cross-sectional view illustrating a portion, i.e., a modification of the display device, of the image display device according to the first embodiment.

FIG. 4B corresponds to an auxiliary cross-sectional view along line IVA-IVA of FIG. 3B, and is an auxiliary cross-sectional view at the same position as the position shown in FIG. 4A.

As shown in FIG. 4B, a pixel 1112a includes an LED element 1120a and a wavelength conversion member 1128. Similarly to the pixel 1112 shown in FIG. 3B, the pixel 1112a includes the individual circuit 1180. As in the example shown in FIG. 4B, the pixel 1112a may further include a color filter 1129.

According to the modification, the LED element 1120a includes a semiconductor stacked body 1121a, the anode electrode 1125, and the cathode electrode 1126. The semiconductor stacked body 1121a includes the p-type semiconductor layer 1122, the active layer 1123, and an n-type semiconductor layer 1124a. The active layer 1123 is located on the p-type semiconductor layer 1122, and the n-type semiconductor layer 1124a is located on the active layer 1123. The n-type semiconductor layer 1124a includes a light-emitting surface 1124aS. The light-emitting surface 1124aS is a flat surface that does not include recesses or protrusions.

In the pixel 1112a, a protective layer 1127 covers the LED element 1120a, the wiring parts 1181 and 1182, and the first surface 1111a of the substrate 1110. The protective layer 1127 can include, for example, a light-transmitting material such as a polymer material including a sulfur (S)-including substituent group or phosphorus (P) atom-including group, a high refractive index nanocomposite material in which high refractive index inorganic nanoparticles are introduced to a polymer matrix of polyimide, etc.

The wavelength conversion member 1128 is located on the protective layer 1127. The wavelength conversion member 1128 includes at least one type of wavelength conversion material such as a general fluorescer material, a perovskite fluorescer material, a quantum dot (QD), etc. The light that is emitted from the LED element 1120a is incident on the wavelength conversion member 1128. The wavelength conversion material that is included in the wavelength conversion member 1128 converts the light into light of a different peak wavelength from the light emitted from the LED element 1120a, and emits the light. The light that is incident on the wavelength conversion member 1128 is scattered inside the wavelength conversion member 1128; therefore, the light that is emitted by the wavelength conversion member 1128 is emitted with a wider light distribution angle.

The color filter 1129 is located on the wavelength conversion member 1128. The color filter 1129 can shield the greater part of the light that is emitted from the LED element 1120a but does not undergo wavelength conversion by the wavelength conversion member 1128. As a result, the light that is emitted by the wavelength conversion member 1128 is the main light emitted from the pixel 1112a.

According to the modification, the light emission peak wavelength of the LED element 1120a may be in the ultraviolet region or the visible light region. When blue light is to be emitted from at least one pixel 1112a, blue light may be emitted from the LED element 1120a belonging to the pixel 1112a without providing the wavelength conversion member 1128 and the color filter 1129 in the pixel 1112a.

In the LED element, an n-type semiconductor layer may be arranged to face a substrate; an active layer and a p-type semiconductor layer may be stacked in this order on the n-type semiconductor layer; the surface of the p-type semiconductor layer at the side opposite to the surface facing the active layer may be used as the light-emitting surface of the LED element.

As shown in FIG. 3B, for example, the scanning circuit 1130 is provided in the substrate 1110 to be adjacent to the multiple LED elements 1120, which are arranged in a matrix configuration, in the X1-direction when viewed in plan. That is, the scanning circuit 1130 is located adjacent to the outer edge parallel to the X1-direction of the pixel formation region 1112R shown in FIG. 2. The scanning circuit 1130 is configured to sequentially switch, in the Y1-direction, the row 1120i that is driven. The multiple scanning lines 1140 extend in the X1-direction from the scanning circuit 1130. The multiple lighting control lines 1150 extend in the X1-direction from the scanning circuit 1130. The multiple scanning lines 1140 and the multiple lighting control lines 1150 are alternately arranged in the Y1-direction.

The drive circuit 1160 is provided in the substrate 1110 to be adjacent to the multiple LED elements 1120, which are arranged in the matrix configuration, in the Y1-direction when the X1Y1-plane is viewed in plan. That is, the drive circuit 1160 is located adjacent to the outer edge parallel to the Y1-direction of the pixel formation region 1112R shown in FIG. 2. The drive circuit 1160 is configured to control the outputs of the LED elements 1120 belonging to the row 1120i that is driven. The multiple signal lines 1170 extend in the Y1-direction from the drive circuit 1160. The multiple signal lines 1170 are arranged in the X1-direction. The drive circuit 1160 may include an IC chip, and the IC chip may be mounted on the substrate 1110.

For example, the scanning circuit 1130, the multiple scanning lines 1140, the multiple lighting control lines 1150, the drive circuit 1160, the multiple signal lines 1170, and the individual circuits 1180 may be formed on the substrate 1110 by a low-temperature polysilicon (LTPS) process.

In the example, one pixel 1112 includes one individual circuit 1180 and one LED element 1120. Multiple LED elements 1120 may be included in one pixel 1112. When multiple LED elements 1120 are included in one pixel 1112, one individual circuit may correspond to multiple LED elements. Alternatively, the individual circuits 1180 may be provided for each LED element 1120 in one pixel 1112.

Figure 5:
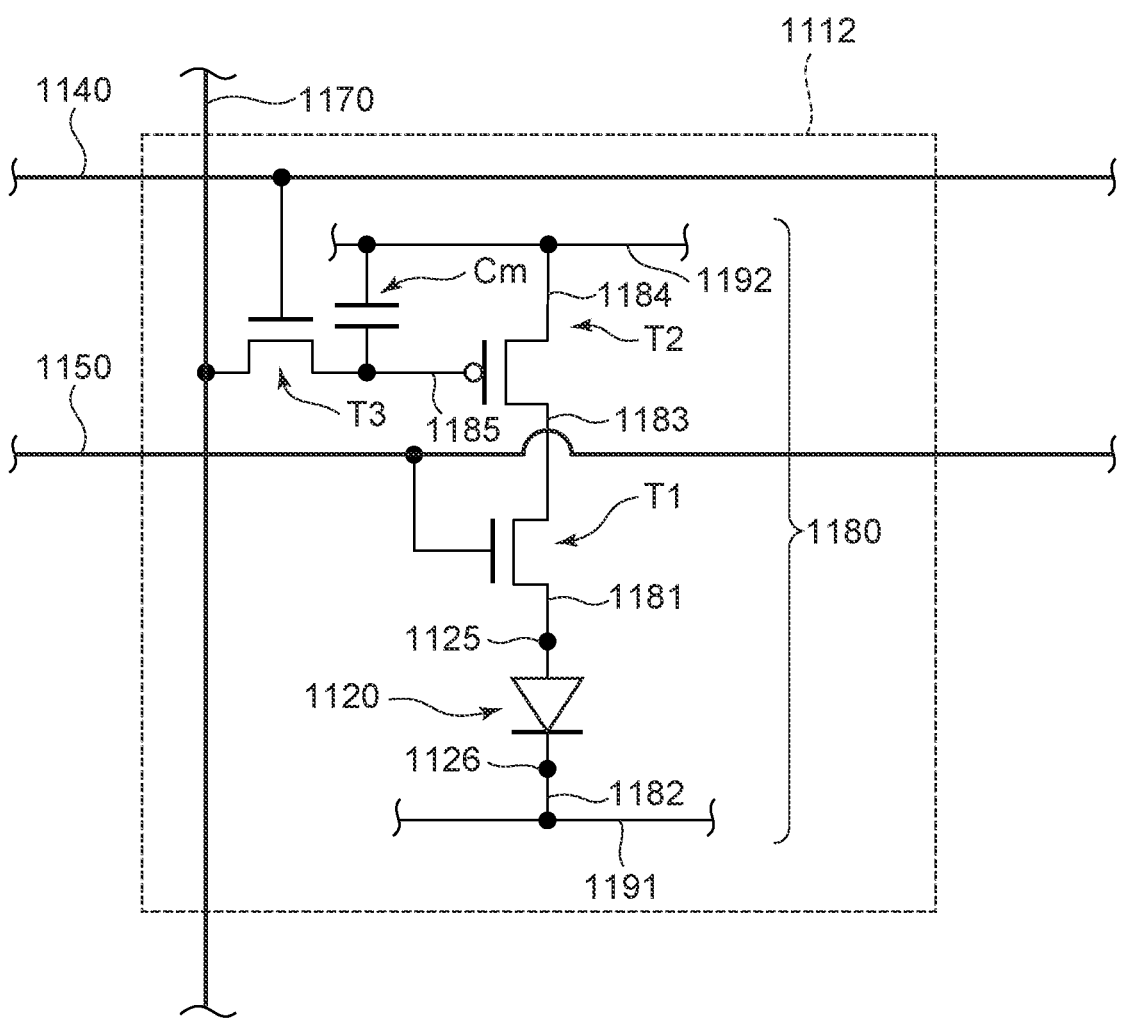
FIG. 5 is a schematic equivalent circuit diagram illustrating a portion, i.e., the display device, of the image display device according to the first embodiment.

FIG. 5 is a schematic equivalent circuit diagram illustrating a portion, i.e., the display device, of the image display device according to the first embodiment.

As shown in FIG. 5, the individual circuit 1180 includes a first transistor T1, a second transistor T2, a third transistor T3, a capacitor Cm, and multiple wiring parts 1181 to 1185. The first transistor T1 and the third transistor T3 are n-channel MOSFETs. The second transistor T2 is a p-channel MOSFET.

The cathode electrode 1126 of the LED element 1120 is electrically connected to a ground line 1191 via the wiring part 1182. For example, a voltage that is used as a reference is applied to the ground line 1191. The anode electrode 1125 of the LED element 1120 is electrically connected to the source electrode of the first transistor T1 via the wiring part 1181.

The gate electrode of the first transistor T1 is electrically connected to the lighting control line 1150. The drain electrode of the first transistor T1 is electrically connected to the drain electrode of the second transistor T2 via a wiring part 1183. The source electrode of the second transistor T2 is electrically connected to a power supply line 1192 via a wiring part 1184. A sufficiently higher voltage than the voltage used as the reference is applied to the power supply line 1192. Although not illustrated, a DC power supply is connected to the power supply line 1192 and the ground line 1191, and a positive DC voltage with respect to the reference voltage applied to the ground line 1191 is applied between the power supply line 1192 and the ground line 1191.

The gate electrode of the second transistor T2 is electrically connected to the drain electrode of the third transistor T3 via the wiring part 1185. The source electrode of the third transistor T3 is electrically connected to the signal line 1170. The gate electrode of the third transistor T3 is electrically connected to the scanning line 1140.

The wiring part 1185 is electrically connected to one terminal of the capacitor Cm. The other terminal of the capacitor Cm is electrically connected to the power supply line 1192.

The scanning circuit 1130 selects one row among the multiple rows 1120i and outputs an on-signal to the scanning line 1140 electrically connected to the row 1120i. As a result, the third transistors T3 of the individual circuits 1180 corresponding to the row 1120i are in a state in which the third transistors T3 can be switched on. The drive circuit 1160 outputs, to the signal lines 1170, drive signals including drive signal voltages corresponding to the set outputs of the LED elements 1120 belonging to the row 1120i. As a result, the drive signal voltages are stored in the capacitors Cm. The drive signal voltages set the second transistors T2 of the individual circuits 1180 corresponding to the row 1120i to a state in which the second transistor T2 can be switched on.

The scanning circuit 1130 outputs, to the lighting control line 1150 electrically connected to the row 1120i, a control signal that sequentially switches the first transistors T1 of the row 1120i on and off. When the first transistors T1 are in the on-state, the light emission luminances of the LED elements 1120 are controlled by currents corresponding to the drive signal voltages stored in the capacitors Cm flowing in the LED elements 1120 belonging to the row 1120i. The light emission periods of the LED elements 1120 are controlled for each row 1120i by switching the first transistors T1 on and off.

The scanning circuit 1130 sequentially switches, in the Y1-direction, the scanning line 1140 outputting the on-signal and the lighting control line 1150 outputting the control signal. Accordingly, the row 1120i that is driven is sequentially switched in the Y1-direction.

The configurations of the scanning circuit, the multiple scanning lines, the multiple lighting control lines, the drive circuit, the multiple signal lines, the multiple individual circuits, etc., are not limited to those described above. For example, the individual circuit may be made of a second transistor, a third transistor, a capacitor, and wiring parts without including a first transistor; multiple scanning lines may extend from the scanning circuit; a lighting control line may not be omitted. The scanning lines, the lighting control lines, the signal lines, the wiring parts of the individual circuits, etc., may be provided in the substrate rather than on the surface of the substrate. The electrical elements such as the transistors, capacitors, and the like included in the drive circuit may be separately manufactured and then mounted on the substrate instead of being formed on the substrate. Instead of separately manufacturing the LED elements and then mounting to the substrate, the LED elements may be formed on the substrate by using a semiconductor material such as Si or the like as the substrate. In such a case, each transistor element may be a silicon semiconductor element provided on the silicon substrate instead of a low-temperature polysilicon element provided on the glass substrate.

The display device that includes the LED element as described above is favorable in that a sufficient light emission luminance is realized with low power consumption; however, the display device is not limited thereto. Instead of an LED display using an LED element such as that described above, the display device may be an OLED display, a liquid crystal display, etc.

A configuration of the imaging element 310a will now be described in detail.

Figure 6:
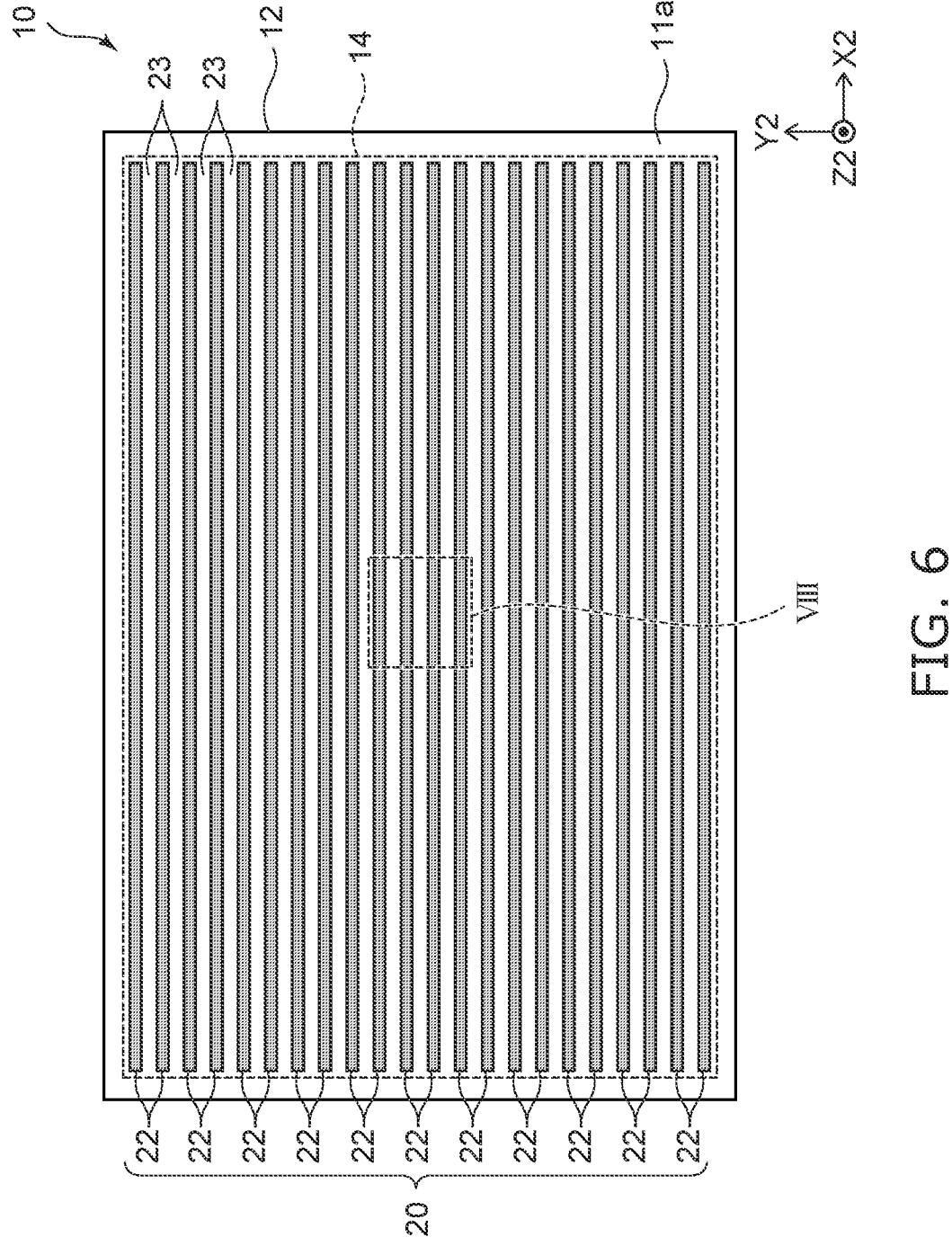
FIG. 6 is a schematic plan view illustrating a portion, i.e., an imaging element, of the image display device.

FIG. 6 is a schematic plan view illustrating a portion, i.e., the imaging element, of the image display device.

As shown in FIG. 1, the image display device 1000 according to the embodiment includes the imaging element 310a. The imaging element 310a shown in FIG. 1 is one of many variations of imaging element configurations. The following description includes the operation principle of the imaging element forming the floating image in mid-air. First, the configuration and operation of an imaging element 10 will be described.

As shown in FIG. 6, the imaging element 10 includes a base member 12 and a reflector array 20. The base member 12 includes a first surface 11a, and the reflector array 20 is provided on the first surface 11a. In the example shown in FIG. 6, the reflector array 20 is provided inside a reflector formation region 14 of the first surface 11a. The reflector array 20 includes multiple reflector rows 22. The reflector array 20 may be provided in the base member 12. That is, the reflector array 20 and the base member 12 may be formed as a continuous body. In such a case, the first surface 11a of the base member 12 is the dihedral corner reflectors of the reflector array 20 described below.

A configuration of the base member 12 will now be described.

Figure 7:
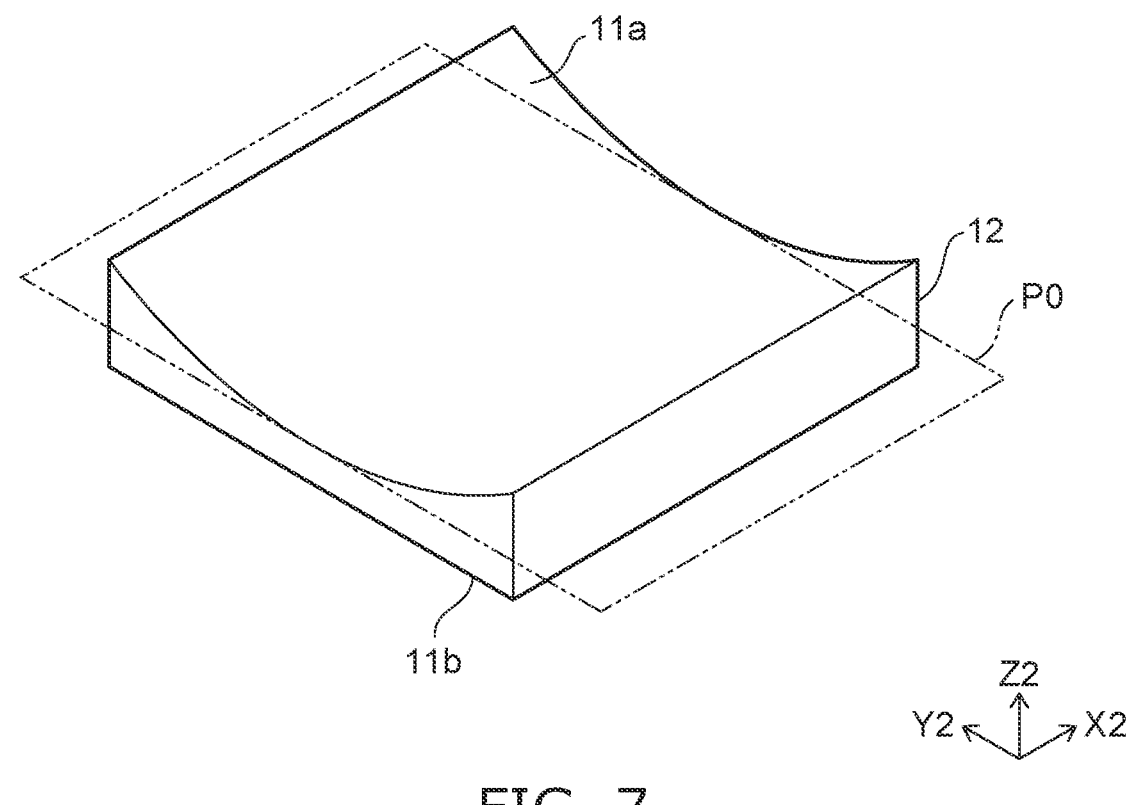
FIG. 7 is a schematic perspective view illustrating a portion, i.e., a base member, of the imaging element of FIG. 6.

FIG. 7 is a schematic perspective view illustrating a portion, i.e., the base member, of the imaging element of FIG. 6.

As shown in FIG. 7, the base member 12 includes the first surface 11a and a second surface 11b. The second surface 11b is positioned at the side opposite to the first surface 11a.

The three-dimensional orthogonal coordinate system used in the description of the imaging element may be different from the three-dimensional orthogonal coordinate system of the description of the display device 1100(S) shown in FIG. 3A, etc. The three-dimensional orthogonal coordinate system for the description of the imaging element is an orthogonal coordinate system including an X2-axis, a Y2-axis, and a Z2-axis. A direction parallel to the X2-axis may be called the "X2-direction," a direction parallel to the Y2-axis may be called the "Y2-direction," and a direction parallel to the Z2-axis may be called the "Z2-direction." The X2Y2-plane that includes the X2-axis and the Y2-axis is defined as a plane parallel to the virtual plane P0. The first surface 11a is located at the positive Z2-axis side of the second surface 11b. The first surface 11a includes a portion of a circular arc that is convex toward the negative Z2-axis side when the Y2Z2-plane is viewed in plan. In the specific example below, the virtual plane P0 is a virtual surface parallel to a tangent plane contacting a point on the circular arc positioned furthest in the negative direction of the Z2-axis.

As described above, the first surface 11a is a curved surface, and the reflector array 20 is located on the curved surface. The virtual plane P0 is used as a reference surface when setting the tilt in the Y2-axial direction of the reflector row 22. In other words, the reflector row 22 is arranged on the first surface 11a at an angle set with respect to the virtual plane P0.

The base member 12 is formed of a light-transmitting material and is formed of, for example, a transparent resin.

In the imaging element 10, when the light source is located at the first surface 11a side when referenced to the base member 12, the floating image is formed not at the second surface 11b side, but at the first surface 11a side at which the light source is located. The position at which the floating image is formed can be different from the position at which the light source is located and sufficiently separated from the position at which the light source is located.

The description continues now by returning to FIG. 6.

The reflector row 22 extends along the X2-direction. The multiple reflector rows 22 are arranged to be substantially parallel to each other along the Y2-direction. The multiple reflector rows 22 are arranged at substantially uniform spacing with a spacing 23 interposed in the Y2-direction respectively between the adjacent reflector rows 22. The length in the Y2-direction of the spacing 23 of the reflector rows 22 can be any length and can be, for example, about the length in the Y2-direction of the reflector row 22. When the light source is located at the first surface 11a side, light rays that are not reflected by the reflector rows 22, reflected light that is reflected once by the reflector row 22, and the like are incident on the region in which the spacing 23 of the reflector rows 22 is formed. Such light rays do not contribute to the floating image; therefore, the ratio of the light rays incident on the imaging element 10 that contribute to the floating image decrease as the spacing 23 increases. Therefore, the length in the Y2-direction of the spacing 23 is set to an appropriate length according to the efficiency of the reflecting surfaces, the dimensions of the dihedral corner reflector described below with reference to FIG. 8, etc.

Each of the reflector rows 22 includes many dihedral corner reflectors connected in the X2-direction and is therefore shown as filled-in to avoid complexity in FIG. 6. In the example shown in FIG. 6, the imaging element 10 has a laterally-long shape in the X2-direction. This is because the shape is advantageous for binocular viewing of the floating image. The shape of the imaging element 10 when the X2Y2-plane is viewed in plan is not limited thereto, and a longitudinally-long shape in the Y2-direction may be selected according to the application.

When an image is formed in the normal direction of the first surface 311a of the imaging element 310a as in the image display device 1000 shown in FIG. 1, the spacing of the adjacent reflector rows 22 may be omitted. When the spacing of the adjacent reflector rows 22 is provided, the spacing of the reflector rows may be a reflecting surface.

Figure 8:
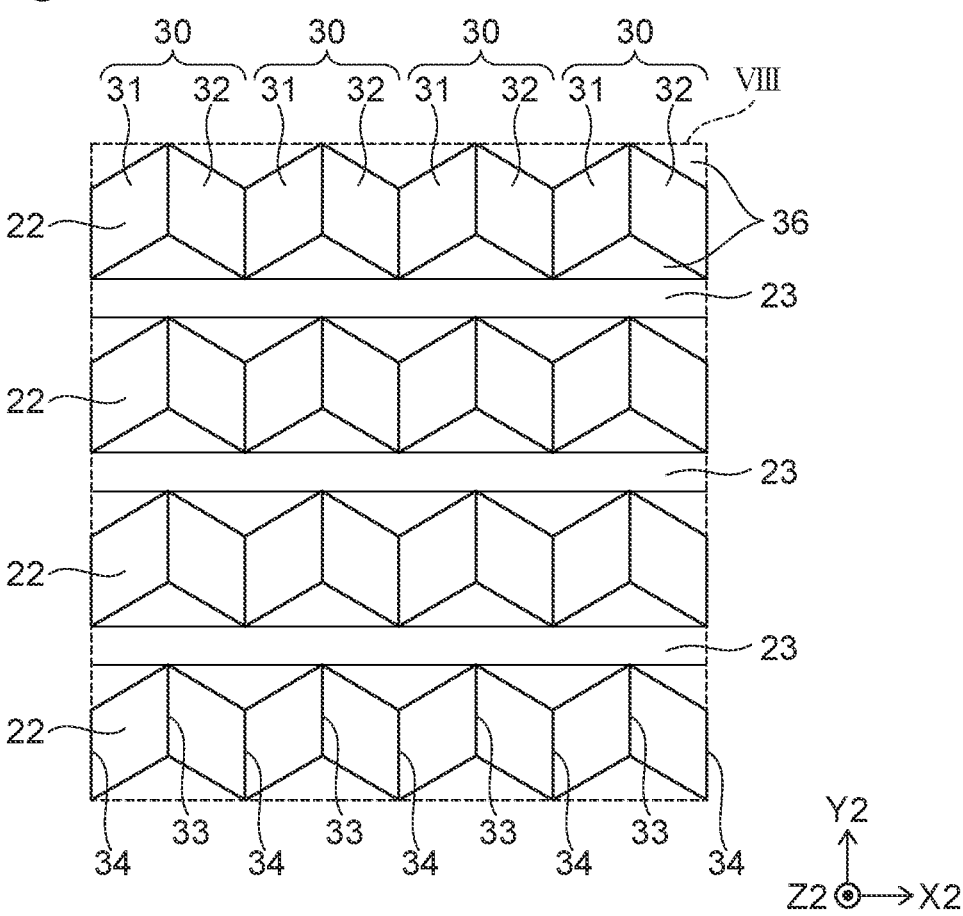
FIG. 8 is an enlarged schematic view of portion VIII of FIG. 6.

FIG. 8 is an enlarged schematic view of portion VIII of FIG. 6.

As shown in FIG. 8, the reflector row 22 includes the multiple dihedral corner reflectors 30. The multiple dihedral corner reflectors 30 are connected to each other along the X2-direction and are provided continuously. The dihedral corner reflector 30 includes the first reflecting surface 31 and the second reflecting surface 32. The dihedral corner reflector 30 is located on a base part 36 formed on the first surface 11a shown in FIG. 6. The first reflecting surface 31 and the second reflecting surface 32 each are substantially square when viewed in front-view, and the reflecting surfaces are connected to each other at one side of each of the squares so that the reflecting surfaces are substantially orthogonal to the orientation of the valley.

Hereinbelow, the connecting line between the first and second reflecting surfaces 31 and 32 of the dihedral corner reflector 30 is called a valley-side connecting line 33. The side of the first reflecting surface 31 positioned at the side opposite to the valley-side connecting line 33 and the side of the second reflecting surface 32 positioned at the side opposite to the valley-side connecting line 33 each are called hill-side connecting lines 34.

The first reflecting surface 31 of the dihedral corner reflector 30 is connected at the hill-side connecting line 34 to the second reflecting surface 32 of the dihedral corner reflector 30 adjacent at the negative X2-axis side. The second reflecting surface 32 of the dihedral corner reflector 30 is connected at the hill-side connecting line 34 to the first reflecting surface 31 of another dihedral corner reflector 30 adjacent at the positive X2-axis side. Thus, the multiple dihedral corner reflectors 30 are connected to each other along the X2-direction and are provided continuously.

In the imaging element 10 of the embodiment, the dimensions of the first and second reflecting surfaces 31 and 32 can be, for example, several μm to several hundred μm. For example, the number of integrated dihedral corner reflectors 30 is set according to the size, resolution, and the like of the image to be displayed. For example, several tens to several thousand dihedral corner reflectors 30 are integrated in one imaging element 10. For example, one thousand dihedral corner reflectors including 100 μm-square reflecting surfaces can be arranged over about 14 cm in the Y2-direction.

As in the enlarged view shown in FIG. 8, the reflector rows 22 of the imaging element 10 are arranged so that the positions in the X2-axial direction of the valley-side connecting line 33 and the hill-side connecting line 34 are respectively the same. This arrangement is not limited thereto; the positions in the X2-axial direction of the valley-side connecting line 33 and the hill-side connecting line 34 may be shifted between the reflector rows 22.

Figure 9A:
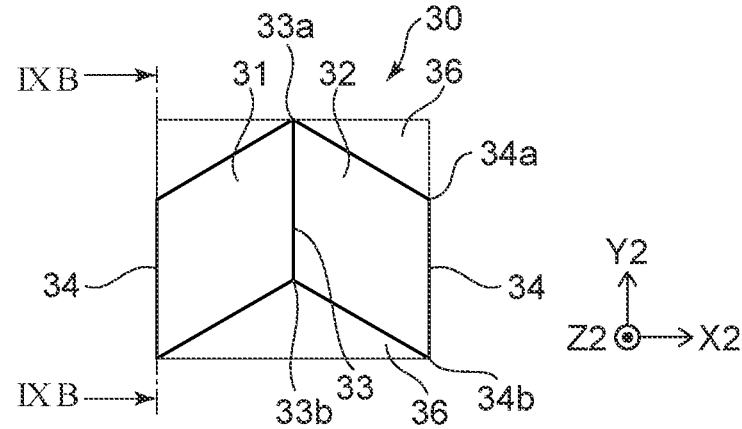
FIG. 9A is a schematic plan view illustrating a portion, i.e., a dihedral corner reflector, of the imaging element of FIG. 8.

FIG. 9A is a schematic plan view illustrating a portion, i.e., the dihedral corner reflector, of the imaging element of FIG. 8.

Figure 9B:
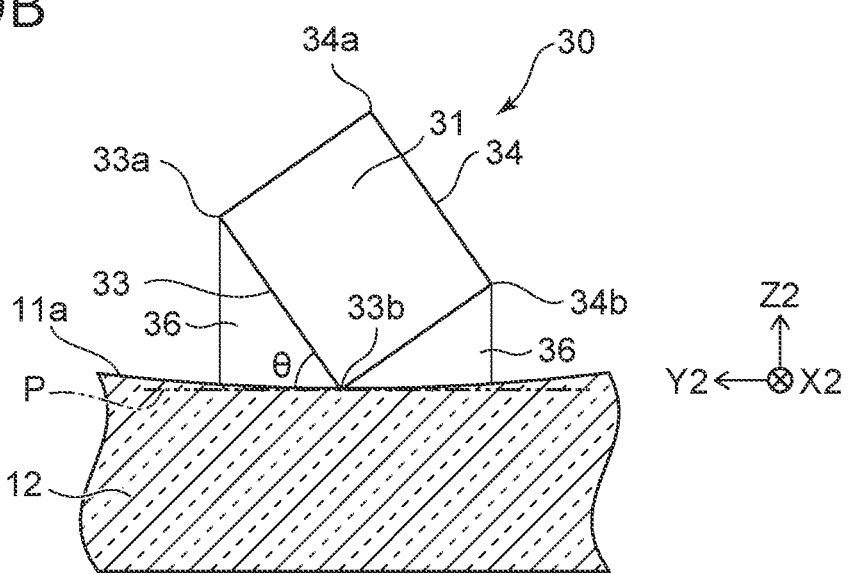
FIG. 9B is an example of a schematic auxiliary cross-sectional view along line IXB-IXB of FIG. 9A.

FIG. 9B is an example of a schematic auxiliary cross-sectional view along line IXB-IXB of FIG. 9A.

As shown in FIGS. 9A and 9B, the dihedral corner reflector 30 includes the first reflecting surface 31 and the second reflecting surface 32, and the first reflecting surface 31 and the second reflecting surface 32 are located on the base part 36. The base part 36 is arranged so that the first reflecting surface 31 and the second reflecting surface 32 have the desired angle with respect to a tangent plane P of the first surface 11a.

The base part 36 is formed in a V-shaped configuration, is formed of a light-transmitting member such as, for example, a transparent resin, and is formed as a continuous body with the base member 12. The first reflecting surface 31 and the second reflecting surface 32 are formed by thin film formation of a light-reflective metal material or the like at the formation location of the V-shape of the base member 12. The formation is not limited to such an example; each or a portion of the first reflecting surface 31, the second reflecting surface 32, the base part 36, and the base member 12 may be formed separately, and assembled as one to form the imaging element 10. For example, mirror finishing or the like of the surface of the transparent resin is performed, and the first reflecting surface 31 and the second reflecting surface 32 can be used as-is as the surface of the transparent resin when the surface reflectance of the transparent resin is sufficiently high. It is favorable for the spacing 23 and/or the base part 36 to be light-transmissive or light-absorbing to prevent false image observation, etc.

The dihedral corner reflector 30 may be formed as follows. The first reflecting surface 31 and the second reflecting surface 32 are formed in the surface of the transparent resin. The first reflecting surface 31 and the second reflecting surface 32 that are formed are exposed in air and arranged so that light incident from the surface opposite to the surface at which the first reflecting surface 31 and the second reflecting surface 32 are formed. As a result, the first reflecting surface 31 and the second reflecting surface 32 can function as total reflection surfaces due to the refractive index difference between the transparent resin and the air.

The first reflecting surface 31 and the second reflecting surface 32 are connected at the valley-side connecting line 33 to be substantially orthogonal. The hill-side connecting line 34 of the first reflecting surface 31 is positioned at the side opposite to the valley-side connecting line 33, and the hill-side connecting line 34 of the second reflecting surface 32 is positioned at the side opposite to the valley-side connecting line 33.

The end portions of the valley-side connecting line 33 are called vertices 33a and 33b. The position of the vertex 33a is further toward the positive Z2-axis side than the position of the vertex 33b. That is, the vertex 33a is positioned to be more distal to the base member 12 than the vertex 33b. The end portions of the hill-side connecting line 34 are called vertices 34a and 34b. The position of the vertex 34a is further toward the positive Z2-axis side than the position of the vertex 34b. That is, the vertex 34a is positioned to be more distal to the base member 12 than the vertex 34b. Accordingly, the vertex 34a is positioned to be furthest from the base member 12, and the vertex 33b is positioned to be most proximate to the base member 12.

FIG. 9B shows the relationship between the dihedral corner reflector 30, the first surface 11a, and the tangent plane P. The dihedral corner reflector 30 contacts the first surface 11a at the vertex 33b at the lower side of the valley-side connecting line 33. The tangent plane P contacts the first surface 11a at the position of the vertex 33b. The dihedral corner reflector 30 is located on the first surface 11a so that the valley-side connecting line 33 forms an angle θ with the tangent plane P.

Figure 9C:
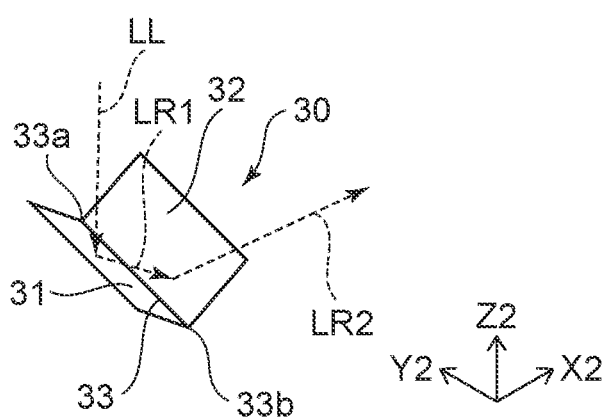
FIG. 9C is a schematic perspective view for describing an operation of the dihedral corner reflector of FIG. 9A.
Figure 9D:
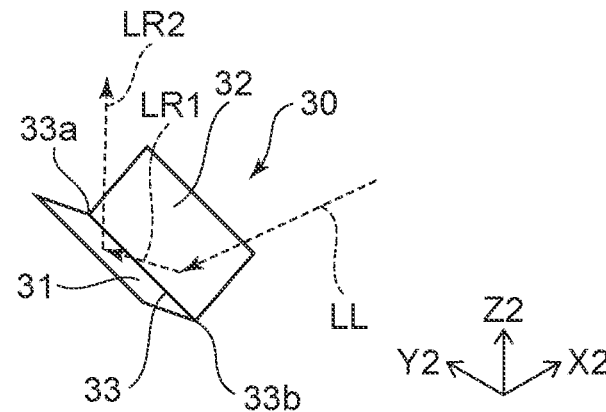
FIG. 9D is a schematic perspective view for describing an operation of the dihedral corner reflector of FIG. 9A.

FIGS. 9C and 9D are schematic perspective views for describing the operation of the dihedral corner reflector of FIG. 9A.

As shown in FIG. 9C, when a light ray LL is incident on the first reflecting surface 31, the light ray LL is reflected by the first reflecting surface 31. A once-reflected light LR1 that is reflected by the first reflecting surface 31 is re-reflected by the second reflecting surface 32. A twice-reflected light LR2 that is reflected by the second reflecting surface 32 is emitted toward the same side as the light source of the incident light. Thus, the dihedral corner reflector 30 emits the incident light from the first surface 11a side toward a different position from the light source at the first surface 11a side. Thus, the dihedral corner reflector 30 reflects the light twice by two reflecting surfaces, and reflects the twice-reflected light LR2 toward the side from which the incident light ray LL traveled.

The reflection operation of the dihedral corner reflector 30 is reversible. When the light ray that is incident on the dihedral corner reflector 30 is incident along the opposite direction along the twice-reflected light LR2 in FIG. 9C, the light ray is reflected in the opposite direction along the incident light ray LL. Specifically, as shown in FIG. 9D, the light ray LL that is incident on the dihedral corner reflector 30 is reflected by the second reflecting surface 32 and incident on the first reflecting surface 31 as the once-reflected light LR1. The once-reflected light LR1 is reflected by the first reflecting surface 31 and emitted as the twice-reflected light LR2.

As shown in FIGS. 8 and 9A, the dihedral corner reflector 30 is line-symmetric with respect to the valley-side connecting line 33, and is positioned so that the angle of the first reflecting surface 31 with respect to the tangent plane P is substantially equal to the angle of the second reflecting surface 32 with respect to the tangent plane P. Therefore, when the light ray is initially incident on the first reflecting surface 31, the dihedral corner reflector 30 emits the reflected light by an operation similar to when the light ray is initially incident on the second reflecting surface 32. For example, in FIG. 9C, the light ray LL is initially incident on the first reflecting surface 31 and reflected by the first reflecting surface 31; however, the operation of the dihedral corner reflector 30 can be similar to the description described above even when the light ray LL is initially incident on the second reflecting surface 32 and reflected by the second reflecting surface 32. In FIG. 9D, the light ray LL may be initially incident on the first reflecting surface 31, and the once-reflected light from the first reflecting surface 31 may be reflected by the second reflecting surface 32 and emitted as the second reflected light. Unless otherwise noted in the description of the operation of the imaging element hereinbelow, the case where the light ray LL is initially reflected by the first reflecting surface 31 will be described.

Figure 10:
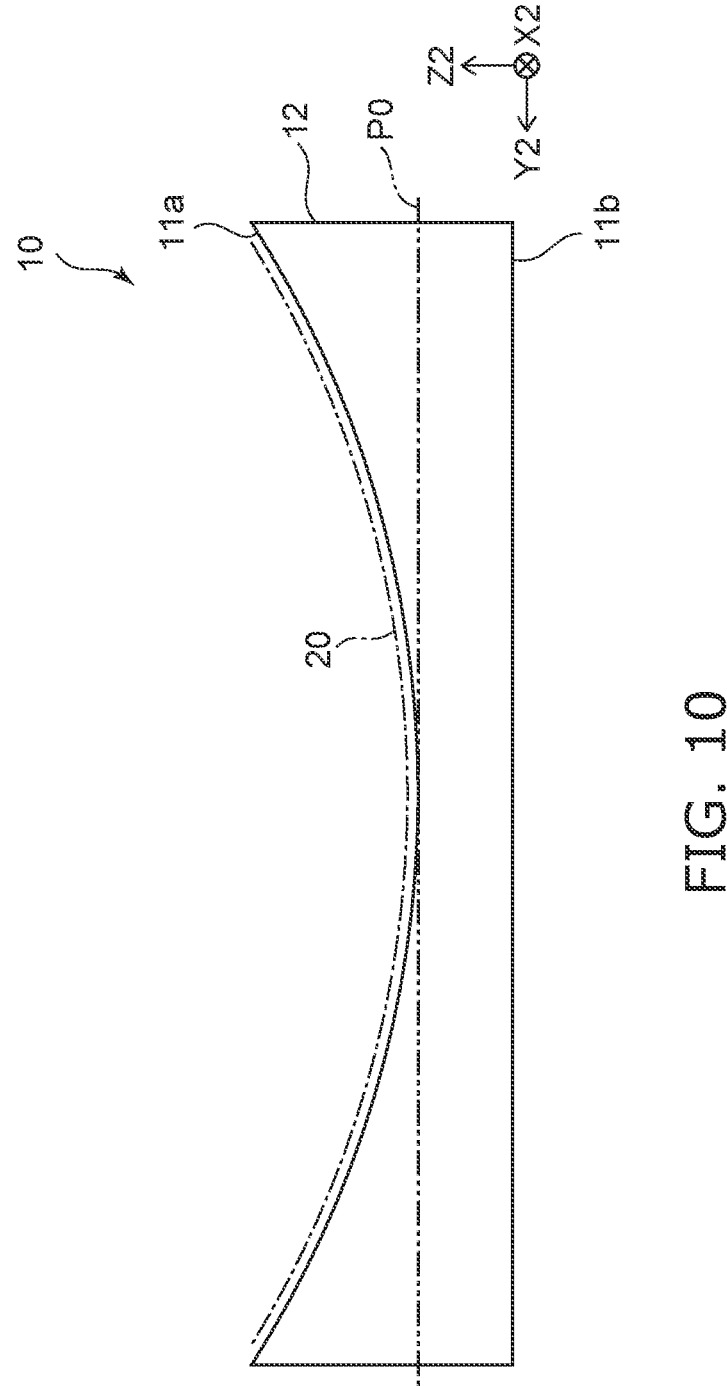
FIG. 10 is a schematic side view illustrating the imaging element of FIG. 6.

FIG. 10 is a schematic side view illustrating the imaging element of FIG. 6.

In FIG. 10, the reflector array 20 is shown by an envelope connecting the vertices 33a of the dihedral corner reflectors 30 shown in FIGS. 9A and 9B. In side views illustrating the imaging element hereinbelow, the reflector array 20 is illustrated by illustrating the envelope of the vertices 33a of the dihedral corner reflectors 30 as a single dot-dash line as shown in FIG. 10 unless it is necessary to show and describe the configuration of the dihedral corner reflector 30.

In the imaging element 10 as shown in FIG. 10, the reflector array 20 is provided in a curved shape because the first surface 11a is a curved surface. The first surface 11a includes a portion of a circular arc that is convex toward the negative Z2-axis side when the Y2Z2-plane is viewed in plan; the reflector array 20 also is provided in an arc-like shape, and the envelope of the vertices also is a circular arc. The radius of the circular arc is set based on the distance between the imaging element 10 and the light source provided at the first surface 11a side of the imaging element 10. For example, the radius of the circular arc of the reflector array 20 is set to about 2 times the distance between the imaging element 10 and the light source.

As described with reference to FIGS. 9C and 9D, the imaging element 10 is reversible with respect to the incidence and reflection directions of the light ray. When the incidence and reflection directions of the imaging element 10 are reversed, the radius of the circular arc is set based on the distance between the imaging element 10 and the floating image formed at the first surface 11a side. Similarly to the description described above, the radius of the circular arc of the reflector array 20 is set to about 2 times the distance between the imaging element 10 and the floating image.

In the imaging element 10, the tangent plane that contacts the first surface 11*a* at the lowest position in the negative Z2-axis side direction is the virtual plane P0 that is parallel to the XY-plane.

Figure 11:
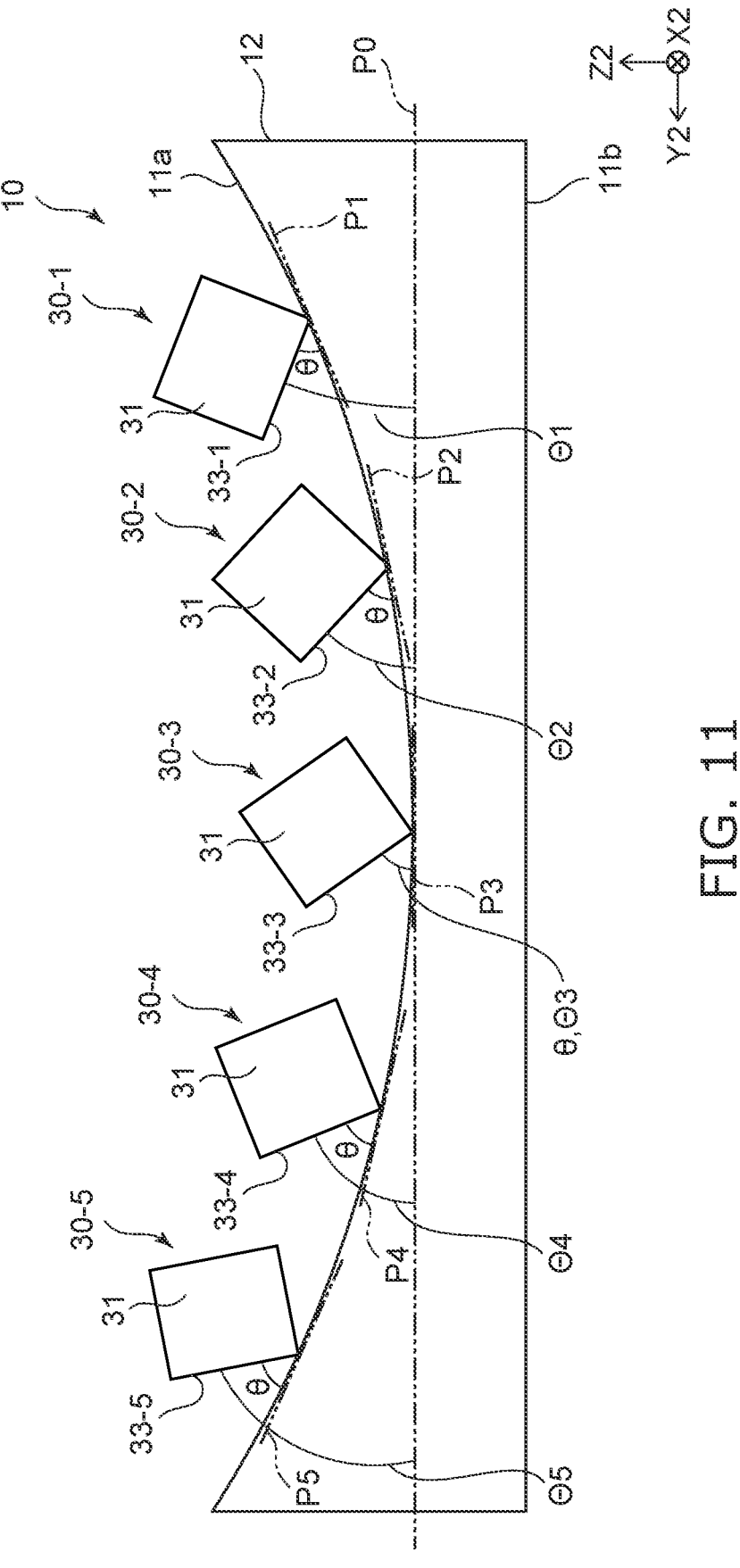
FIG. 11 is a schematic side view illustrating the imaging element of FIG. 6.

FIG. 11 is a schematic side view illustrating the imaging element of FIG. 6.

FIG. 11 shows one dihedral corner reflector included in the reflector rows 22 shown in FIGS. 6 and 8. As described with reference to FIGS. 6 and 8, the multiple reflector rows 22 each extend along the X2-direction and are arranged at substantially uniform spacing in the Y2-direction. The angles of the multiple dihedral corner reflectors included in one reflector row 22 with respect to the virtual plane P0 are substantially the same. Accordingly, the angle of the dihedral corner reflector 30 with respect to the virtual plane P0 refers to the angle with respect to the virtual plane P0 of the reflector row 22 to which the dihedral corner reflector 30 belongs.

FIG. 11 is an enlarged schematic illustration of five dihedral corner reflectors 30-1 to 30-5 among the many dihedral corner reflectors arranged in the Y2-direction. Although different reference numerals are used to differentiate the positions in the Y2-axis, the configurations of the dihedral corner reflectors 30-1 to 30-5 are the same as that of the dihedral corner reflector 30 described with reference to FIGS. 9A and 9B. The base part 36 shown in FIG. 9B is not illustrated to avoid complexity in the illustration.

As shown in FIG. 11, the dihedral corner reflectors 30-1 to 30-5 have different angles Θ1 to Θ5 with respect to the virtual plane P0 according to the positions in the Y2-axis along the first surface 11*a*. The angles Θ1 to Θ5 of the dihedral corner reflectors 30-1 to 30-5 are illustrated by the angles of the valley-side connecting lines (straight lines) 33-1 to 33-5 with respect to the virtual plane P0.

In the example shown in FIG. 11, the dihedral corner reflectors 30-1 to 30-5 are arranged in this order in the positive direction of the Y2-axis. The angles Θ1 to Θ5 of the dihedral corner reflectors 30-1 to 30-5 are set to increase in this order. That is, the sizes of the angles θ1 to Θ5 are set to Θ1<Θ2<Θ3<Θ4<Θ5.

More generally, when referenced to the reflector row (a first reflector row) 22 of the dihedral corner reflector set to the smallest value, the angles Θ1 to Θ5 of the dihedral corner reflectors 30-1 to 30-5 increase away from the reflector row 22 in one direction along the Y2-axis. Also, the angles Θ1 to Θ5 decrease away from the reference reflector row 22 in the other direction along the Y2-axis. In the example of FIG. 11, when the position of the dihedral corner reflector 30-1 set to the smallest angle is used as the reference, the sizes of the angles Θ1 to Θ5 are Θ1<Θ2<Θ3<Θ4<Θ5 in the positive direction of the Y2-axis.

The angles Θ1 to Θ5 of the dihedral corner reflector can be set so that 0°<Θ1 to the Θ5<90°. Although the angles between the first reflecting surface 31 and the virtual plane P0 are determined according to the angles Θ1 to Θ5, 45°<(the angle between the first reflecting surface 31 and the virtual plane P0)<90° can be set. The angle between the second reflecting surface 32 and the virtual plane P0 is equal to the angle between the first reflecting surface 31 and the virtual plane P0. Accordingly, 45° <(the angle between the second reflecting surface 32 and the virtual plane P0)<90° can be set.

The tilts of the dihedral corner reflectors 30-1 to 30-5 also may be set using the angles with respect to tangent planes P1 to P5 of the first surface 11*a* at which the dihedral corner reflectors 30-1 to 30-5 are located. The angles of the dihedral corner reflectors 30-1 to 30-5 with respect to the tangent planes P1 to P5 are set to a constant angle θ regardless of the positions of the dihedral corner reflectors 30-1 to 30-5 in the Y2-axis. For example, the angle θ is based on the angle between the horizontal plane and each reflecting surface of a corner cube reflector and is set to about 30°, and more specifically, 35.30.

In the imaging element 10 of the example, when referenced to the base member 12, the angles Θ1 to Θ5 of the dihedral corner reflectors 30-1 to 30-5 are appropriately set so that the light rays incident from the light source provided at the first surface 11*a* side are imaged at the first surface 11*a* side. The imaging position is at a different mid-air position from the light source. The angles of the dihedral corner reflectors with respect to the virtual plane P0 are determined by, for example, experiments, simulations, etc.

The angles of the dihedral corner reflectors with respect to the virtual plane P0 are set to increase according to the position in the Y2-axis, or are set to decrease according to the position in the Y2-axis; therefore, the first surface 11*a* need not be a portion of a circular arc of a perfect circle. For example, the first surface 11*a* may be a portion of an arc of an ellipse, or may be a portion of a polygon corresponding to the number of reflector rows. It is sufficient to be able to set the angles of the dihedral corner reflectors according to the positions of the dihedral corner reflectors in the Y2-axis; therefore, the angles of the dihedral corner reflectors may be referenced to another plane having any angle with respect to the virtual plane P0 without using the virtual plane P0 as a reference.

Modifications of the imaging element will now be described.

Figure 12A:
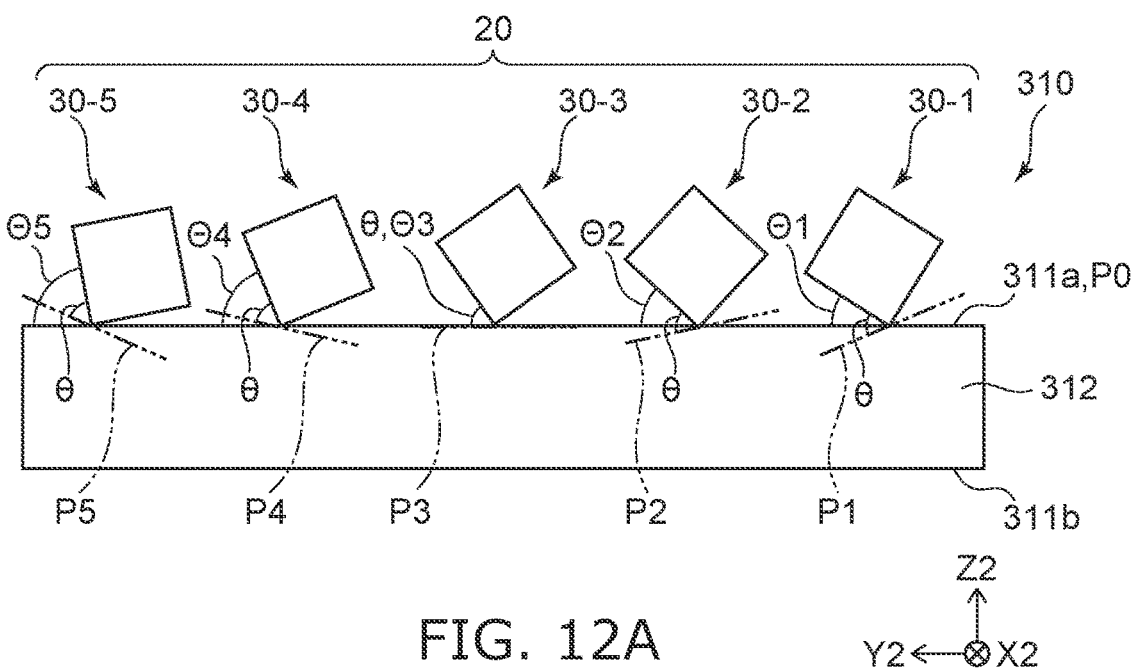
FIG. 12A is a schematic side view illustrating a portion, i.e., a modification of the imaging element, of the image display device according to the first embodiment.

FIG. 12A is a schematic side view illustrating a portion, i.e., a modification of the imaging element, of the image display device according to the first embodiment.

Figure 12B:
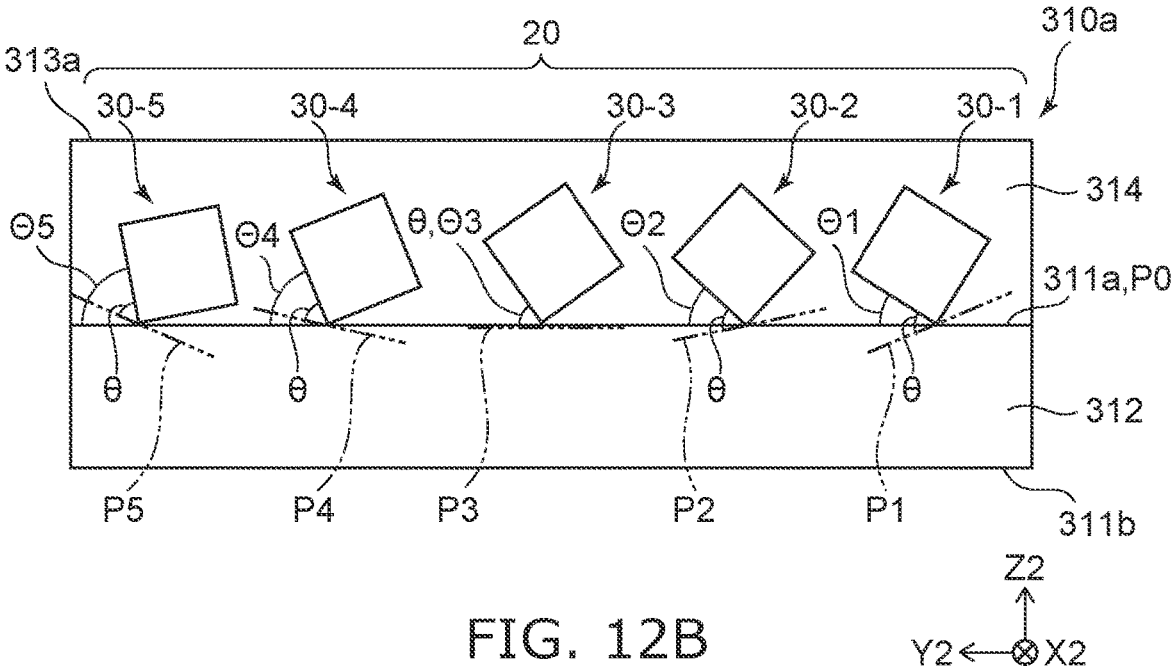
FIG. 12B is a schematic side view illustrating a portion, i.e., another modification of the imaging element, of the image display device according to the first embodiment.

FIG. 12B is a schematic side view illustrating a portion, i.e., another modification of the imaging element, of the image display device according to the first embodiment.

As long as the angles of the dihedral corner reflectors with respect to the virtual plane P0 can be set similarly to the imaging element 10 shown in FIG. 6, the reflector array 20 need not be formed on a curved surface, and may be provided on one plane.

Similarly to the description with reference to FIG. 11, FIGS. 12A and 12B are enlarged schematic illustrations of the five dihedral corner reflectors 30-1 to 30-5. The five dihedral corner reflectors 30-1 to 30-5 and their tilts corresponding to their positions are shown.

As shown in FIG. 12A, an imaging element 310 of the modification includes the reflector array 20 and a base member 312. The base member 312 includes the first surface 311*a* and a second surface 311*b*. The second surface 311*b* is positioned at the side opposite to the first surface 311*a*. The first surface 311*a* is a plane substantially parallel to the X2Y2-plane. The first surface 311*a* may be the virtual plane P0. Similarly to the example shown in FIG. 11, for example, the base member 312 is formed of a light-transmitting material.

The angles of the dihedral corner reflectors 30-1 to 30-5 with respect to the virtual plane P0 are respectively Θ1 to Θ5, and the sizes of the angles Θ1 to Θ5 are Θ1<Θ2<Θ3<Θ4<Θ5. The positions of the dihedral corner reflectors 30-1 to 30-5 in the Y2-axis are the same as the positions of the dihedral corner reflectors 30-1 to 30-5 in the Y2-axis shown in FIG. 11. Accordingly, for the tangent planes P1 to P5 of the circular arc corresponding to the positions in the Y2-axis of FIG. 11, the angles between the dihedral corner reflectors 30-1 to 30-5 and the tangent planes P1 to P5 all have the same value of the angle θ.

As shown in FIG. 12B, the imaging element 310a of the modification includes the reflector array 20 and the base member 312, and further includes a protective layer 314. The configurations of the reflector array 20 and the base member 312 are the same as those of the imaging element 310 described with reference to FIG. 12A. The protective layer 314 is provided to cover the reflector array 20 and the first surface 311a.

When the light rays are incident on the imaging element 310a via the protective layer 314, the protective layer 314 includes a material having high light transmissivity so that the transmitted amount of the light rays is substantially constant. It is favorable for a surface 313a of the protective layer 314 to be sufficiently flat so that the refraction angles of the incident light rays are substantially constant.

According to the modification, the base member 312 can be a flat plate, and so the thickness of the base member necessary to make the first surface and/or the second surface into a curved surface can be reduced; therefore, the imaging elements 310 and 310a can be thinned. The imaging element 310 shown in FIG. 12A is a member in which the reflector array 20 is formed at the first surface 311a of the base member 312, and the second surface 311b has a flat surface. Therefore, production by a press using a resin base member is favorable. Also, the production of the imaging element 310 is advantageous in that production by a roll-to-roll method is easy. The roll-to-roll method is a production technique in which a base member that is wound in a roll shape is continuously supplied to the process for patterning, processing, etc. The roll-to-roll method is widely utilized in the production of plate-shaped or film-like plastic molded products, etc.

The image display device 1000 according to the embodiment includes the imaging element 310a shown in FIG. 12B. The configuration is not limited thereto; the image display device may include any of the imaging elements 10 and 310 described above. The components of the imaging elements 10, 310, and 310a can be combined as appropriate. For example, the protective layer 314 may be provided at the first surface 11a side of the imaging element 10.

The operation of the imaging element, including the operation principle, will now be described. Unless otherwise noted hereinbelow, the imaging element 10 described with reference to FIGS. 6 to 11 will be described. The operations of the imaging elements 310 and 310a of the modifications can be understood similarly to the imaging element 10.

Figure 13:
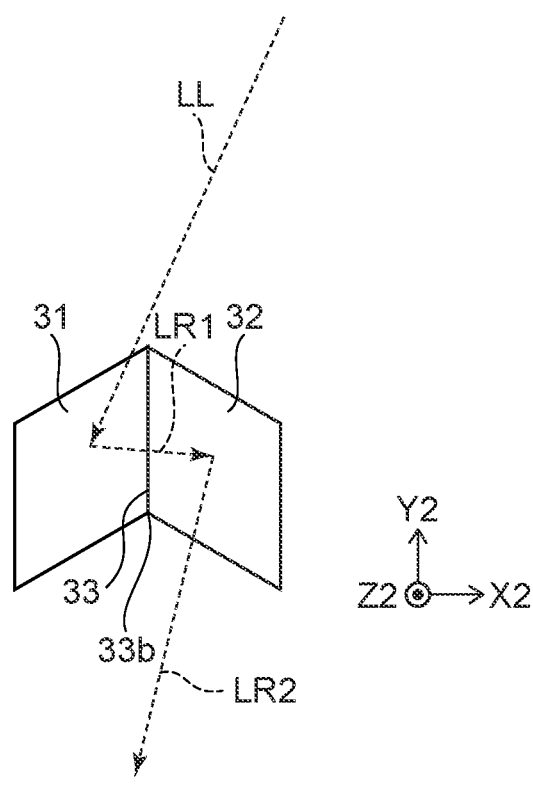
FIG. 13 is a schematic plan view for describing a portion, i.e., an operation of the imaging element, of the image display device according to the first embodiment.

FIG. 13 is a schematic plan view for describing a portion, i.e., an operation of the imaging element, of the image display device according to the first embodiment.

As shown in FIG. 13, the first reflecting surface 31 and the second reflecting surface 32 are provided to be substantially orthogonal and connected at the valley-side connecting line 33. The vertex 33b is provided to have a minimum value in the Z2-axis direction.

The light ray LL that is incident on the first reflecting surface 31 is reflected by the first reflecting surface 31. The once-reflected light LR1 that is reflected by the first reflecting surface 31 is reflected by the second reflecting surface 32. Unlike a corner cube reflector (e.g., Patent Literature 2), the dihedral corner reflector 30 does not include a third reflecting surface; therefore, the twice-reflected light LR2 that is reflected by the second reflecting surface 32 travels straight as-is. Here, the valley-side connecting line 33 is provided at a prescribed angle with respect to the X2Y2-plane; therefore, the twice-reflected light LR2 that is emitted from the dihedral corner reflector 30 is emitted toward the same side as the side at which the light ray LL is incident.

Figure 14:
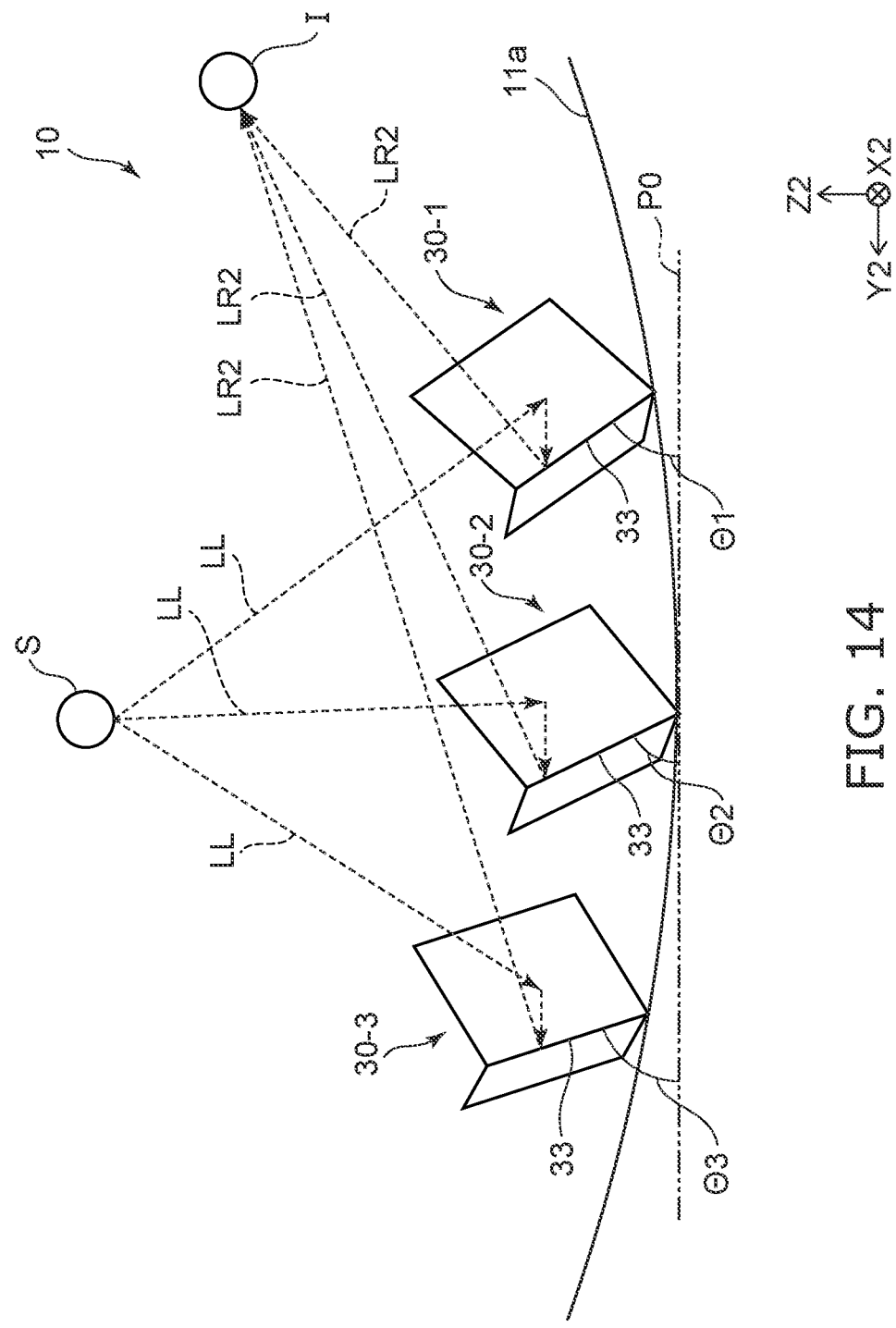
FIG. 14 is a schematic side view for describing a portion, i.e., an operation of the imaging element, of the image display device according to the first embodiment.
Figure 15:
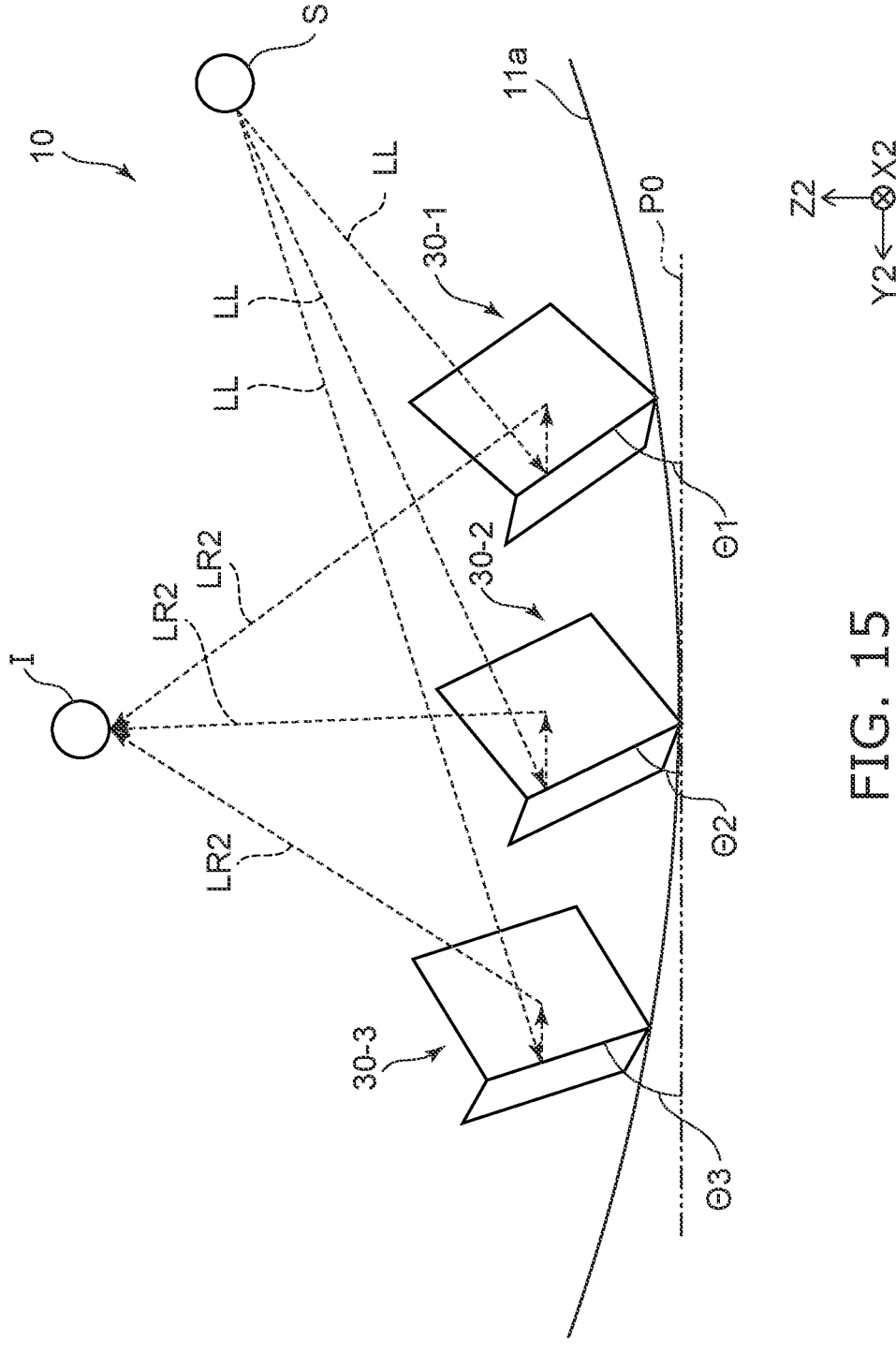
FIG. 15 is a schematic side view for describing a portion, i.e., an operation of the imaging element, of the image display device according to the first embodiment.

FIGS. 14 and 15 are schematic side views for describing a portion, i.e., an operation of the imaging element, of the image display device according to the first embodiment.

In the example of FIG. 14, a light source S is located in the normal direction of the virtual plane P0 at the first surface 11a side. In the imaging elements 310 and 310a of the modifications shown in FIGS. 12A and 12B, the light source is located in the normal direction of the first surface 311a at the first surface 311a side.

In the imaging element 10 as shown in FIG. 14, the first surface 11a is set to be a portion of a circular arc that is convex toward the negative Z2-axis side when projected onto the YZ-plane. The dihedral corner reflectors 30-1 to 30-3 are located on the first surface 11a. In the example shown in FIG. 14, the angles Θ1 to Θ3 that indicate the tilts of the dihedral corner reflectors 30-1 to 30-3 with respect to the virtual plane P0 are set to increase in the positive direction of the Y2-axis. Thus, by setting the angles Θ1 to Θ3, the twice-reflected light LR2 that is reflected twice by the dihedral corner reflector 30 forms a floating image I at the first surface 11a side at which the light source S is provided.

The imaging element 10 operates even when the position of the light source S and the position of the floating image I are interchanged.

In FIG. 15, the configurations of the dihedral corner reflectors 30-1 to 30-3 and the relationship of the dihedral corner reflectors 30-1 to 30-3, the first surface 11a, and the virtual plane P0 are the same as those described with reference to FIG. 14.

As shown in FIG. 15, the light source S is located at the position of the floating image I described with reference to FIG. 14; in such a case, the floating image I is formed at the position of the light source S in FIG. 14. The light rays LL that are emitted from the light source S each are reflected twice by the dihedral corner reflectors 30-1 to 30-3, and the twice-reflected light LR2 forms a floating image at the position of the floating image I. That is, in the example shown in FIG. 15, the floating image I is formed in the normal direction of the virtual plane P0 at the first surface 11a side. In the case of the imaging elements 310 and 310a according to the modification shown in FIGS. 12A and 12B, the floating image is formed in the normal direction of the first surface 311a at the first surface 311a side.

When the light source S is at either position, the angles of the dihedral corner reflectors can be appropriately set by using experiments, simulations, etc., to form the floating image at the desired position by reflecting the light ray incident on the dihedral corner reflector twice. For example, according to the embodiment shown in FIG. 14, the light source S is set to be substantially directly above the reflector array; according to the embodiment shown in FIG. 15, the position at which the floating image I is formed is set to be substantially directly above the reflector array. It is also possible to appropriately modify the positions of the light source S and the floating image I by appropriately adjusting the angles of the dihedral corner reflectors with respect to the virtual plane P0. When making such a design modification, ray analysis tools such as ray tracing simulation, etc., can be effectively utilized.

In the image display device 1000 according to the embodiment, the floating image is formed directly above the reflector array. In such a case as well, it is possible to interchange the position of the display device 1100(S), which is the light source, and the position at which the floating image I is formed. For the image display device 1000 of FIG. 1, it goes without saying that if the position of the display device 1100(S) and the position at which the floating image is formed are interchanged, it is necessary to modify the configurations of the housing and the light-transmitting member according to the optical path after interchanging.

An operation of the image display device 1000 according to the embodiment will now be described. The image display device 1000 operates according to a control system described below.

Figure 16:
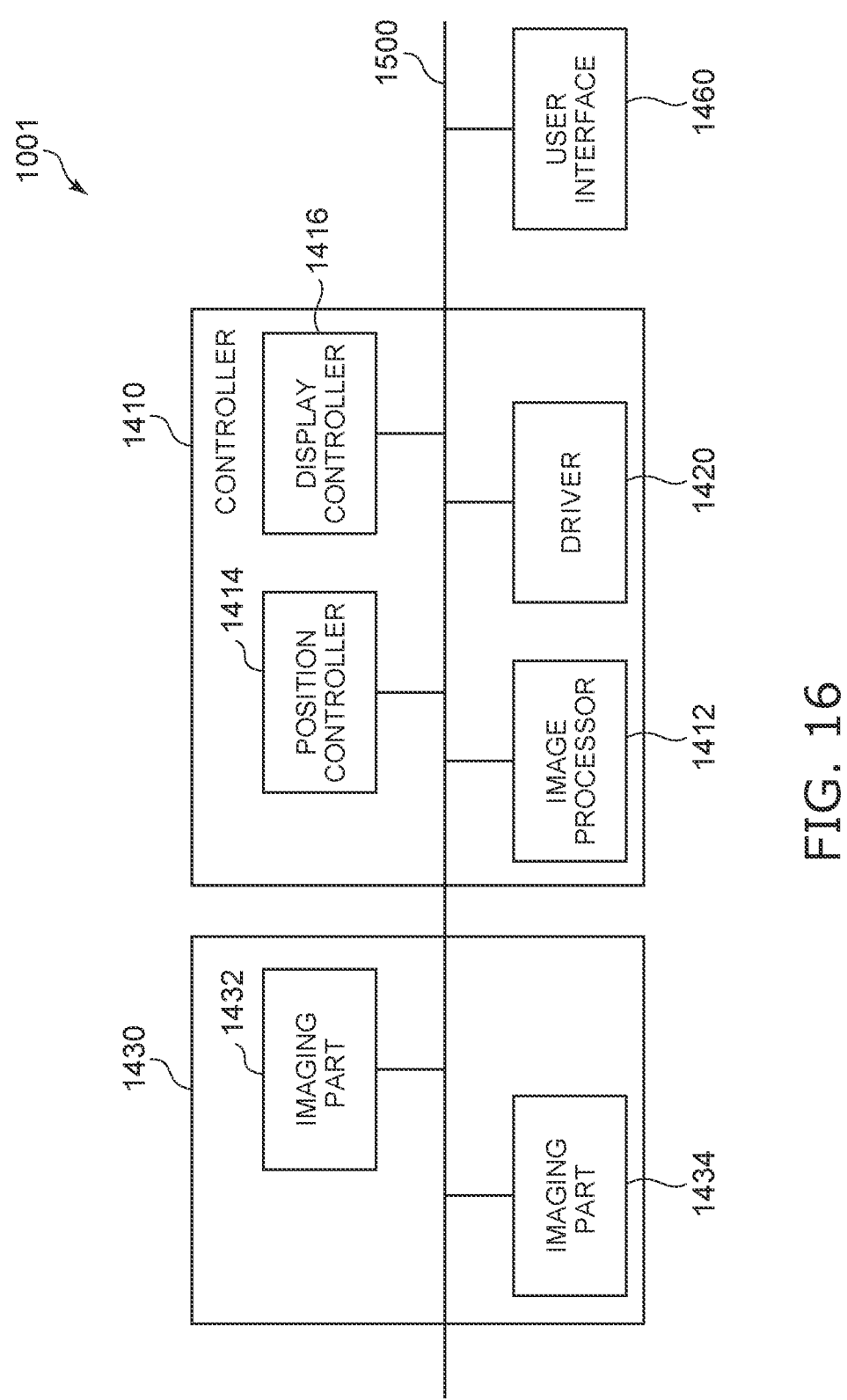
FIG. 16 is an example of a schematic block diagram illustrating a control system of the image display device according to the first embodiment.

FIG. 16 is an example of a schematic block diagram illustrating a control system of the image display device according to the first embodiment.

As shown in FIG. 16, the control system 1001 of the image display device 1000 includes a detecting part 1430, the controller 1410, and a user interface 1460. The detecting part (the first detecting part) 1430 includes the imaging parts 1432 and 1434. The controller 1410 includes an image processor 1412, a position controller 1414, the display controller 1416, and a driver 1420.

The imaging parts 1432 and 1434, the image processor 1412, the position controller 1414, the display controller 1416, the driver 1420, and the user interface 1460 are communicatably connected via a communication network 1500. The communication network 1500 is, for example, an automotive ethernet, etc.

The imaging part 1432 is at least one camera imaging the image I1 observed by the observer O1. The imaging part 1432 generates image data (the first image data) including information related to the image I1 observed by the observer O1. The imaging part 1432 transmits the generated image data to the image processor 1412.

The imaging part 1434 is at least one camera imaging the outside scene in the direction in which the vehicle 1 travels. The imaging part 1434 generates image data (third image data) including information related to the outside scene in the direction in which the vehicle 1 travels. The imaging part 1434 transmits the generated image data to the image processor 1412.

The image processor 1412 detects the position of the image I1 by performing image processing of the image data generated by the imaging part 1432. The image processor 1412 transmits the detected information of the position of the image I1 to the position controller 1414. The image processor 1412 extracts the light parameter of the image I1 by performing image processing of the image data generated by the imaging part 1432. The image processor 1412 transmits the extracted information of the light parameter of the image I1 to the display controller 1416. The image processor 1412 extracts the light parameter of the outside scene in the travel direction of the vehicle 1 by performing image processing of the image data generated by the imaging part 1434. The image processor 1412 transmits the extracted information of the light parameter of the outside scene to the display controller 1416.

The position controller 1414 includes information of the formation position which is the position at which the image I1 is formed. The formation position is preset. The position controller 1414 calculates the difference between the preset formation position of the image I1 and the position of the image I1 detected in the image data generated by the imaging part 1432, and generates a drive signal so that the difference approaches 0. The position controller 1414 transmits the generated drive signal to the driver 1420.

Based on the received drive signal, the driver 1420 adjusts the position at which the display device 1100(S) is located and adjusts the angle of the light emitted by the display device 1100(S). The driver 1420 includes, for example, an articulated arm adapted to six-axis control, and adjusts the position and angle of the display device 1100(S) by adjusting the angle and rotation angle of each joint.

The display controller 1416 includes the reference value of the light parameter of the image I1. The reference value is preset. The display device 1100(S) corrects the preset reference value by using the light parameter of the outside scene extracted from the image data generated by the imaging part 1434. For example, when the output of the light among the parameters of the light of the outside scene is large, the display controller 1416 corrects the reference value to a larger value. The correction value for the light parameter of the outside scene is, for example, preset in a table or a functional form, and is stored in a not-illustrated storage part. The display controller 1416 performs feedback control so that the light parameter of the image I1 acquired by the imaging part 1432 tracks the corrected reference value.

The user interface 1460 is a switch, a lever, or the like for the observer and/or the passenger to operate the image display device. The user interface 1460 is not limited to a mechanical switch or the like, and may be a touch panel-type, or may be realized by voice recognition and/or a mid-air image formed in mid-air. The observer O1 operates the switch, etc., to transmit a signal corresponding to the operation to the controller 1410. For example, the observer O1 may operate a switch to switch between displaying and not displaying the image I1, and the observer O1 may operate a lever to modify the display position of the image I1. The user interface 1460 is not limited to operating the information related to the position at which the image I1 is formed, and may operate the information related to the light parameter of the image I1.

Figure 17:
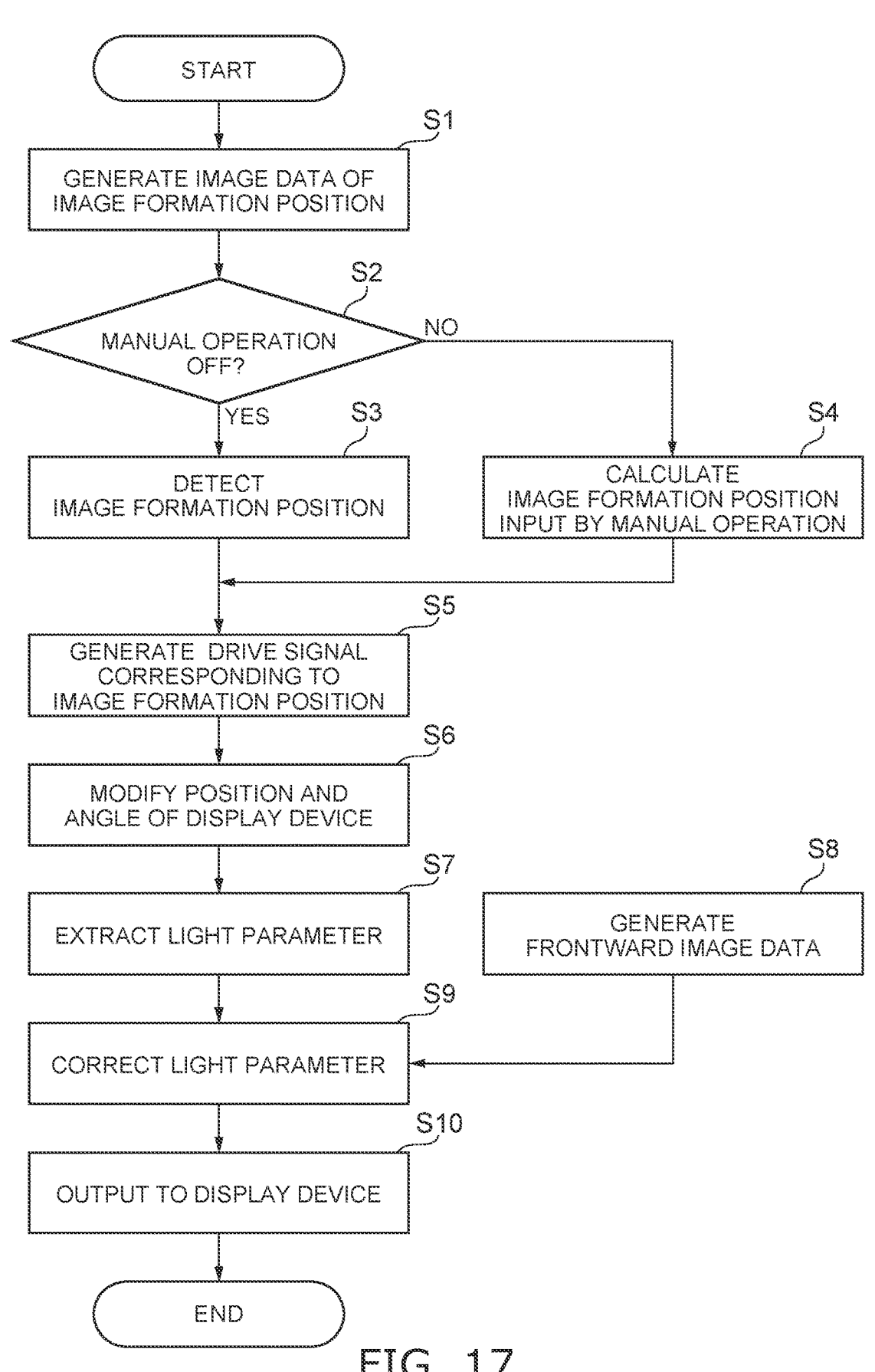
FIG. 17 is an example of a flowchart for describing an operation of the image display device according to the first embodiment.

FIG. 17 is an example of a flowchart for describing an operation of the image display device according to the first embodiment.

The flowchart of FIG. 17 illustrates a series of procedures in which the image display device 1000 adjusts the position of the image I1 observed by the observer O1 and adjusts the light parameter of the image I1.

In step S1 as shown in FIG. 17, the imaging part 1432 images the image I1 observed by the observer O1 and generates image data of a prescribed format.

In step S2, the position controller 1414 monitors the presence or absence of an interruption from the user interface 1460. When there is no interruption from the user interface 1460, the controller 1410 determines that there was no manual operation by the observer O1, and causes the processing to transition to step S3.

In step S3, the image processor 1412 performs image analysis of the image data generated by the imaging part 1432 and detects the position at which the image I1 is formed. The image processor 1412 transmits the information of the position of the image I1 to the position controller 1414.

When there is an interruption from the user interface 1460 in step S2, the position controller 1414 calculates the formation position of the image I1 from the manual operation in step S4. The position controller 1414 causes the processing to transition to step S5.

In step S5, the position controller 1414 generates a drive signal so that the detected position of the image I1 becomes the preset reference position. The position controller 1414 transmits the generated drive signal to the driver 1420.

In step S6, the driver 1420 modifies the position and angle of the display device 1100(S) according to the drive signal received from the position controller 1414.

In step S7, the image processor 1412 extracts the light parameter of the image I1 observed by the observer O1 from the image data generated by the imaging part 1432.

In step S8, the imaging part 1434 images the outside scene frontward of the observer O1 and generates image data of the prescribed format.

In step S9, the image processor 1412 extracts the light parameter of the outside scene by performing image analysis of the image data generated by the imaging part 1434. The image processor 1412 transmits the extracted parameter of the light to the display controller 1416.

The display controller 1416 uses the light parameter based on the image data of the outside scene to correct the preset reference value related to the light parameter. The display controller 1416 performs feedback control of the light parameter so that the light parameter of the image I1 generated by the imaging part 1432 tracks the corrected reference.

The light parameter of the outside scene may abruptly fluctuate when the vehicle 1 enters a tunnel or exists a tunnel, when street lights are consecutively arranged and cause repetition of bright and dark due to the street lights, etc. In such a case, if the light parameter of the image I1 is caused to track the corrected reference value in real time, the observer O1 may observe an abrupt parameter fluctuation as flicker, which may cause discomfort to the observer O1. Therefore, when the light parameter of the image I1 is caused to track the corrected reference value, it is favorable for the tracking to be smooth enough not to be perceived by the observer O1 as flicker. For example, such smooth feedback control can be realized by training a pattern of the abrupt fluctuation of the outside scene and by setting a time constant corresponding to the training results, etc.

When the light parameter of the image I1 is caused to track the corrected reference value, the reference value itself may be smoothly corrected, or the tracking of the light parameter of the image I1 may be smoothly controlled.

In step S10, the display controller 1416 transmits the light parameter generated by the feedback control to the display device 1100(S).

The series of processing of steps S1 to S10 is repeatedly performed at, for example, a constant cycle length by using the processing of steps S1 to S10 as one cycle. Even when the vehicle 1 in which the image display device 1000 is mounted vibrates, the formation position of the image I1 can be appropriately adjusted at each cycle length by appropriately setting the cycle length.

The steps of the flowchart shown in FIG. 17 are examples, and the operation of the image display device 1000 is not limited thereto. Although the control system 1001 adjusts the light parameter of the image I1 after the position of the image I1 is set in the flowchart shown in FIG. 17, the position of the image I1 may be set after the light parameter is adjusted. The control system 1001 may perform the setting of the position of the image I1 and the adjustment of the light parameter of the image I1 simultaneously in parallel.

Although the position of the image I1 is set by a manual operation in the flowchart shown in FIG. 17, the light parameter of the image I1 may be adjusted by a manual operation. In such a case, the observer O1 can adjust the reference value of the light parameter while observing the image I1.

The control system 1001 may be connected to another interface via the communication network 1500. For example, the other interface may generate a start signal corresponding to the start of the engine of the vehicle and generate a stop signal corresponding to the vehicle stopping, and the controller 1410 may set the position of the image I1 according to these signals. By using such an interface, the modification operation of the formation position of the image I1 can be performed when the vehicle is stopped, shaking when the detecting part 1430 images can be suppressed, and the detection accuracy of the position of the image I1 and the detection accuracy of the light parameter of the image I1 can be increased.

In the specific example above, the light parameter includes at least one of the output of the light or the chromaticity of the light, and the controller performs feedback control so that the light parameter tracks the reference value. The tracking is not limited thereto; the controller may detect an edge that is a boundary of the image by using the magnitude of the change of the luminance in the image data, and may determine whether or not the image I1 is in focus. In such a case, the image processor of the controller detects the edge of the image, and the position controller generates a drive signal to adjust the position of the display device 1100(S), etc., so that the image I1 is in focus.

Effects of the image display device 1000 according to the embodiment will now be described.

The image display device 1000 according to the embodiment includes the imaging element 310a. In the imaging element 310a as shown in FIG. 8, FIG. 12B, etc., the angles of the dihedral corner reflectors 30 with respect to the virtual plane P0 are set to be greater than 0° and less than 90°. Also, the angles of the dihedral corner reflectors 30 with respect to the virtual plane P0 are set to be different according to the position at which the dihedral corner reflector 30 is located in the Y2-axial direction, are set to increase away from the dihedral corner reflector 30 of the reference position in one direction of the Y2-axial direction, and are set to decrease away from the dihedral corner reflector 30 in the other direction of the Y2-axial direction. By such a setting, the light ray from the first surface 311a side with respect to the base member 312 can be reflected twice, and a floating image can be formed at the first surface 311a side.

In the imaging element 310a, by appropriately setting the angles of the dihedral corner reflectors 30 with respect to the virtual plane P0, the display device 1100(S) can be located at any position at the first surface 311a side with respect to the base member 312, and the image I1 can be formed at the desired position directly above the reflector array.

The image display device 1000 according to the embodiment includes the imaging parts 1432 and 1434 and the controller 1410. The imaging part 1432 acquires image data including information of the image I1. The information of the image I1 includes information of the position at which the image I1 is formed and information related to the light parameter of the image I1. The imaging part 1434 acquires image data including information of the outside scene in which the vehicle 1 travels. The information of the outside scene of the vehicle 1 includes information related to a parameter of the light of the environment around the observer O1 and the vehicle 1.

The controller 1410 detects the position of the image I1 based on the image data and performs feedback control so that the detected position becomes a preset position. Therefore, the observer O1 can observe the image I1 formed at the preset position. The controller 1410 can perform feedback control so that the light parameter of the image I1 detected based on the image data tracks a preset reference value. Therefore, the observer O1 can observe the image I1 displayed while tracking the preset light parameter. Because the preset light parameter can be set so that the desired information is displayed more accurately and clearly, the observer O1 can observe the image I1 formed using the appropriate light parameter.

The controller 1410 uses the light parameter of the surrounding environment to correct the preset reference value. The controller 1410 can perform feedback control so that the light parameter of the image I1 tracks the corrected reference value. The observer O1 observes the image I1 formed by light having the light parameter that tracks the reference value corrected using the light parameter of the surrounding environment. Therefore, the observer O1 can observe the image I1 formed by light having a light parameter that is more easily-viewable by the observer O1.

In the image display device 1000, the display device 1100(S) and the imaging element 310a are arranged to form the image I1 directly above the imaging element 310a. Therefore, according to the position at which the observer O1 views the image I1, ghosts may be visible at positions other than the position at which the image I1 is formed. In the image display device 1000 as described above, the position at which the image I1 is formed is appropriately modified and set according to the position of the observer O1; therefore, a clear and stable mid-air image can be displayed to the observer O1 as the image I1.

The display device 1100(S) can include an LED element in the pixel, and the LED element can be formed of a gallium nitride compound semiconductor. An LED element that is formed of a gallium nitride compound semiconductor can emit light of high luminance with low power consumption. Therefore, a clear image can be displayed in mid-air even when the light emitted from the display device 1100(S) travels along a long optical path.

Second Embodiment

Figure 18:
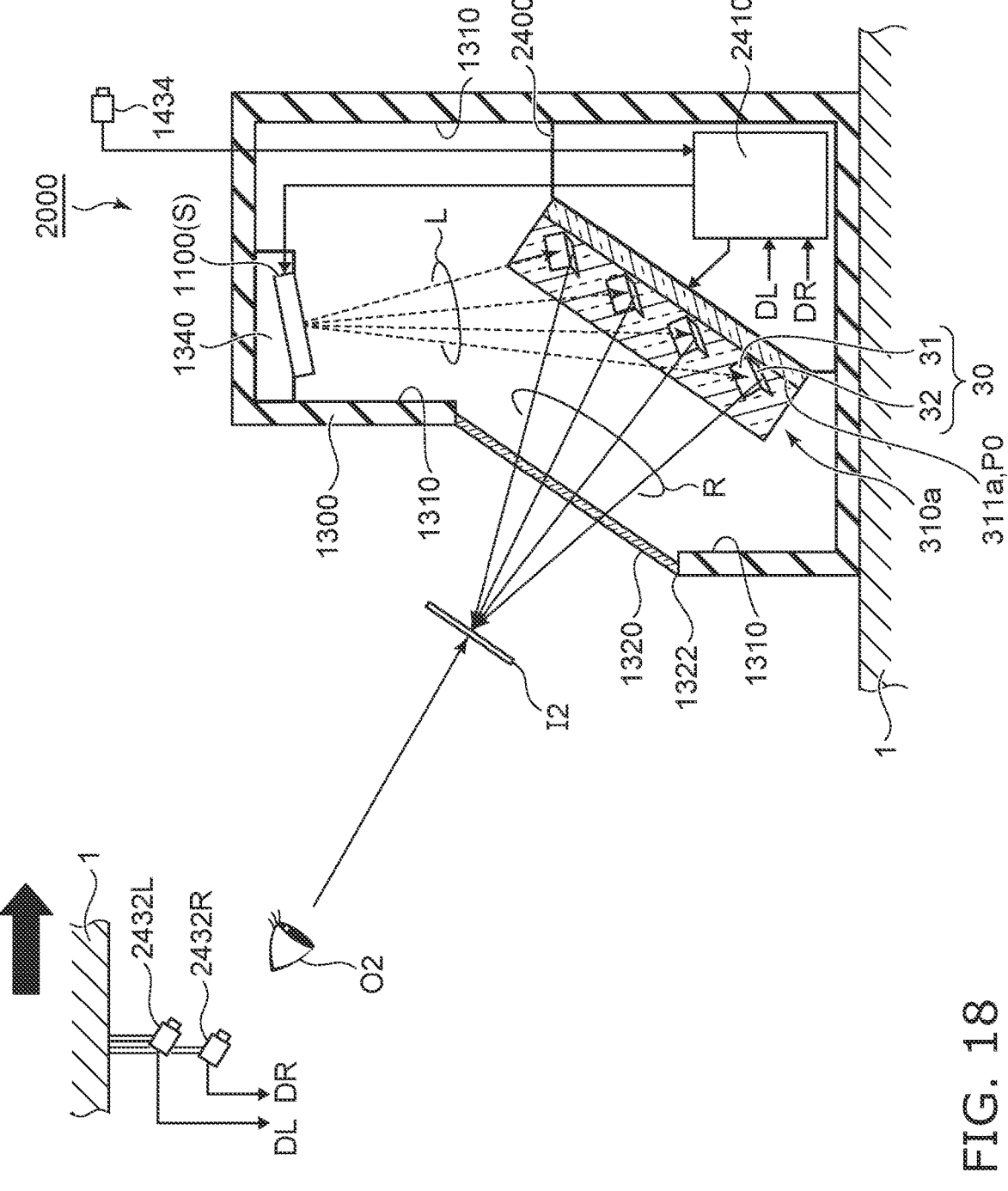
FIG. 18 is a schematic cross-sectional view illustrating an image display device according to a second embodiment.

FIG. 18 is a schematic cross-sectional view illustrating an image display device according to a second embodiment.

As shown in FIG. 18, the image display device 2000 according to the embodiment includes the imaging element 310a, the display device 1100(S), imaging parts 2432L, 2432R, and 1434, and a controller 2410. The image display device 2000 includes the controller 2410 that is different from the controller 1410 of the image display device 1000 according to the first embodiment. The image display device 2000 also differs from the image display device 1000 according to the first embodiment in that the multiple imaging parts 2432L and 2432R are included. Otherwise, the image display device 2000 has the same configuration as the image display device 1000 according to the first embodiment. The same components are marked with the same reference numerals, and a detailed description is omitted as appropriate.

In the image display device 2000, similarly to the image display device 1000 shown in FIG. 1, the display device 1100(S), the imaging element 310a, and the controller 2410 are located inside the housing 1300. Similarly to the image display device 1000, the light-shielding member 1310 is located at the interior wall of the housing 1300. The display device 1100(S) is located in a display device mounting part 1340 located at the upper portion inside the housing 1300, and the imaging element 310a is located at the lower portion inside the housing 1300. The controller 2410 is located inside a control device 2400. The control device 2400 is located at the lower portion of the housing 1300.

The light L that is emitted by the display device 1100(S) is incident on the imaging element 310a, and the imaging element 310a emits the reflected light R in the normal direction of the virtual plane P0 and the first surface 311a of the imaging element 310a. The imaging element 310a is located on the case of the control device 2400 and is supported by the case so that the direction in which the reflected light R is emitted is maintained.

In the image display device 2000 according to the embodiment, the controller 2410 sets the position at which an image 12 is formed by six-axis control of the imaging element 310a.

The six-axis control of the imaging element 310a will now be described.

Figure 19:
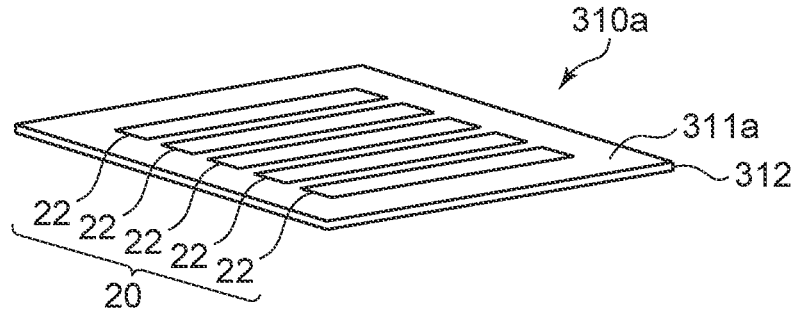
FIG. 19 is a schematic view for describing a portion, i.e., a range of movement of an imaging element, of the image display device according to the second embodiment.
Figure 19:
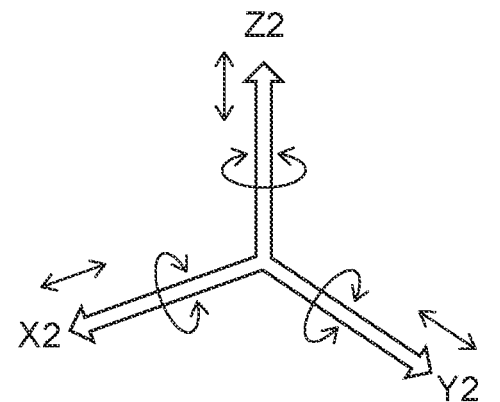

FIG. 19 is a schematic view for describing a portion, i.e., a range of movement of the imaging element, of the image display device according to the second embodiment.

As shown in FIG. 19, the imaging element 310a is controlled in six axes by the controller 2410 and is movable with six degrees of freedom. For example, the controller 2410 that is adapted to six-axis control includes an articulated arm, and the imaging element 310a is located at the tip of the articulated arm.

Specifically, as a first degree of freedom, the imaging element 310a is movable in a direction parallel to the X2-axis. As a second degree of freedom, the imaging element 310a is movable in a direction parallel to the Y2-axis. As a third degree of freedom, the imaging element 310a is movable in the Z2-axial direction. By having the first to third degrees of freedom, the imaging element 310a can be moved to any position in X2Y2Z2-coordinate space.

As a fourth degree of freedom, the imaging element 310a is rotatable around the X2-axis. As a fifth degree of freedom, the imaging element 310a is rotatable around the Y2-axis. As a sixth degree of freedom, the imaging element 310a is rotatable around the Z2-axis. The first surface 311a of the imaging element 310a can face any direction, and the image 12 can be formed by reflecting the reflected light R in any direction.

Because the image display device 2000 includes the controller 2410 that is adapted to six-axis control, the imaging element 310a can emit the reflected light R toward any position in any direction. By performing six-axis control of the imaging element 310a, the image display device 1000 can form the image 12 at the desired position in mid-air by using the imaging element 310a to reflect the light L emitted from the display device 1100(S).

The description continues now by returning to FIG. 18.

As shown in FIG. 18, the imaging parts 2432L and 2432R are located above and backward of an observer O2 to image the image 12 observed by the observer O2. The imaging part (the second imaging part) 2432R captures the image 12 from a different position from the imaging part (the first imaging part) 2432L. For example, the imaging parts 2432L and 2432R are laterally arranged according to the parallax of the left and right eyes of the observer O2. By arranging the imaging parts 2432L and 2432R at different lateral positions, the controller 2410 can more accurately detect the position of the image 12. To accurately detect the position of the image 12 displayed in mid-air, the imaging parts are not limited to two imaging parts arranged laterally, and three or more imaging parts may be provided at appropriate positions.

The imaging parts 2432L and 2432R respectively generate image data DL and DR that include information of the image 12 observed by the observer O2. Similarly to the image display device 1000 according to the first embodiment, the information of the image 12 is information of the position of the image 12 and information of the light parameter of the image 12. The imaging parts 2432L and 2432R transmit the generated image data DL and DR to the controller 2410.

Similarly to the image display device 1000 shown in FIG. 1, the image display device 2000 is provided in a transportation vehicle such as a private automobile, etc. Similarly to the image display device 1000 according to the first embodiment, the imaging part 1434 generates image data including information of the outside scene in the direction in which the vehicle 1 travels.

An operation of the image display device 2000 according to the embodiment will now be described. The image display device 2000 operates according to a control system described below.

Figure 20:
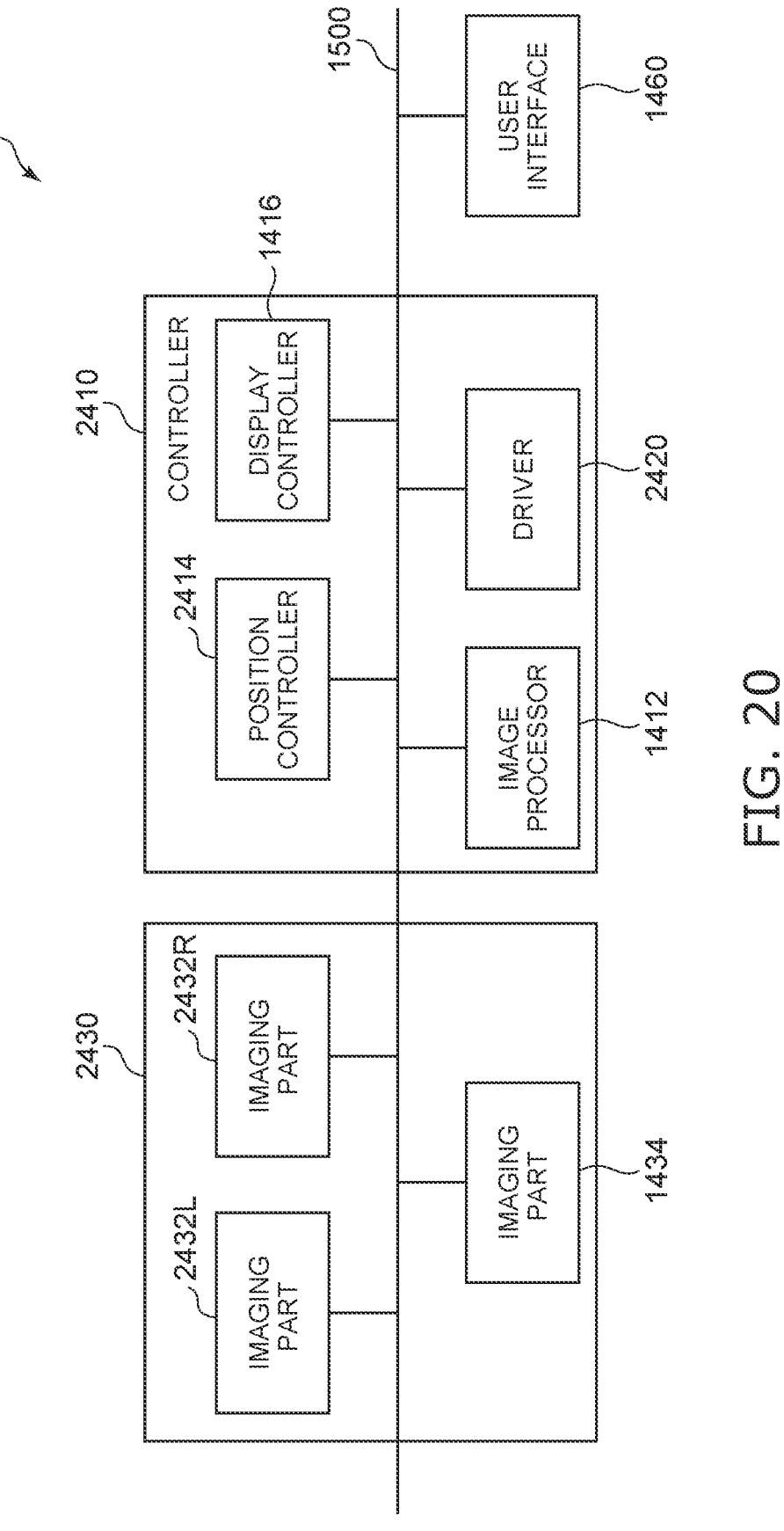
FIG. 20 is an example of a schematic block diagram illustrating a control system of the image display device according to the second embodiment.

FIG. 20 is an example of a schematic block diagram illustrating the control system of the image display device according to the second embodiment.

As shown in FIG. 20, the control system 2001 of the image display device 2000 includes a detecting part 2430, the controller 2410, and the user interface 1460. The detecting part (the first detecting part) 2430 includes the imaging parts 2432L, 2432R, and 1434. The controller 2410 includes the image processor 1412, a position controller 2414, a driver 2420, and the display controller 1416. The imaging parts 2432L, 2432R, and 1434, the image processor 1412, the position controller 2414, the driver 2420, the display controller 1416, and the user interface 1460 are communicatably connected via the communication network 1500. The observer O2 is, for example, the driver of a vehicle in which the image display device 2000 is provided. The communication network 1500 is, for example, an automotive ethernet, etc.

The imaging parts 2432L and 2432R capture the image 12 observed by the observer O2 and respectively generate image data (the first and second image data) DL and DR including information of the position of the image 12 and information of the light parameter of the image 12. The image processor 1412 detects the position of the image 12 and extracts the light parameter of the image 12 based on the image data DL and DR generated by the imaging parts 2432L and 2432R.

The position controller 2414 generates a drive signal so that the position of the image 12 detected by the image processor 1412 tracks the preset position of the image 12, and transmits the drive signal to the driver 2420. Based on the drive signal, the driver 2420 adjusts the formation position of the image 12 by six-axis control of the imaging element 310a.

The display controller 1416 performs feedback control so that the light parameter extracted from the image data generated by the imaging parts 2432L and 2432R tracks the preset reference value. Similarly to the image display device 1000 according to the first embodiment, the display controller 1416 corrects the reference value by using the light parameter of the outside scene extracted based on the image data generated by the imaging part 1434.

Effects of the image display device 2000 according to the embodiment will now be described.

The image display device 2000 according to the embodiment has effects similar to those of the image display device 1000 according to the first embodiment.

Specifically, the image display device 2000 can form the floating image 12 at an appropriate position according to the pupil position of the observer O2. Effects similar to when six-axis control of the display device 1100(S) is performed can be obtained for six-axis control of the imaging element 310a as well.

By including the multiple imaging parts 2432L and 2432R, the image display device 2000 according to the embodiment can more accurately detect the position at which the image 12 is formed. Therefore, the image display device 2000 can form the image 12 at a more appropriate position.

Similar effects can be obtained by applying the arrangement relationship of the display device 1100(S) and the imaging element 310a of the image display device 2000 to the image display device 1000 according to the first embodiment. Similar effects can be obtained by applying the arrangement relationship of the display device 1100(S) and the imaging element 310a of the image display device 2000 to the image display devices according to third to fifth embodiments described below.

It goes without saying that similar effects can be obtained by applying the multiple imaging parts included in the image display device 2000 to the image display devices according to the first embodiment and the third and fifth embodiments described below. In an image display device according to a fourth embodiment, multiple imaging parts are included in a single detecting part, and the details are described below.

Third Embodiment

Figure 21:
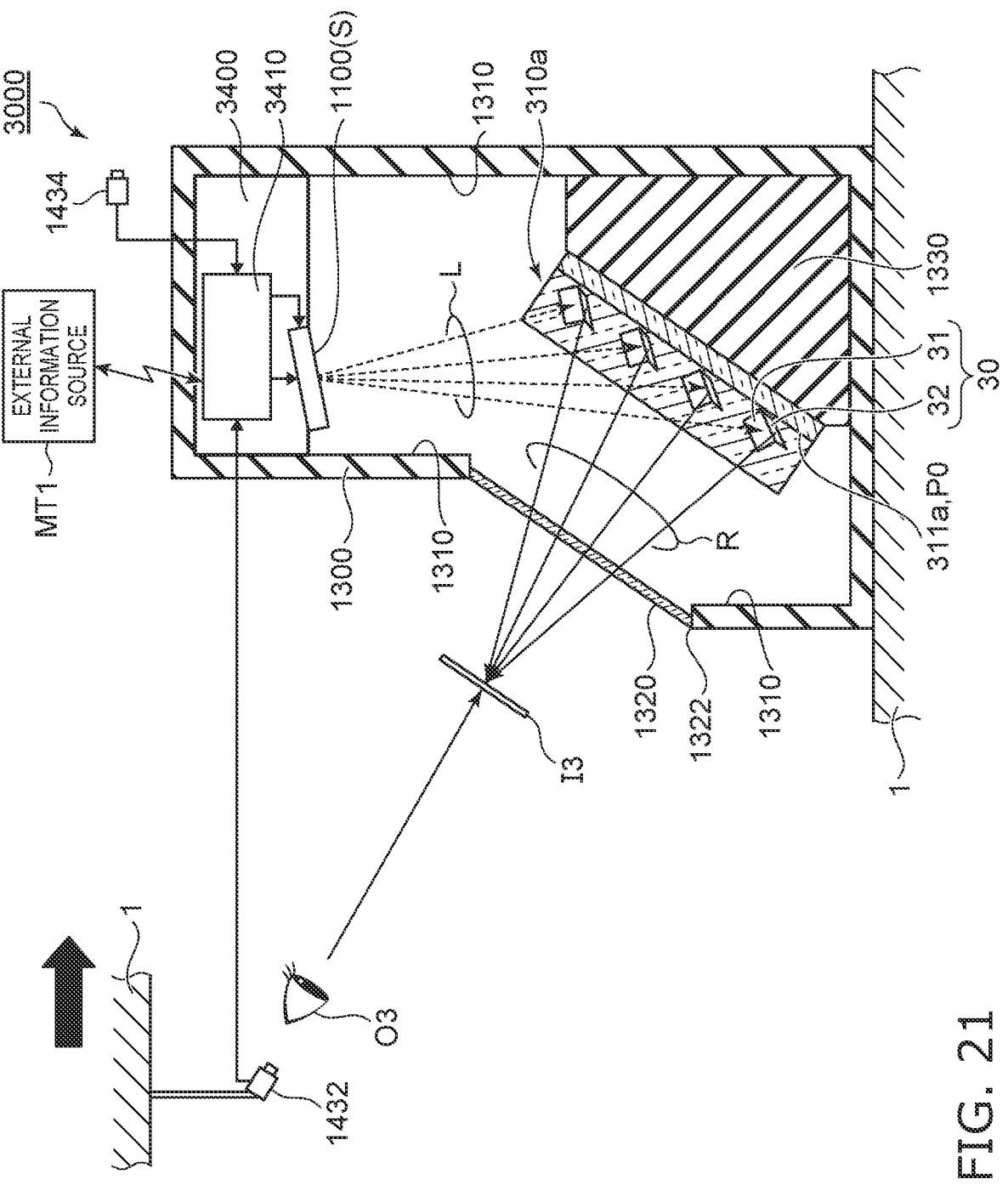
FIG. 21 is a schematic cross-sectional view illustrating an image display device according to a third embodiment.

FIG. 21 is a schematic cross-sectional view illustrating an image display device according to a third embodiment.

As shown in FIG. 21, the image display device 3000 according to the embodiment includes the imaging element 310a, the display device 1100(S), the imaging parts 1432 and 1434, and a controller 3410. The controller 3410 included in the image display device 3000 is different from the controller 1410 of the image display device 1000 according to the first embodiment. Otherwise, the components of the image display device 3000 are the same as the components of the image display device 1000 according to the first embodiment; the same components are marked with the same reference numerals, and a detailed description is omitted as appropriate.

The display device 1100(S), the imaging element 310a, and the controller 3410 are located inside the housing 1300. The controller 3410 is located inside a control device 3400 located inside the housing 1300. The controller 3410 is communicatably connected with an external information source MT1. The controller 3410 searches necessary information from the external information source MT1 and receives the searched information. The information that is received is information related to an environment that the vehicle 1 will encounter in the future such as, for example, information of the position of the vehicle 1, map information including the position, weather information at the position, etc.

The controller 3410 extracts the light parameter of the outside scene based on the image data generated by the imaging part 1434. The controller 3410 uses the weather information and the map information including the position of the vehicle 1 to predict a change of the light parameter of the outside scene, and applies the prediction to the calculation of a correction value of the light parameter. Thus, the light parameter can be corrected more flexibly by feedforward control, and an observer O3 can observe a more natural image 13.

An operation of the image display device 3000 according to the embodiment will now be described. The image display device 3000 operates according to a control system described below.

Figure 22:
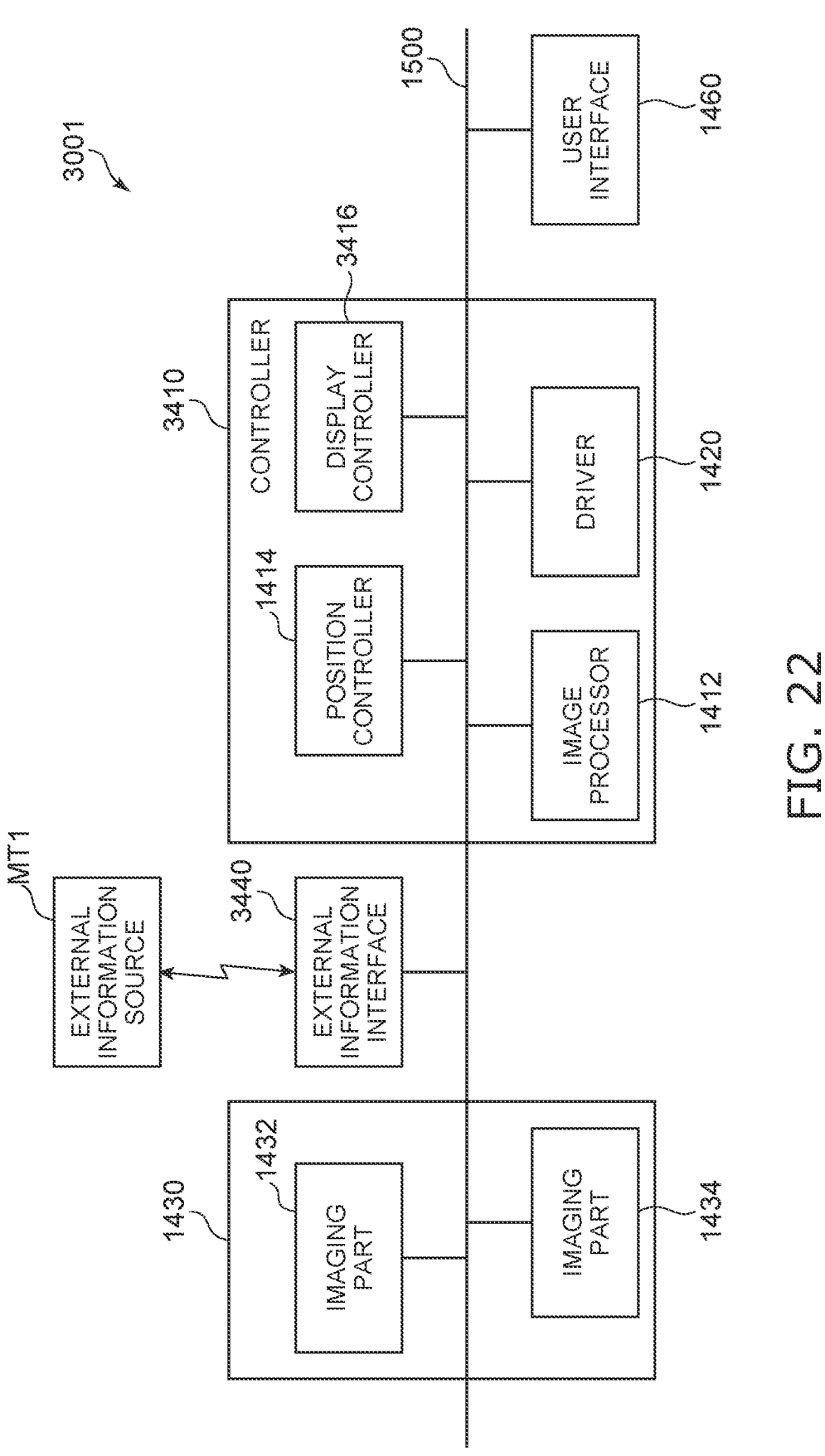
FIG. 22 is an example of a schematic block diagram illustrating a control system of the image display device according to the third embodiment.

FIG. 22 is an example of a schematic block diagram illustrating the control system of the image display device according to the third embodiment.

As shown in FIG. 22, the control system 3001 of the image display device 3000 includes the detecting part 1430, the controller 3410, and the user interface 1460. The controller 3410 includes the image processor 1412, the position controller 1414, the driver 1420, and a display controller 3416. The image processor 1412, the position controller 1414, and the driver 1420 are the same as those of the image display device 1000 according to the first embodiment, and a detailed description is omitted. The detecting part 1430 is the same as the detecting part 1430 of the image display device 1000 according to the first embodiment, and a detailed description is omitted. As described above, the detecting part 2430 described with reference to FIG. 20 is applicable instead of the detecting part 1430.

The display controller 3416 and an external information interface 3440 are communicatably connected to the communication network 1500. The external information interface 3440 is communicatably connected with the external information source MT1. The external information source MT1 is, for example, an Internet information source that provides weather information and map information based on the current position of the vehicle 1, etc. The external information source MT1 utilizes position information from GPS (Global Positioning System) to represent the current position of the vehicle 1.

The external information interface 3440 acquires the current position of the vehicle 1 by accessing the external information source MT1 as appropriate. The external information interface 3440 acquires the weather information and the map information including the current position of the vehicle 1 from the external information source MT1.

Based on the map information and the weather information acquired via the external information interface 3440 and the traveling speed of the vehicle 1, the display controller 3416 calculates a correction value for the reference value of the light parameter at each time.

For example, when it is expected that a tunnel will be entered a few minutes after the current position, the reference value of the light parameter is corrected a prescribed period of time before entering the tunnel by assuming that the brightness of the periphery will become darker. Thus, when the actual brightness abruptly changes, the brightness of the display of the image 13 observed by the observer O3 can be smoothly changed so that the change of the brightness is not delayed and so that flicker is not observed.

For example, when crossing a mountain by passing through a tunnel, according to the season, there are cases where the brightness abruptly changes due to a snow-covered road after passing through the tunnel. A reference value of the light parameter that assumes such conditions can be corrected by acquiring the weather information via the external information interface 3440.

Figure 23:
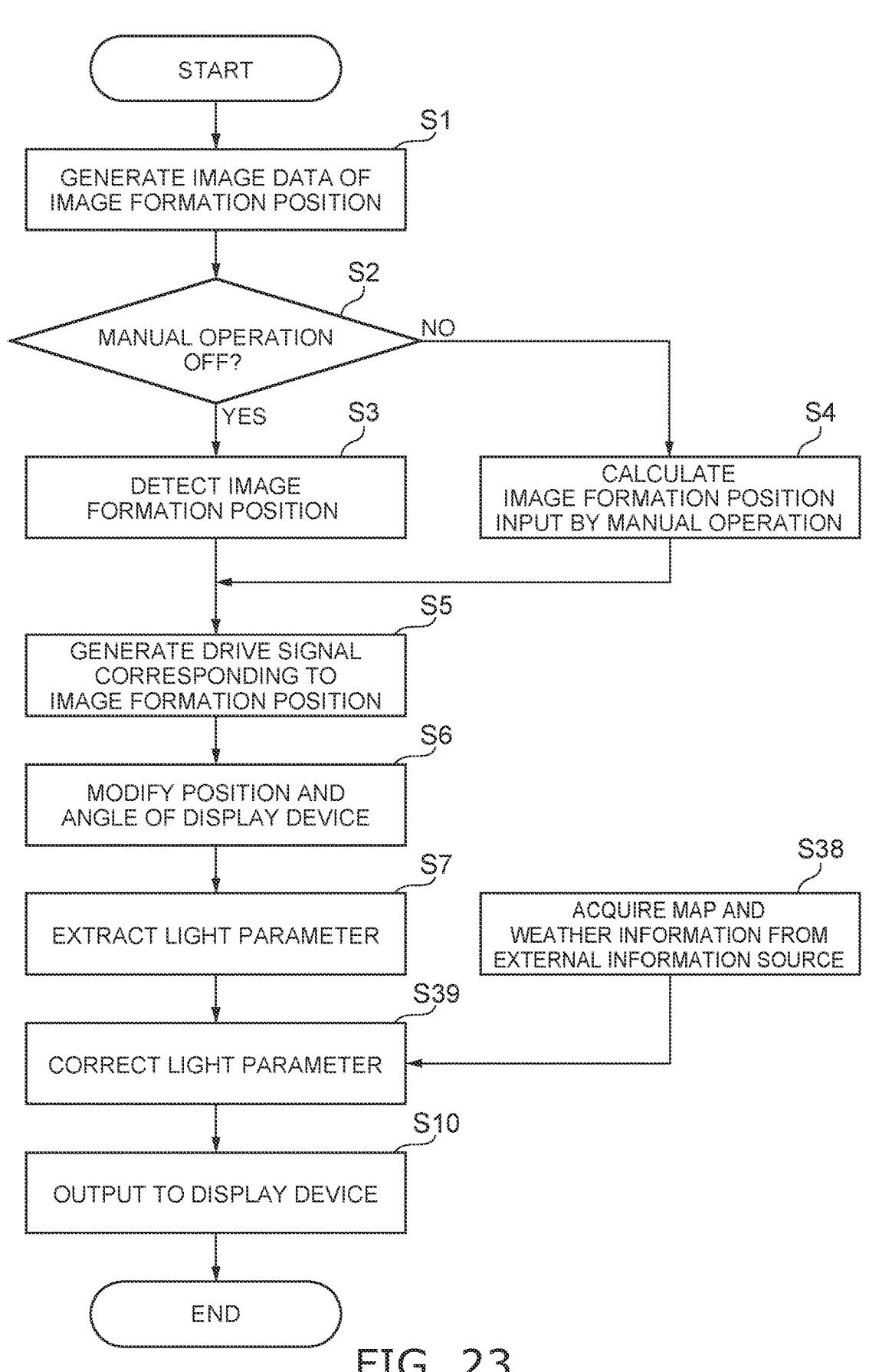
FIG. 23 is an example of a flowchart for describing an operation of the image display device according to the third embodiment.

FIG. 23 is an example of a flowchart for describing an operation of the image display device according to the third embodiment.

The processing of steps S1 to S7 and S10 is the same as the operation of the control system 1001 of the image display device 1000 according to the first embodiment described with reference to FIG. 17, and a detailed description is omitted.

In step S38 as shown in FIG. 23, the display controller 3416 acquires the weather information and the map information including the current position of the vehicle 1 from the external information source MT1 via the external information interface 3440.

In step S39, the display controller 3416 calculates the correction value of the reference value of the light parameter for each time based on the speed of the vehicle 1, the map information, and the weather information. The display controller 3416 corrects the light parameter by successively applying the correction value of the reference value of the light parameter calculated for each time.

Although the display controller 3416 acquires both the map information and the weather information in the application of the specific example above, one of the map information or the weather information is applicable.

Effects of the image display device 3000 according to the embodiment will now be described.

The image display device 3000 according to the embodiment has effects similar to those of the image display device 1000 according to the first embodiment. Also, the controller 3410 accesses the external information source MT1 in a timely manner to acquire at least one of the weather information or the map information at the current position of the vehicle 1 from the external information source MT1. The controller 3410 corrects the reference value of the light parameter based on the speed at which the vehicle 1 is traveling and the acquired map information and weather information. Because the correction value of the light parameter is calculated over time, the observer O3 of the image 13 can observe a more natural display of the image 13 that is set according to the surrounding environment of the observer O3.

Similar effects can be obtained by applying the correction value of the reference value by acquiring the prescribed information related to the light parameter from the external information source MT1 to the image display devices according to the first, second, fourth, and fifth embodiments.

Fourth Embodiment

Figure 24:
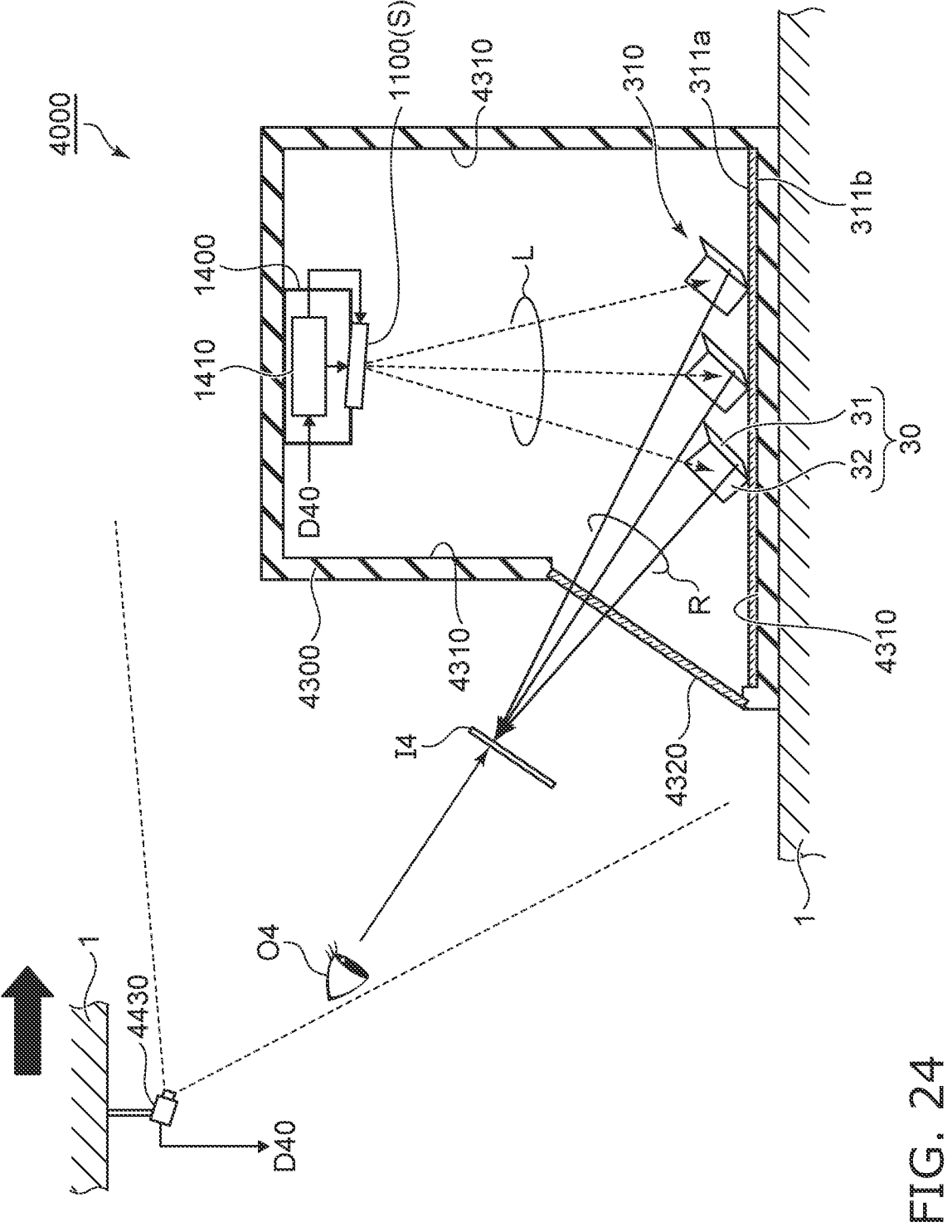
FIG. 24 is a schematic cross-sectional view illustrating an image display device according to a fourth embodiment.

FIG. 24 is a schematic cross-sectional view illustrating an image display device according to a fourth embodiment.

As shown in FIG. 24, the image display device 4000 according to the embodiment includes the imaging element 310, the display device 1100(S), a detecting part 4430, and the controller 1410. The image display device 4000 differs from the image display device 1000 in that the image display device 4000 includes the detecting part 4430 that has a different configuration from the imaging parts 1432 and 1434 of the image display device 1000 according to the first embodiment. The image display device 4000 differs from the image display device 1000 in that the image display device 4000 includes a controller 4410 that is different from the controller 1410 of the image display device 1000 according to the first embodiment. The image display device 4000 differs from the image display device 1000 in that the image display device 4000 includes the imaging element 310 that is different from the imaging element 310a of the image display device 1000 according to the first embodiment. The arrangement of the display device 1100(S) and the imaging element 310 of the image display device 4000 is different from that of the image display device 1000. Otherwise, the components of the image display device 4000 are the same as the components of the image display device 1000; the same components are marked with the same reference numerals, and a detailed description is omitted as appropriate.

The detecting part (the fourth imaging part) 4430 is located above and backward of the observer O1 to capture an image 14 observed by an observer O4. The detecting part 4430 also images the outside scene in the direction in which the vehicle 1 travels from above and backward of the observer O4. The detecting part 4430 images the image 14 and the outside scene of the vehicle 1 and generates image data (fourth image data) D40 including information of the image 14 and information of the outside scene in the direction in which the vehicle 1 travels. The information of the image 14 is information of the position at which the image 14 is formed and information of the light parameter forming the image 14. The information of the outside scene of the vehicle 1 is information of the light parameter of the outside scene.

For example, the detecting part 4430 generates one set of the image data D40 including the information of the image 14 and the information of the outside scene and transmits the image data D40 to the controller 1410. Based on the image data D40 that is received, the controller 1410 detects and extracts the position of the image 14, the light parameter of the image 14, and the light parameter of the outside scene. The detecting part 4430 is one camera having a wide-angle lens that can simultaneously image the image 14 and the outside scene. The broken lines in FIG. 24 illustrate the angle of view of the camera, and the image 14 and the outside scene in the travel direction of the vehicle 1 are included in the angle of view.

The detecting part 4430 may include multiple cameras. For example, the detecting part 4430 includes a camera having a narrow-angle lens imaging the image 14 and a camera having a wide-angle lens imaging the outside scene, and these cameras are housed in, for example, one case and located above and backward of the observer O4. When a camera having a wide-angle lens is used and when multiple cameras are used, the sensitivity of the camera to the luminance may be switched according to the brightness inside the vehicle 1.

Periodically, the controller 4410 outputs a calibration image pattern to the display device 1100(S) to calibrate the light parameter of the image 14, and determines the image quality of the image 14 based on the calibration image pattern displayed in mid-air. By the periodic determination of the display image quality of the image 14 by the controller 1410, the observer O4 can observe the image 14 in an easily-viewable state.

In the image display device 4000, the imaging element 310, the display device 1100(S), and the controller 1410 are located inside a housing 4300. An opening is provided in the housing 4300, and a window member 4320 is provided in the opening of the housing 4300.

The imaging element 310 of the image display device 4000 is different from the imaging element 310*a* of the other embodiments described above. As described with reference to FIGS. 12A and 12B, the imaging element can be selected as appropriate from the imaging elements 10, 310, and 310*a* according to the space inside the housing, the mounting location of the image display device, etc.

In the image display device 4000, the display device 1100(S) is located directly above the imaging element 310. Therefore, the light L that is emitted by the display device 1100(S) is irradiated on the imaging element 310 by traveling downward from the display device 1100(S). A portion of the light incident on the imaging element 310 is reflected twice by the dihedral corner reflector 30 and emitted as the reflected light R. The window member 4320 is positioned to transmit the reflected light R reflected twice by the imaging element 310.

Light that is reflected only one time by the dihedral corner reflector 30 of the imaging element 310 and light that is not reflected by the dihedral corner reflector 30 escape toward the second surface 311*b* side through the spacing 23 between the adjacent reflector rows 22 shown in FIG. 6. Accordingly, the imaging element 310 does not emit light other than the twice-reflected light toward the first surface 311*a* side. In the image display device 4000 according to the embodiment, the spacing 23 between the adjacent reflector rows 22 is provided in the imaging element 310 because the display device 1100(S) used as the light source is located in the normal direction of the first surface 311*a* of the imaging element 310.

In the example, a light-shielding member 4310 is provided at the bottom surface inside the housing 4300 so that the light that escapes toward the second surface 311*b* side does not become stray light by being re-reflected inside the housing 4300. The light-shielding member 4310 also is provided at the sidewall surface inside the housing 4300. Similarly to the light-shielding member 1310 shown in FIG. 1, the light-shielding member 4310 may be, for example, a coated film of a black coating material formed at the bottom surface and wall surface of the housing 4300. The light-shielding member 4310 is sufficiently thin compared to the thickness of the constituent material of the housing 4300 and is therefore illustrated as a surface inside the housing 4300 in FIG. 24.

In the image display device 4000, the imaging element 310 emits only the twice-reflected light R of the incident light L, and does not reflect other light toward the first surface 311*a* side. Therefore, as described with reference to FIG. 14, the imaging element 310 reduces the formation of ghost images other than the real image at the first surface 311*a* side.

An operation of the image display device 4000 according to the embodiment will now be described.

Figure 25:
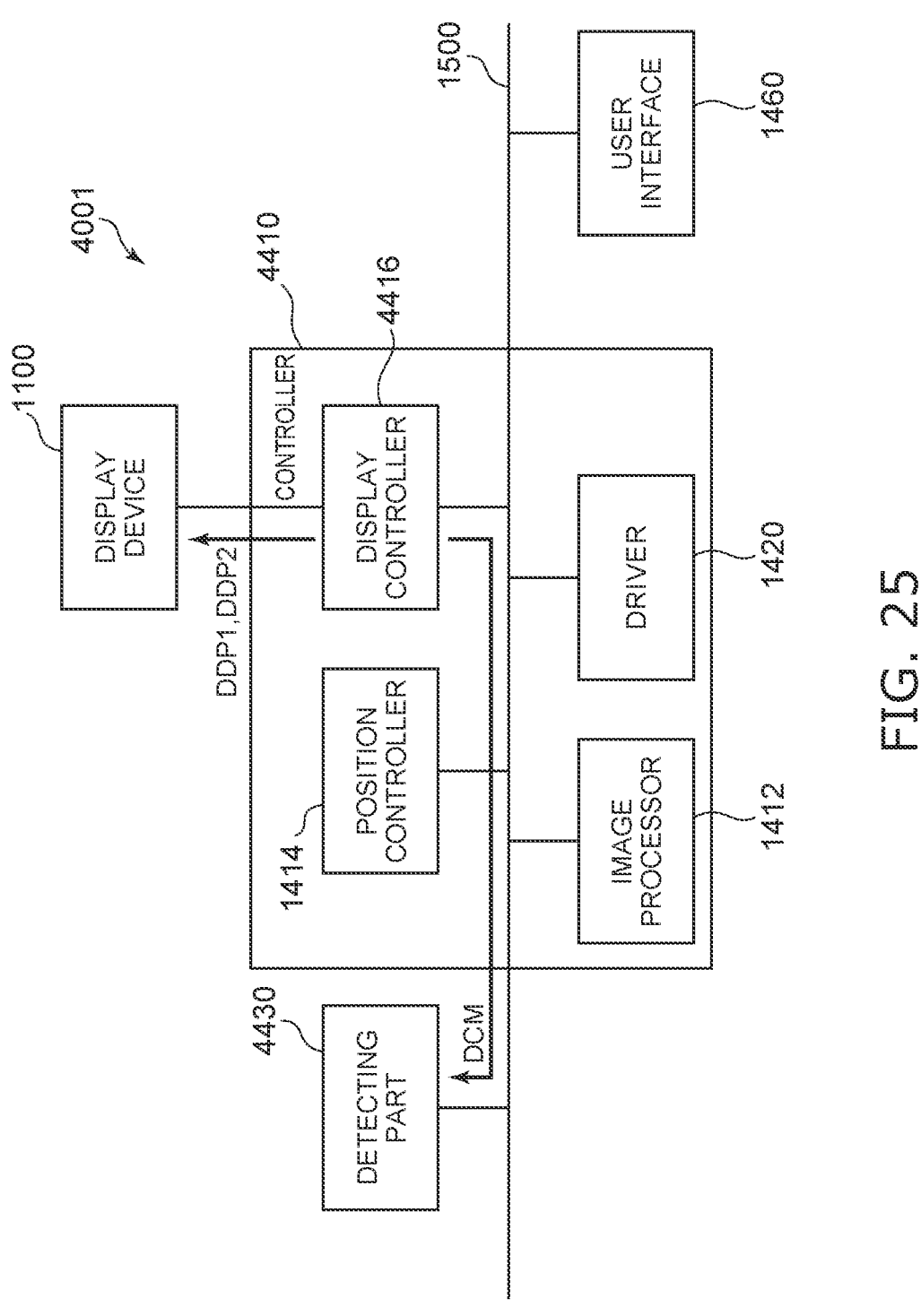
FIG. 25 is an example of a schematic block diagram illustrating a control system of the image display device according to the fourth embodiment.

FIG. 25 is an example of a block diagram for describing the operation of the image display device according to the fourth embodiment.

As shown in FIG. 25, a control system 4001 of the image display device 4000 includes the detecting part 4430, the controller 4410, and the user interface 1460. The detecting part 4430 is a camera having a wide-angle lens. The controller 4410 includes the image processor 1412, the position controller 1414, the driver 1420, and a display controller 4416. The detecting part 4430, the image processor 1412, the position controller 1414, the driver 1420, the display controller 4416, and the user interface 1460 are communicatably connected via the communication network 1500.

The detecting part 4430 generates image data including information of the image 14 observed by the observer O4 and information of the outside scene in the direction in which the vehicle 1 travels, and transmits the image data to the image processor 1412. The image processor 1412 performs image analysis of the image data to detect the position at which the image 14 is formed and extract the light parameter of the image 14 and the light parameter of the outside scene.

Similarly to the control system 1001 of the image display device 1000 shown in FIG. 16, the position controller 1414 calculates the difference between the reference position of the image 14 and the position of the image 14 detected in the image data, and generates a drive signal so that the difference tracks to 0. The position controller 1414 transmits the generated drive signal to the driver 1420. The driver 1420 adjusts the position and angle of the display device 1100(S) based on the drive signal.

The display controller 4416 transmits a normal light signal DDP1 and a calibration light signal DDP2 to the display device 1100(S). The active period of the normal light signal DDP1 is set not to overlap the active period of the calibration light signal DDP2. In the active period of the normal light signal DDP1, the display device 1100(S) outputs the image 14 observed by the observer O4. In the active period of the calibration light signal DDP2, the display device 1100(S) outputs a preset calibration image pattern.

For the observer O4 to observe the image 14, the active period of the normal light signal DDP1 is long enough to be visible to a human. The active period of the calibration light signal DDP2 is short enough not to be visible to a human so that the calibration image pattern is not visible to the observer O4.

The display controller 4416 transmits an imaging signal DCM to the detecting part 4430 to activate the detecting part 4430 in the active periods of the normal light signal DDP1 and the calibration light signal DDP2. The detecting part 4430 images the object in the active period of the imaging signal DCM.

The user interface 1460 is similar to the image display device 1000 according to the first embodiment, and a detailed description is omitted.

Figure 26:
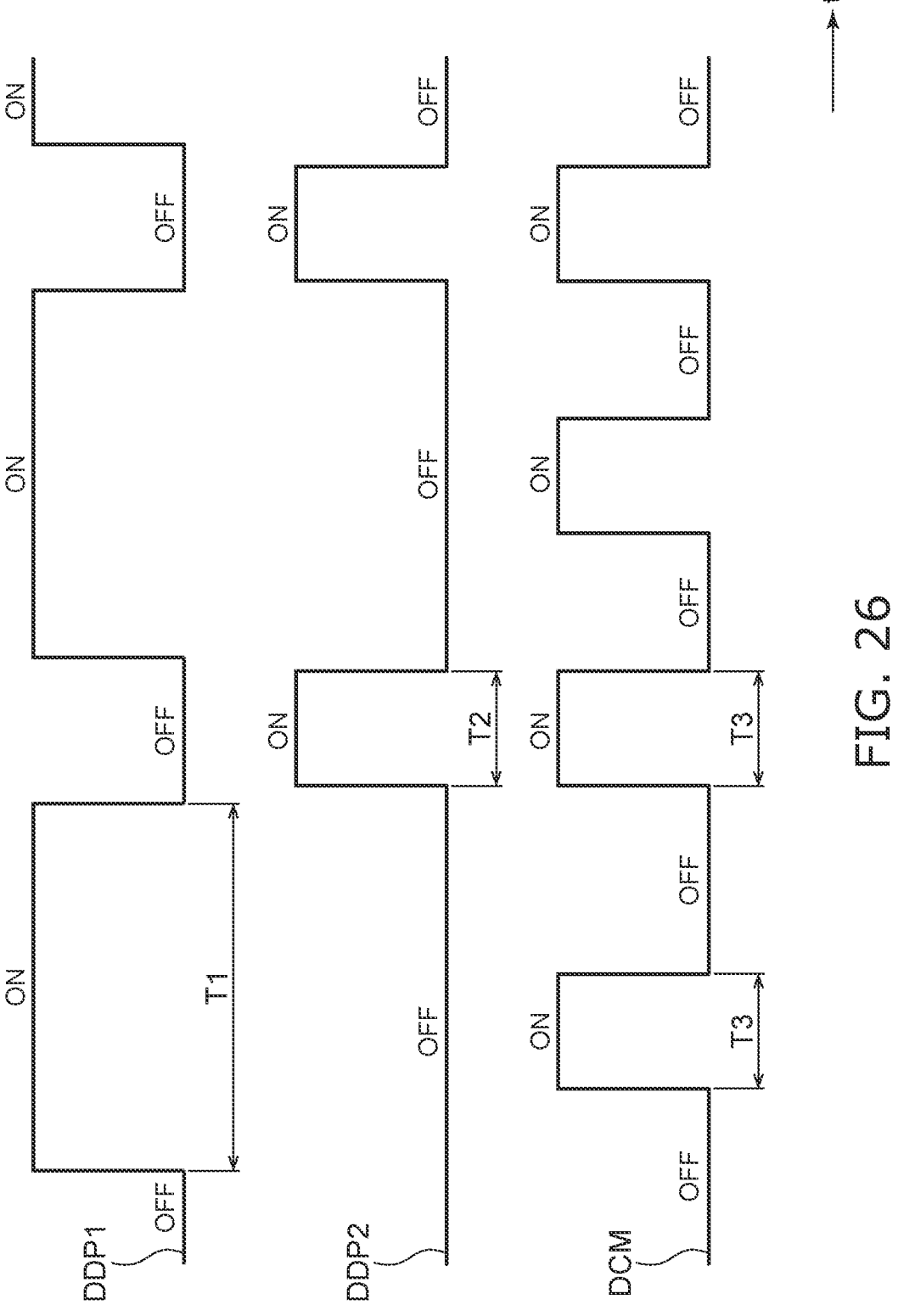
FIG. 26 is an example of a schematic timing chart for describing an operation of the image display device according to the fourth embodiment.

FIG. 26 is an example of a schematic timing chart for describing an operation of the image display device according to the fourth embodiment.

The figure of the uppermost row of FIG. 26 illustrates the temporal change of the normal light signal DDP1.

The figure of the second row of FIG. 26 illustrates the temporal change of the calibration light signal DDP2.

The figure of the lowermost row of FIG. 26 illustrates the temporal change of the imaging signal DCM.

The periods of the normal light signal DDP1, the calibration light signal DDP2, and the imaging signal DCM labeled ON in FIG. 26 are active periods, and the periods labeled OFF are inactive periods.

As shown in FIG. 26, the normal light signal DDP1 is active in a period (a first period) T1. The normal light signal DDP1 is inactive in periods other than the period T1. The calibration light signal DDP2 is active in a period (a second period) T2. The calibration light signal DDP2 is inactive in periods other than the period T2. The period T1 does not overlap the period T2. For example, the cycle lengths of the normal light signal DDP1 and the calibration light signal DDP2 are the same.

The imaging signal DCM is active in a period T3. In the example of FIG. 26, the imaging signal DCM is inactive in periods other than the period T3. The imaging signal DCM images the image 14 in the period T1 in which the normal light signal DDP1 is active, and images the calibration image pattern in the period T2 in which the calibration light signal DDP2 is active. In the example of FIG. 26, the cycle length of the imaging signal DCM is ½ of the cycle length of the normal light signal DDP1 and the calibration light signal DDP2.

Effects of the image display device 4000 according to the embodiment will now be described.

The image display device 4000 according to the embodiment has effects similar to the image display device 1000 according to the first embodiment. The image display device 4000 includes the detecting part 4430; the detecting part 4430 is a camera having a wide-angle lens; therefore, image data that includes both information of the image 14 output by the image display device 4000 and information of the outside scene in the direction in which the vehicle 1 travels can be generated by one camera.

In the image display device 4000, the display controller 4416 operates to display the calibration image pattern in the display device 1100(S). Based on the image data including the information of the calibration image pattern, the display controller 4416 determines the image quality of the image 14 output by the image display device 4000, and adjusts the light parameter to have the appropriate image quality. Therefore, after the image quality adjustment of the image 14 by the calibration image pattern, the observer O4 can observe the image 14 having a more appropriate image quality.

In the image display device 4000, the image quality calibration operation that uses the calibration image pattern can be periodically performed. Therefore, the observer O4 can observe the image 14 having an appropriately adjusted image quality even when the environment such as the brightness or the like of the periphery changes in the normal operation of displaying the image 14.

In the image display device 4000 according to the embodiment, the display device 1100(S) used as the light source is located directly above the imaging element 310. The imaging element 310 emits only the twice-reflected light of the light L emitted from the display device 1100(S) as the reflected light R for forming the image 14. Therefore, the imaging element 310 can reduce the radiation of light that becomes false images and/or ghosts other than the image 14 at the first surface 311a side.

The arrangement of the display device and the imaging element is applicable to the image display devices 1000 to 3000 according to the first to third embodiments described above and the image display device according to the fifth embodiment described below. By providing the display device directly above the imaging element, effects similar to those of the image display device 4000 according to the embodiment can be obtained in which the radiation of light that becomes false images and/or ghosts at the first surface side of the imaging element can be reduced.

Fifth Embodiment

Figure 27:
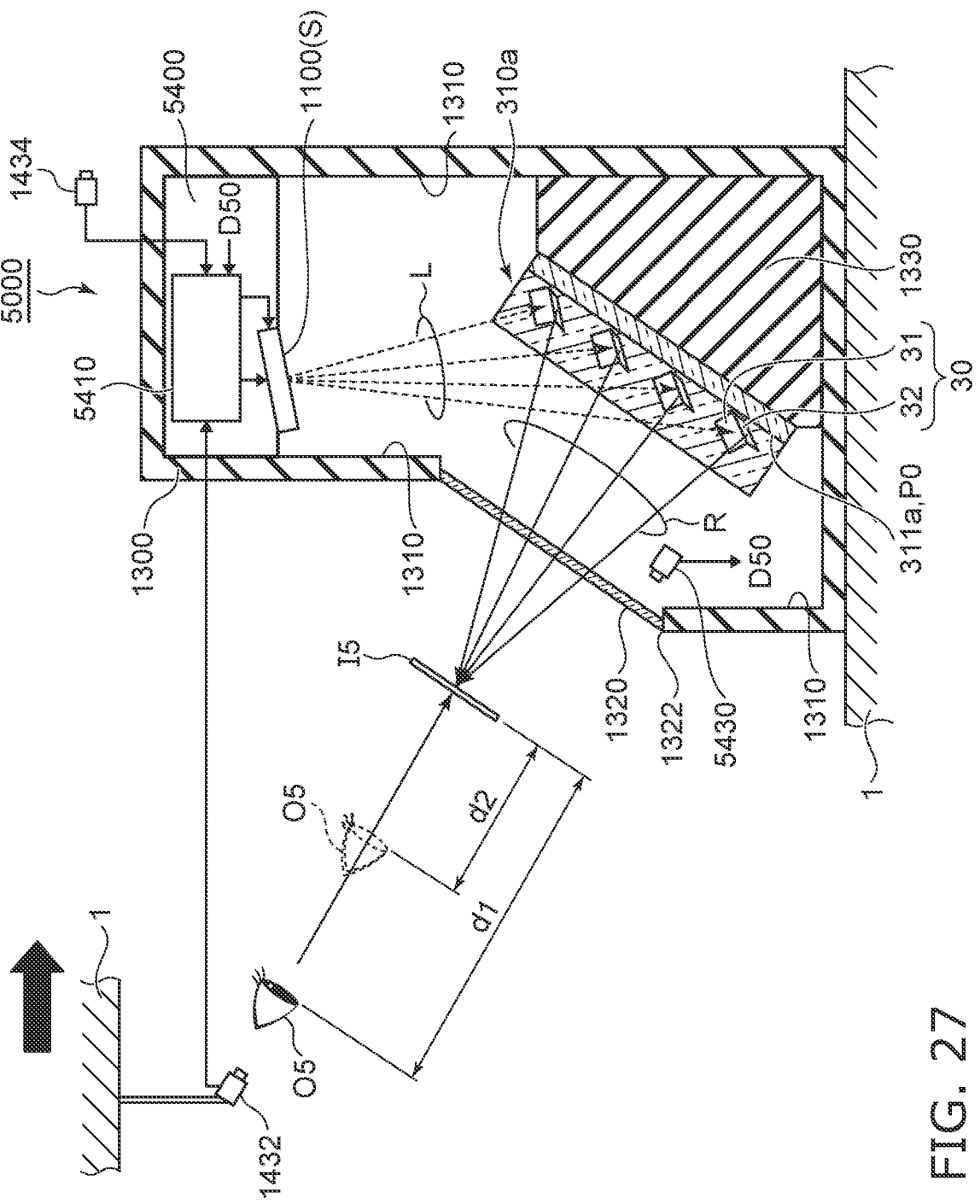
FIG. 27 is a schematic cross-sectional view illustrating an image display device according to a fifth embodiment.

FIG. 27 is a schematic cross-sectional view illustrating an image display device according to a fifth embodiment.

As shown in FIG. 27, the image display device 5000 according to the embodiment includes the imaging element 310a, the display device 1100(S), the imaging parts 1432 and 1434, a controller 5410, and a detecting part (a second detecting part) 5430. The image display device 5000 includes the controller 5410 that is different from the controller 1410 of the image display device 1000 according to the first embodiment. The image display device 5000 differs from the image display device 1000 according to the first embodiment in that the detecting part 5430 is further included. Otherwise, the components of the image display device 5000 are the same as the components of the image display device 1000; the same components are marked with the same reference numerals, and a detailed description is omitted as appropriate.

The detecting part 5430 is, for example, a camera that is located at a position facing an observer O5. An imaging region is set in the detecting part 5430 to include information related to at least the positions of the eye and pupil of the observer O5. In the example of FIG. 27, the detecting part 5430 is located inside the housing 1300. The detecting part 5430 images the observer O5 via the window member 1320.

The detecting part 5430 images the observer O5 observing an image I5, generates image data (fifth image data) D50 including information of the pupil position of the observer O5, and transmits the image data D50 to the controller 5410.

To detect the pupil position of the observer O5, it is favorable for the detecting part 5430 to image the image of the observer O5 from the front. The location of the detecting part 5430 is not limited to the interior of the housing 1300, and may be located outside the housing 1300 as long as the observer O5 can be imaged from such a position.

The controller 5410 detects the pupil position of the observer O5 based on the image data D50. The controller 5410 monitors distances d1 and d2 between the pupil position of the observer O5 and the position of the image I5. The distance d2 is, for example, the distance between the position of the image I5 and the pupil position when the observer O5 performs the operation of looking into the image I5. The distance d2 is less than the distance d1. The controller 5410 performs a protection operation for the observer O5 when the distance between the pupil position of the observer O5 and the position of the image I5 is determined to be less than a preset threshold. For example, the distance d2 of FIG. 27 is taken to be a threshold. The protection operation for the observer O5 is, for example, a control of the display device 1100(S) by the controller 5410 to reduce the output of the light forming the image I5. This is because there is a risk that the vision of the observer O5 may be temporarily impaired if the pupil position of the observer O5 becomes too proximate to the image I5 and an excessive amount of light is incident on the pupil of the observer O5.

An operation of the image display device 5000 according to the embodiment will now be described.

Figure 28:
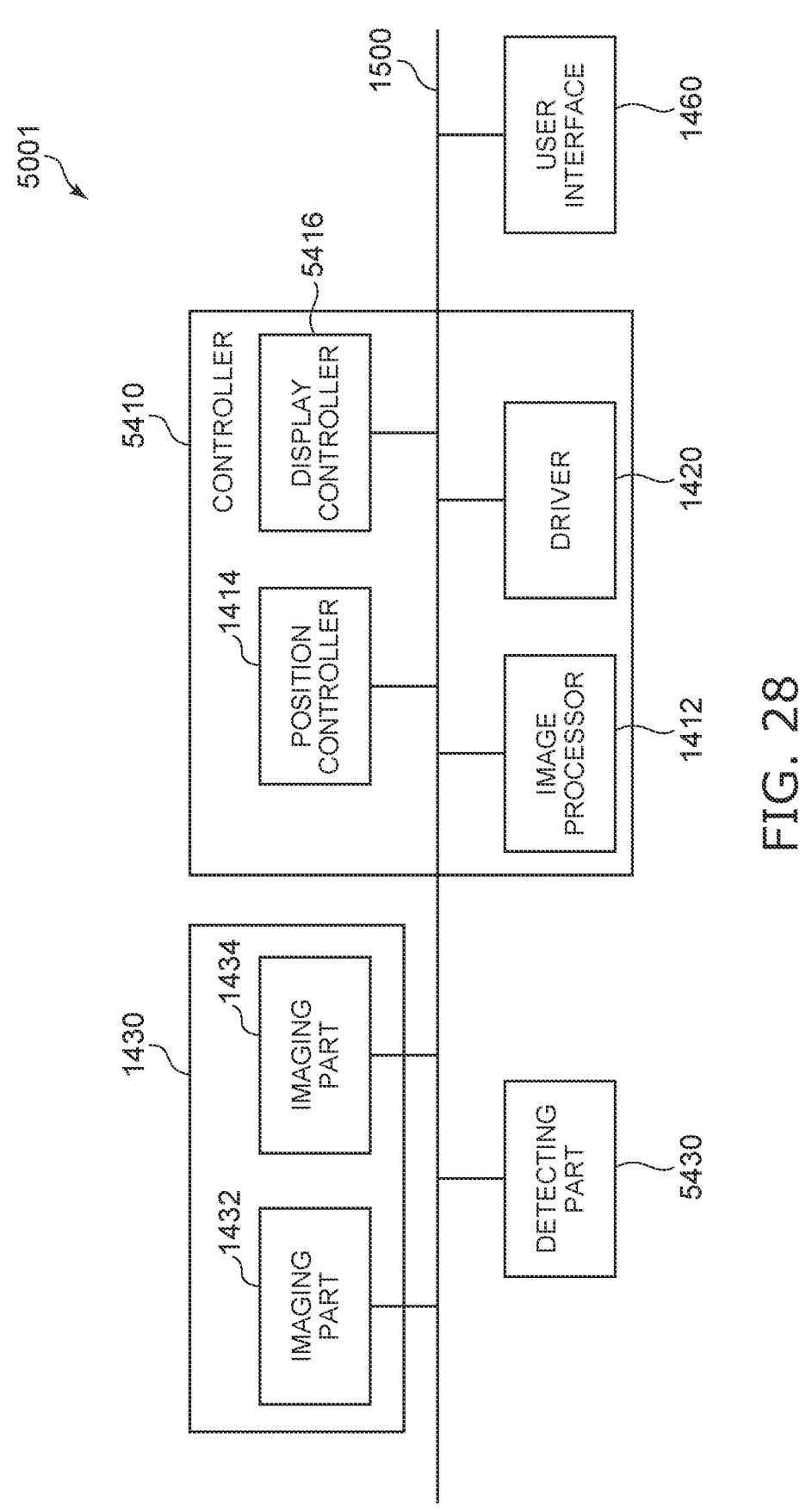
FIG. 28 is an example of a schematic block diagram illustrating a control system of the image display device according to the fifth embodiment.

FIG. 28 is an example of a schematic block diagram illustrating a control system of the image display device according to the fifth embodiment.

As shown in FIG. 28, the control system 5001 of the image display device 5000 includes the detecting parts 1430 and 5430, the controller 5410, and the user interface 1460. The detecting part (the first detecting part) 1430 includes the imaging parts 1432 and 1434. The controller 5410 includes the image processor 1412, the position controller 1414, the driver 1420, and a display controller 5416. The imaging parts 1432 and 1434, the detecting part (the second detecting part) 5430, the image processor 1412, the position controller 1414, the driver 1420, the display controller 5416, and the user interface 1460 are communicatably connected via the communication network 1500.

The operations of the imaging parts 1432 and 1434, the image processor 1412, the position controller 1414, the driver 1420, and the user interface 1460 are the same as those of the image display device 1000 according to the first embodiment, and a detailed description is omitted.

Figure 29:
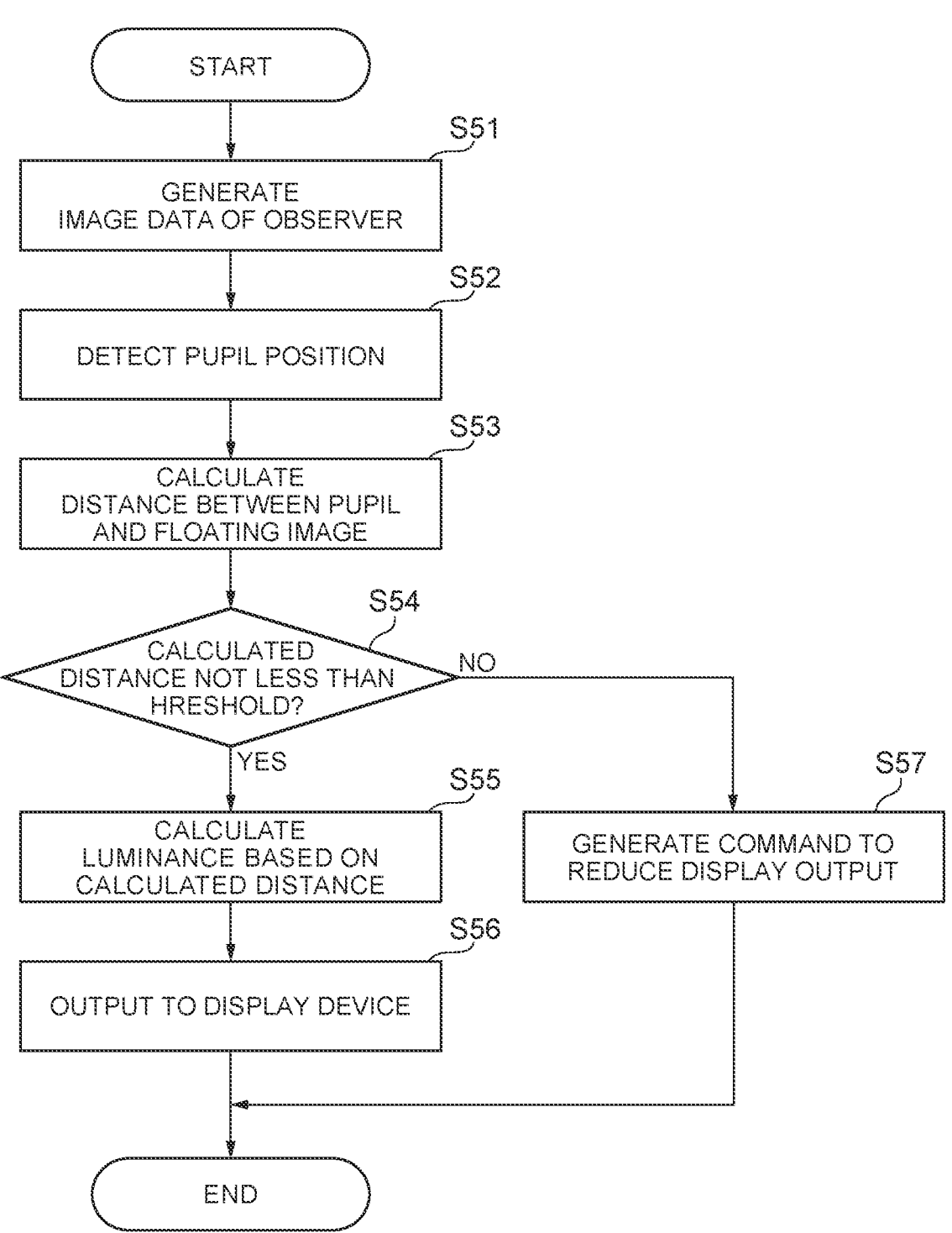
FIG. 29 is an example of a flowchart for describing an operation of the image display device according to the fifth embodiment.

FIG. 29 is an example of a flowchart for describing an operation of the image display device according to the fifth embodiment.

FIG. 29 shows an example of a series of operations in which the detecting part 5430 and the display controller 5416 shown in FIGS. 27 and 28 monitor the distance between the pupil position of the observer O5 and the formation position of the image I5 and perform the protection operation of the observer O5.

In step S51 as shown in FIG. 29, the detecting part 5430 images the observer O5 and generates image data including information of the pupil position of the observer O5. The detecting part 5430 transmits the image data to the image processor 1412.

In step S52, the image processor 1412 detects the pupil position of the observer O5 by performing image processing of the image data. The image processor 1412 transmits information of the detected position of the pupil to the display controller 5416.

In step S53, the display controller 5416 calculates the distance between the pupil position and the position at which the image I5 is formed. The position at which the image I5 is formed is calculated by the position controller 1414 of the optical path including the display device 1100(S) and the imaging element 310a.

In step S54, the display controller 5416 compares the distance between the pupil position and the position of the image I5 with a preset threshold. When the distance between the pupil position and the position of the image I5 is determined to be not less than the threshold, the display controller 5416 causes the processing to transition to step S55. When the distance between the pupil position and the position of the image I5 is determined to be less than the threshold, the display controller 5416 causes the processing to transition to step S57.

In step S55, the display controller 5416 applies a preset reference value.

In step S56, the display controller 5416 outputs the applied reference value to the display device 1100(S).

In step S57, the display controller 5416 applies the reference value by reducing the set reference value to a prescribed value. The reduced prescribed value may be a fixed value or may be changed according to the distance.

Step S57 is not limited to reducing the reference value of the output of the light, and may perform the operation of protecting the observer O5 by another method. For example, a warning sound may notify the observer O5 that the observer O5 is too proximate to the image I5, etc.

Effects of the image display device 5000 according to the embodiment will now be described.

The image display device 5000 according to the embodiment has effects similar to the image display device 1000 according to the first embodiment. By including the detecting part 5430 and the controller 5410, the image display device 5000 can detect the pupil position of the observer O5 and monitor that the observer O5 is not too proximate to the image I5. When the controller 5410 monitors the distance between the pupil position of the observer O5 and the position of the image I5 and when the distance is less than the preset distance, the output of the light for forming the image I5 can be suppressed or shielded, another warning operation may be performed, etc. Therefore, the observer O5 can utilize the image display device 5000 to safely observe the image I5 displayed in mid-air.

Although six-axis control of one of the display device or the imaging element is performed according to the embodiments described above, the control is not limited thereto; the position at which the floating image is formed may be modified by six-axis control of both the display device and the imaging element. Also, the modification of the position at which the floating image is formed is not limited to a six-axis control of one or both of the display device and the imaging element. When the position at which the observer views the floating image or the position at which the floating image is formed is in a more limited range, etc., the control may use a portion of the degrees of freedom of six-axis control.

The embodiments described above are applicable in appropriate combinations.

What is claimed is:

1. An image display device comprising:
an imaging element configured to form a floating image;
a light source configured to irradiate, toward the imaging element, light forming the floating image;
a first detecting part located in a vehicle, the first detecting part configured to detect surrounding information of an observer observing the floating image; and
a controller configured to control, based on the surrounding information, a position at which the floating image is formed and a parameter of the light emitted by the light source, the parameter of the light including at least one of an output or a chromaticity of the light emitted by the light source, wherein:
the imaging element comprises either:
a base member, and a reflector array located on the base member, the base member including a first surface, and a second surface positioned at a side opposite to the first surface, or
a base member comprising a reflector array, the base member including a first surface, and a second surface positioned at a side opposite to the first surface,
the reflector array comprises a plurality of reflector rows, each of the plurality of reflector rows comprising a plurality of dihedral corner reflectors arranged along a first direction,
each of the plurality of dihedral corner reflectors includes:
a first reflecting surface configured to reflect light from a first surface side, and
a second reflecting surface oriented to be orthogonal to the first reflecting surface, and configured to reflect a reflected light from the first reflecting surface toward the first surface side,
in each reflector row of the plurality of reflector rows, an angle between a straight line at which the first reflecting surface and the second reflecting surface meet, and a plane in which the first direction and a second direction intersecting the first direction extend is set to a value greater than 0° and less than 90°,
an angle between the first reflecting surface and the plane is set to a value greater than 45° and less than 90°,
the plurality of reflector rows include a first reflector row in which the angle between the straight line and the plane is set to a smallest value among those of the plurality of reflector rows,
reflector rows other than the first reflector row are configured such that the angle between the straight line and the plane is set to values that increase away from the first reflector row in the second direction.

2. The device according to claim 1, wherein:
the first detecting part comprises a first imaging part configured to acquire first image data, the first image data including the floating image, and
the controller is configured to:
detect the position of the floating image based on the first image data and controls the position of the floating image to be a preset reference position, and
determine an image quality of the floating image based on the first image data and control the parameter of the light so that the image quality of the floating image is a preset reference image quality.

3. The device according to claim 2, wherein:
the first detecting part comprises a second imaging part configured to acquire second image data from a different position from the first imaging part, the second image data including the floating image, and the controller is configured to detect the position of the floating image based on the first and second image data.

4. The device according to claim 1, wherein:
the first detecting part comprises a third imaging part configured to acquire third image data, the third image data including an outside scene in a direction in which the vehicle travels, and
the controller is configured to correct the parameter of the light based on the third image data.

5. The device according to claim 4, wherein:
the controller is configured to correct the parameter of the light based on at least one of:
map information including a position of the vehicle, or
weather information at the position of the vehicle.

6. The device according to claim 1, wherein:
the first detecting part comprises a fourth imaging part acquiring fourth image data, the fourth image data including both the floating image and scenery frontward of the vehicle, and
the controller is configured to:
detect the position of the floating image based on the fourth image data and control the position of the floating image to be a preset reference position; and
control the parameter of the light so that an image quality of the floating image based on the fourth image data is set to a preset reference image quality.

7. The device according to claim 2, wherein:
the controller is configured to:
control the light source to output an image that can be recognized by the observer in a first period, and
control the light source to output an image of a calibration image pattern in a second period, the calibration image pattern being set as the reference image quality, and
the controller is configured to, in the second period, determine the image quality of the floating image based on the first image data and control the parameter of the light so that the image quality of the floating image is set to the preset reference image quality.

8. The device according to claim 1, further comprising:
a second detecting part located frontward of the observer, the second detecting part configured to acquire fifth image data, the fifth image data including a pupil of the observer, wherein:
the controller is configured to:
detect a position of the pupil of the observer based on the fifth image data, and
perform processing to protect the observer when a distance between the position of the pupil of the observer and the position of the floating image is less than a prescribed value.

9. An image display device comprising:
an imaging element configured to form a floating image;
a light source configured to irradiate, toward the imaging element, light forming the floating image;
a first detecting part located in a vehicle, the first detecting part configured to detect surrounding information of an observer observing the floating image; and
a controller configured to control, based on the surrounding information, a position at which the floating image is formed and a parameter of the light emitted by the light source, the parameter of the light including at least one of an output or a chromaticity of the light emitted by the light source, wherein:
the imaging element comprises either:
a base member, and a reflector array provided on the base member, the base member including a first surface, and a second surface positioned at a side opposite to the first surface, or a base member comprising a reflector array, the base member including a first surface, and a second surface positioned at a side opposite to the first surface, the reflector array comprises a plurality of reflector rows, each of the plurality of reflector rows comprising a plurality of dihedral corner reflectors arranged along a first direction, the plurality of reflector rows being arranged in a second direction to be parallel to each other with a spacing therebetween, the second direction intersecting the first direction, each of the plurality of dihedral corner reflectors includes:
a first reflecting surface configured to reflect light from the first surface side, and
a second reflecting surface oriented to be orthogonal to the first reflecting surface, and configured to reflect a reflected light reflected from the first reflecting surface toward the first surface side, in each reflector row of the plurality of reflector rows, an angle between a straight line at which the first reflecting surface and the second reflecting surface meet and a plane in which the first direction and the second direction intersect is set to a value greater than 0° and less than 90°, an angle between the first reflecting surface and the plane is set to a value greater than 45° and less than 90°, the plurality of reflector rows include a first reflector row in which the angle between the straight line and the virtual plane is set to a smallest value among those of the plurality of reflector rows, reflector rows other than the first reflector row are configured such that the angle between the straight line and the plane is set to values that increase away from the first reflector row in one direction along the second direction.

10. The device according to claim 9, wherein:
the first detecting part comprises a first imaging part configured to acquire first image data, the first image data including the floating image, and
the controller is configured to:
   detect the position of the image based on the first image data and control the position of the image to be a preset reference position, and
   determine an image quality of the image based on the first image data and control the parameter of the light so that the image quality of the floating image is a preset reference image quality.

11. The device according to claim 10, wherein:
the first detecting part comprises a second imaging part configured to acquire second image data from a different position from the first imaging part, the second image data including the floating image, and the controller is configured detect the position of the floating image based on the first and second image data.

12. The device according to claim 9, wherein:
the first detecting part comprises a third imaging part acquiring third image data, the third image data including an outside scene in a direction in which the vehicle travels, and
the controller is configured to correct the parameter of the light based on the third image data.

13. The device according to claim 12, wherein:
the controller is configured to correct the parameter of the light based on at least one of:
   map information including a position of the vehicle, or
   weather information at the position of the vehicle.

14. The device according to claim 9, wherein:
the first detecting part comprises a fourth imaging part configured to acquire fourth image data, the fourth image data including both the floating image and scenery frontward of the vehicle, and
the controller is configured to:
   detect the position of the floating image based on the fourth image data and control the position of the floating image to be a reference position, the reference position being preset; and
   control the parameter of the light so that an image quality of the floating image based on the fourth image data is set to a reference image quality, the reference image quality being preset.

15. The device according to claim 10, wherein:
the controller is configured to:
   control the light source to output an image that can be recognized by the observer in a first period; and
   controls the light source to output an image of a calibration image pattern in a second period, the calibration image pattern being set as the reference image quality, and
the controller is configured to, in the second period, determine the image quality of the floating image based on the first image data and control the parameter of the light so that the image quality of the floating image is set to the preset reference image quality.

16. The device according to claim 9, further comprising:
a second detecting part located frontward of the observer, the second detecting part configured to acquire fifth image data, the fifth image data including a pupil of the observer,
the controller is configured to:
   detect a position of the pupil of the observer based on the fifth image data, and
   perform processing to protect the observer when a distance between the position of the pupil of the observer and the position of the floating image is less than a prescribed value.

* * * * *